US012711659B2

(12) United States Patent
Zelek et al.

(10) Patent No.: US 12,711,659 B2
(45) Date of Patent: Aug. 18, 2026

(54) SYSTEM AND METHOD OF HYBRID SCENE REPRESENTATION FOR VISUAL SIMULTANEOUS LOCALIZATION AND MAPPING

(71) Applicants: John Zelek, Stratford (CA); Georges Younes, Waterloo (CA); Daniel Asmar, Ashrafieh (LB)

(72) Inventors: John Zelek, Stratford (CA); Georges Younes, Waterloo (CA); Daniel Asmar, Ashrafieh (LB)

( * ) Notice: Subject to any disclaimer, the term of this patent is extended or adjusted under 35 U.S.C. 154(b) by 430 days.

(21) Appl. No.: 18/271,092

(22) PCT Filed: Jan. 10, 2022

(86) PCT No.: PCT/CA2022/050027

§ 371 (c)(1),
(2) Date: Jul. 6, 2023

(87) PCT Pub. No.: WO2022/150904

PCT Pub. Date: Jul. 21, 2022

(65) Prior Publication Data

US 2024/0104771 A1 Mar. 28, 2024

Related U.S. Application Data

(60) Provisional application No. 63/136,432, filed on Jan. 12, 2021.

(51) Int. Cl.
*G06K 9/00* (2022.01)
*G06T 7/55* (2017.01)
*G06T 7/73* (2017.01)

(52) U.S. Cl.
CPC .................. *G06T 7/74* (2017.01); *G06T 7/55* (2017.01); *G06T 2207/30244* (2013.01)

(58) Field of Classification Search
CPC ................................ G06T 7/74; G06V 10/757
See application file for complete search history.

(56) References Cited

U.S. PATENT DOCUMENTS

2020/0047340 A1* 2/2020 Hong .................... G01S 17/894

FOREIGN PATENT DOCUMENTS

CN 110726406 A 1/2020

OTHER PUBLICATIONS

Artal, R. M. (2017). Real-time accurate visual slam with place recognition (Doctoral dissertation, PhD thesis. Universidad de Zaragoza). (Year: 2017).*

(Continued)

*Primary Examiner* — Molly Wilburn
*Assistant Examiner* — Aidan Keup
(74) *Attorney, Agent, or Firm* — Sigma Law Group LLC

(57) ABSTRACT

A system and method for visual simultaneous localization and mapping. The method including: extracting a blend of landmarks; associating descriptors and patches of pixels with the extracted landmarks; using the descriptors and patches of pixels, estimating a camera pose by performing feature matching and relative pose estimation; performing joint multi-objective pose optimization over photometric residuals and geometric residuals; updating a local map by performing Bundle Adjustment on the estimated pose; marginalizing extracted landmarks from the local map that are older than a predetermined number of keyframes and adding the descriptors associated with the marginalized landmarks to a global map; where there are loop closure candidates, performing point matching between a keyframe associated with the loop closure candidate and a keyframe most recently added to the global map; and rejecting the keyframe associated with the loop closure candidate if the number of matches is below a predetermined threshold.

20 Claims, 17 Drawing Sheets

(56) References Cited

OTHER PUBLICATIONS

Azagra, P., Civera, J., & Murillo, A. C. (2020). Incremental learning of object models from natural human-robot interactions. IEEE Transactions on Automation Science and Engineering, 17(4), 1883-1900. (Year: 2020).*
Sheng, C., Pan, S., Gao, W., Tan, Y., & Zhao, T. (2020). Dynamic-DSO: Direct sparse odometry using objects semantic information for dynamic environments. Applied sciences, 10(4), 1467. (Year: 2020).*
Younes, "A Unified Hybrid Formulation for Visual SLAM", A thesis presented to the University of Waterloo and the American University of Beirut, UWSpace. http://hdl.handle.net/10012/16807, pp. 1-136, Feb. 16, 2021 (Feb. 16, 2021).
Younes et al., "Keyframe-based monocular SLAM: design, survey, and future directions", Robotics and Autonomous Systems, vol. 98, Issue C, pp. 67-88, Dec. 2017 (Dec. 1, 2017) [retrieved on Mar. 1, 2022 (Mar. 1, 2022)].
Younes et al., "FDMO: Feature Assisted Direct Monocular Odometry", Computer Vision and Pattern Recognition arXiv: 1804.05422vl, pp. 1-8, Apr. 15, 2018 (Apr. 15, 2015).
Younes et al., "A Unified Formulation for Visual Odometry", 2019 IEEE/RSJ International Conference on Intelligent Robots and Systems (IROS), pp. 6237-6244, Nov. 4-8, 2019 (Nov. 4, 2019.
Younes et al., "Robustifying Direct VO to Large Baseline Motions", Computer Vision, Imaging and Computer Graphics Theory and Applications—14th International Joint Conference on Computer Vision, Imaging and Computer Graphics, VISIGRAPP 2019, pp. 477-496, Feb. 25-27, 2019 (Feb. 25, 2019).
Fu et al., "FastORB-SLAM: Fast ORB-SLAM method with Coarse-to-Fine Descriptor Independent Keypoint Matching", Journal of Latex Class Files 2020, Version 1, arXiv:2008.09870vl, pp. 1-14, Aug. 22, 2020 (Aug. 22, 2020).
Lai et al., "A Monocular Visual-Inertial Odometry Based on Hybrid Residuals", 2020 IEEE International Conference on Systems, Man, and Cybernetics (SMC), pp. 3304-3311, Oct. 11-14, 2020 (Oct. 11, 2020).
Search Report and Written Opinion for PCT Application No. PCT/CA2022/050027, dated Apr. 14, 2022.
Agrawal, Motilal , et al., "CenSurE: Center Surround Extremas for Realtime Feature Detection and Matching", in Computer Vision—ECCV 2008, D. Forsyth, P. Torr, and A. Zisserman, Eds. Berlin, Heidelberg: Springer Berlin Heidelberg, 2008, pp. 102-115.
Bay, Herbert , et al., "SURF: Speeded Up Robust Features", Comput. Vis. Image Underst., vol. 110, No. 3, pp. 346-359, Jun. 2008. [Online]. Available: http://dx.doi.org/10.1016/j.cviu.2007.09.014.
Burri, Michael , et al., "The EuRoC micro aerial vehicle datasets", The International Journal of Robotics Research, 2016.
Civera, Javier , et al., "Inverse Depth Parametrization for Monocular SLAM", IEEE Transactions on Robotics, vol. 24, No. 5, pp. 932-945, Oct. 2008.
Engel, Jakob , et al., "A Photometrically Calibrated Benchmark for Monocular Visual Odometry", CoRR, vol. abs/1607.02555, 2016. [Online]. Available: http://arxiv.org/abs/1607.02555.
Engel, Jakob , et al., "A Photometrically Calibrated Benchmark for Monocular Visual Odometry", in arXiv:1607.02555, Jul. 2016.
Engel, Jakob , et al., "Direct Sparse Odometry", IEEE Transactions on Pattern Analysis and Machine Intelligence, vol. PP, No. 99, pp. 1-1, 2017., Aug. 8, 2023.
Engel, Jakob , et al., "LSD-SLAM: Large-Scale Direct Monocular SLAM", Computer Vision—ECCV 2014 SE—54, ser. Lecture Notes in Computer Science, D. Fleet, T. Pajdla, B. Schiele, and T. Tuytelaars, Eds. Springer International Publishing, 2014, vol. 8690, pp. 834-849.
Engel, Jakob , et al., "Semi-Dense Visual Odometry for a Monocular Camera", Computer Vision (ICCV), IEEE International Conference on. IEEE, Dec. 2013, pp. 1449-1456.
Forster, Christian , et al., "SVO: Fast semi-direct monocular visual odometry", Robotics and Automation (ICRA), IEEE International Conference on, 2014.
Gálvez-López, Dorian , et al., "Bags of Binary Words for Fast Place Recognition in Image Sequences", Robotics, IEEE Transactions on, vol. 28, No. 5, pp. 1188-1197, Oct. 2012.
Gao, Xiang , et al., "LDSO: Direct Sparse Odometry with Loop Closure", in 2018 IEEE/RSJ International Conference on Intelligent Robots and Systems (IROS), Oct. 2018, pp. 2198-2204.
Glover, Arren , et al., "OpenFABMAP: An open source toolbox for appearance-based loop closure detection", 2012 IEEE International Conference on Robotics and Automation (ICRA). IEEE, May 2012, pp. 4730-4735.
Horn, Berthold K. P., "Closed-Form Solution of Absolute Orientation Using Unit Quaternions", Journal of the Optical Society of America A, vol. 4, No. 4, pp. 629-642, 1987.
Klein, Georg , et al., "Parallel Tracking and Mapping for Small AR Workspaces", 6th IEEE and ACM International Symposium on Mixed and Augmented Reality, pp. 1-10, Nov. 2007.
Lee, Seong Hun , et al., "Loosely-Coupled Semi-Direct Monocular SLAM", IEEE Robotics and Automation Letters, vol. 4, No. 2, pp. 399-406, Apr. 2019.
Leutenegger, Stefan , et al., "Keyframe-based visual-inertial odometry using nonlinear optimization", The International Journal of Robotics Research, vol. 34, No. 3, pp. 314-334, 2015. [Online]. Available: https://doi.org/10.1177/0278364914554813.
Luo, Hang , et al., "Hybrid Monocular SLAM Using Double Window Optimization", IEEE Robotics and Automation Letters, vol. 6, No. 3, pp. 4899-4906, 2021.
Mur-Artal, Raul , et al., "ORB-SLAM: A Versatile and Accurate Monocular SLAM System", IEEE Transactions on Robotics, vol. PP, No. 99, pp. 1-17, 2015.
Rosten, Edward , et al., "Machine Learning for High-Speed Corner Detection", in 9th European Conference on Computer Vision—vol. Part I, Proceedings of the, ser. ECCV'06. Berlin, Heidelberg: Springer-Verlag, 2006, pp. 430-443.
Rublee, Ethan , et al., "ORB: an efficient alternative to SIFT or SURF", International Conference on Computer Vision (ICCV), Nov. 2011, pp. 2564-2571.
Shi, Jianbo , et al., "Good Features to Track", Computer Vision and Pattern Recognition, 1994. Proceedings CVPR '94., 1994 IEEE Computer Society Conference on, Jun. 1994, pp. 593-600.
Younes, Georges , et al., "A Unified Formulation for Visual Odometry", CoRR, vol. abs/1903.04253, 2019. [Online]. Available: http://arxiv.org/abs/1903.04253.
Younes, Georges , et al., "FDMO: Feature Assisted Direct Monocular Odometry", Proceedings of the 14th International Joint Conference on Computer Vision, Imaging and Computer Graphics Theory and Applications. INSTICC, 2019.
Zubizarreta, Jon , et al., "Direct Sparse Mapping", IEEE Transactions on Robotics, 2020.

* cited by examiner

SYSTEM AND METHOD OF HYBRID SCENE REPRESENTATION FOR VISUAL SIMULTANEOUS LOCALIZATION AND MAPPING

TECHNICAL FIELD

The following relates generally to image processing; and more particularly, to systems and methods of hybrid scene representation for visual simultaneous localization and mapping.

BACKGROUND

Visual Simultaneous Localization and Mapping (VSLAM) is used to estimate six degrees of freedom egomotion of a camera, from its video feed, while simultaneously constructing a three-dimensional (3D) model of the observed environment. VSLAM has many practical, for example, in augmented reality, cultural heritage, robotics and the automotive industry.

VSLAM generally uses a mixture of image processing, geometry, graph theory, optimization and machine learning. In an example, a VSLAM pipeline can include a matching paradigm, visual initialization, data association, pose estimation, topological/metric map generation, optimization, and global localization. However, there are a number of challenges for VSLAM, for example, resilience to a wide variety of scenes (poorly textured or self repeating scenarios), resilience to dynamic changes (moving objects), and scalability for long-term operation (computational resources awareness and management). Generally, VSLAM pipelines are limited as they are tailored towards static, basic point cloud reconstructions, an impediment to perception applications such as path planning, obstacle avoidance and object tracking.

SUMMARY

In an aspect, there is provided a computer-executable method for visual simultaneous localization and mapping, the method comprising: receiving image data representing a new frame; extracting a blend of landmarks from the image data; associating descriptors and patches of pixels with the extracted landmarks; using the descriptors and patches of pixels, estimating a camera pose by performing feature matching and relative pose estimation with descriptors and patches of pixels from a previous frame; performing joint multi-objective pose optimization over photometric residuals and geometric residuals using the estimated pose; where the new frame is a keyframe, updating a local map by performing Bundle Adjustment on the estimated pose; marginalizing extracted landmarks from the local map that are older than a predetermined number of keyframes and adding the descriptors associated with the marginalized landmarks to a global map; performing loop closure comprising: where there are loop closure candidates, performing point matching between a keyframe associated with the loop closure candidate and a keyframe most recently added to the global map; and rejecting the keyframe associated with the loop closure candidate if the number of matches is below a predetermined threshold; and outputting the local map.

In a particular case of the method, the landmarks comprise detected corners and pixel locations with a gradient above a threshold.

In another case of the method, performing loop closure further comprises determining if there are loop closure candidates by comparing the descriptors associated with the loop closure candidates with descriptors associated with the global map.

In yet another case of the method, comparing the descriptors comprises using a Bags of Visual words dictionary to detect the loop closure candidates.

In yet another case of the method, the descriptors comprise Oriented FAST and Rotated BRIEF (ORB) descriptors and patches of pixels descriptors.

In yet another case of the method, on the ORB descriptors are added to the global map.

In yet another case of the method, the method further comprising using a logistic utility function to steer the multi-objective optimization, the logistic utility function comprising higher weights to the geometric residuals in earlier stages of the multi-objective optimization and gradually shifting the weighting toward the photometric residuals.

In yet another case of the method, the local map includes recently marginalized landmarks that are able to be matched to the keyframe using the descriptors.

In yet another case of the method, the method further comprising updating the global map comprising performing at least one of: performing feature matching between landmarks in the global map and landmarks of a subsequent keyframe to be added, and where a match is found, the corresponding landmark of the global map is re-activated in the local map; and checking for matches between landmarks in the local map and landmarks in the global map, and where a match is found, determining if a projected depth estimate from the estimated pose associated with the global landmark has a proximity to the landmark in the local map within a predetermined range, and where the global landmark is within the range, re-activating the landmark in the local map.

In yet another case of the method, performing feature matching comprises using a Bags of Visual words dictionary when the number of matches is below the predetermined threshold.

In another aspect, there is provided a system for visual simultaneous localization and mapping, the system comprising one or more processors in communication with a data storage to execute: an input module to receive image data representing a new frame; a pre-processing module to extract a blend of landmarks from the image data; a matching module to associate descriptors and patches of pixels with the extracted landmarks; a mapping module to, using the descriptors and patches of pixels, estimate a camera pose by performing feature matching and relative pose estimation with descriptors and patches of pixels from a previous frame, perform joint multi-objective pose optimization over photometric residuals and geometric residuals using the estimated pose, update a local map by performing Bundle Adjustment on the estimated pose where the new frame is a keyframe, and marginalize extracted landmarks from the local map that are older than a predetermined number of keyframes and adding the descriptors associated with the marginalized landmarks to a global map; a loop closure module to perform loop closure comprising: where there are loop closure candidates, performing point matching between a keyframe associated with the loop closure candidate and a keyframe most recently added to the global map; and rejecting the keyframe associated with the loop closure candidate if the number of matches is below a predetermined threshold; and an output module to output the local map.

In a particular case of the system, the landmarks comprise detected corners and pixel locations with a gradient above a threshold.

In another case of the system, performing loop closure by the loop closure module further comprises determining if there are loop closure candidates by comparing the descriptors associated with the loop closure candidates with descriptors associated with the global map.

In yet another case of the system, comparing the descriptors comprises using a Bags of Visual words dictionary to detect the loop closure candidates.

In yet another case of the system, the descriptors comprise Oriented FAST and Rotated BRIEF (ORB) descriptors and patches of pixels descriptors.

In yet another case of the system, on the ORB descriptors are added to the global map.

In yet another case of the system, the mapping module further uses a logistic utility function to steer the multi-objective optimization, the logistic utility function comprising higher weights to the geometric residuals in earlier stages of the multi-objective optimization and gradually shifting the weighting toward the photometric residuals.

In yet another case of the system, the local map includes recently marginalized landmarks that are able to be matched to the keyframe using the descriptors.

In yet another case of the system, further comprising updating the global map comprising performing at least one of: the matching module performs feature matching between landmarks in the global map and landmarks of a subsequent keyframe to be added, and where a match is found, the mapping module re-activates the corresponding landmark of the global map in the local map; and the matching module checks for matches between landmarks in the local map and landmarks in the global map, and where a match is found, the mapping module determines if a projected depth estimate from the estimated pose associated with the global landmark has a proximity to the landmark in the local map within a predetermined range, and where the global landmark is within the range, re-activates the landmark in the local map.

In yet another case of the system, performing feature matching comprises using a Bags of Visual words dictionary when the number of matches is below the predetermined threshold.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
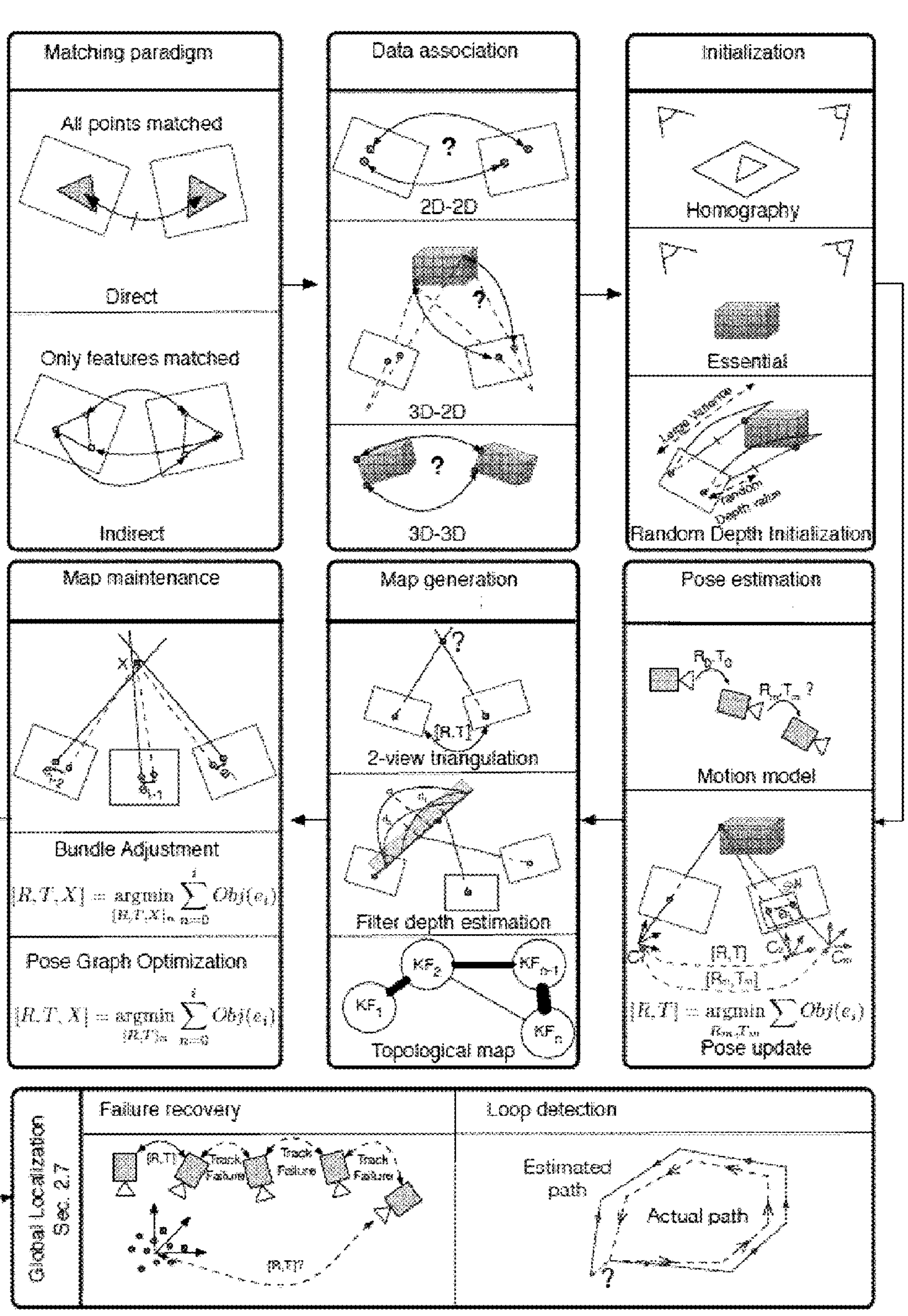
FIG. 1 illustrates a diagram of an example keyframe-based SLAM (KSLAM) approach.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

Advantageously, the present embodiments address the limitations of Visual Simultaneous Localization and Mapping (VSLAM) by using a hybrid scene representation, where different sources of information extracted solely from the video feed are fused in a hybrid VSLAM approach. A pipeline of the present embodiments allows for seamless integration of data from pixel-based intensity measurements and geometric entities to produce and make use of a coherent scene representation. In this way, the present embodiments provide an increase in camera tracking accuracy under challenging motions, an improvement in robustness to challenging poorly textured environments and varying illumination conditions, and ensures scalability and long-term operation by efficiently maintaining a global reusable map representation.

SLAM refers to the process of extracting a scene representation of an agent exploring an unknown environment, while simultaneously localizing the agent in that environment. SLAM is considered indispensable for various tasks including navigation, surveillance, manipulation, and augmented reality applications. SLAM can be performed with various sensors and/or combination of sensors, for example, using cameras, Light Detection and Ranging (LIDAR), range finders, Global Positioning System (GPS), inertial measurement unit (IMU), and the like. The more information, such as depth, position, and speed, that are available at the sensory level, the easier and more robust the localization. If only a single camera and image feed is used, the localization and mapping problem becomes substantially more challenging. Generally, single cameras are bearing only sensors; however, the rewards of using only a single camera are great because a single camera is passive, consumes low power, is of low weight, needs a small physical space, is inexpensive, and is ubiquitously found in hand-held devices. Cameras can operate across different types of environments, both indoor and outdoor, in contrast to active sensors such as infrared based RGB-D sensors that are sensitive to sunlight. Cameras also encode a relatively rich amount of information including colors and textures, in contrast to range finders and LIDAR, that can only capture depth measurements.

Generally, VLSAM can generate a geometric 3D representation of the environment using a set of landmarks (keypoints, pixels, edges, etc.), in what is referred to as metric maps. Realizing that a metric representation becomes computationally intractable in large environments, geometric information has generally been forfeited in favor of connectivity information through Topological maps; however, metric measurements were still needed to localize in a meaningful way, distance measurement, low-level motor control, obstacle avoidance, etc. Unfortunately, the conversion from topological to metric maps is not a trivial process, and hybrid maps can be used where a scene is both metric and topological.

The use of the different scene maps splits most other approaches into one of two categories, either Visual Odometry (VO) or VSLAM; where VO maintains and operates a strictly local map, while VSLAM makes use of both local and global map representations. However, the ability to extend a VO approach to a VSLAM approach is not a trivial process since it is limited, at the lowest level, by the choice of landmarks extracted from the image. Landmarks are in turn categorized as either Direct, feature-based (also referred to as Indirect), or a hybrid of both. Direct landmarks refer to photometric measurements (pixel intensities) and are mostly restricted to VO approaches, as opposed to feature-based landmarks that are extracted as a sparse intermediate image representation and can be used for both local and global localization. The choice of feature-based or direct has important ramifications on the overall design, ability and performance of the overall system, with each type exhibiting its own challenges, advantages, and disadvantages. Generally, it has been determined that the properties of Direct and Indirect approaches are of complementary nature, and hybrid systems that makes use of both provide substantial advantages.

While the present embodiments are generally directed to VSLAM approaches using a single camera, referred to as monocular SLAM, in other cases the present embodiments can be applied to stereo rigs, other vision based sensors (RGBD cameras), and Visual Inertial Systems VIO, with appropriate modification.

A point X in 3D is represented by a vector of homogeneous coordinates: $X=(x\ y\ z\ 1)^T$. Rigid transformations $\in$ SE3 are used to transform the coordinates of the point X from one coordinate frame to another:

$$\begin{pmatrix} x' \\ y' \\ z' \\ 1 \end{pmatrix} = \begin{pmatrix} [ccc|c] & R & & T \\ 0 & 0 & 0 & 1 \end{pmatrix} \cdot \begin{pmatrix} x \\ y \\ z \\ 1 \end{pmatrix} \quad (1)$$

where $R \in SO3$ is a 3×3 rotation matrix and T is a 3D translation vector $\in \mathfrak{R}^3$. The SE3 Lie group is a 4×4 matrix, minimally represented, in the tangent space se3, by a 6D vector. An se3 vector is mapped to an SE3 via the exponential map and vice versa via the log map. An extension of SE3 is the group of similarity transforms which also include a scale $s \in \mathfrak{R}^+$ and are denoted as SIM3:

$$SIM(3) = \begin{pmatrix} [ccc|c] & sR & & T \\ 0 & & 0 & 0 & 1 \end{pmatrix} \tag{2}$$

In turn, SIM3 are minimally represented in the tangent space sim3, by a 7D vector via the exponential map and vice versa via the log map. The inverse depth parametrization X' of a 3D point, in the camera coordinate frame, associated with a pixel p at a given depth d, is defined by:

$$\begin{pmatrix} x' \\ y' \\ z' \\ 1 \end{pmatrix} = \begin{pmatrix} P_x/d \\ P_y/d \\ 1/d \\ 1 \end{pmatrix} \tag{3}$$

A 3D point X $(x\ y\ z\ 1)^T$ expressed in the camera coordinate frame is projected onto the image's frame using the intrinsic camera calibration parameters. A particular camera intrinsics model that accounts for radial distortion is the rad-tan model and is best described by:

$$\pi(X) = \begin{pmatrix} u_i \\ v_i \end{pmatrix} = \begin{pmatrix} u_0 \\ v_0 \end{pmatrix} + \begin{bmatrix} f_x & 0 \\ 0 & f_y \end{bmatrix} \times \frac{\frac{1}{\omega}\arctan\left(2\sqrt{\frac{x^2+y^2}{z^2}}\tan\frac{\omega}{2}\right)}{\sqrt{\frac{x^2+y^2}{z^2}}} \times \begin{pmatrix} \frac{x}{z} \\ \frac{y}{z} \end{pmatrix} \tag{4}$$

where $u_0$, $v_0$, $f_x$, $f_y$, $\omega$ are camera specific and found in an off-line calibration step.

When there is no camera distortion (synthetic images) a simple pinhole projection model can be used and is best described by:

$$\pi(X) = KX = \begin{pmatrix} f_x & 0 & c_x \\ 0 & f_y & c_y \\ 0 & 0 & 1 \end{pmatrix} \begin{pmatrix} \frac{x}{z} \\ \frac{y}{z} \\ 1 \end{pmatrix} \tag{5}$$

The geometric re-projection error vector $\in \mathfrak{R}^2$ is found on a per feature i basis as $$e_i = \left| \begin{pmatrix} u_i' \\ v_i' \end{pmatrix} - \pi(PX) \right| \tag{6}$$

where X is a 3D landmark, $P \in SE3$ is a transformation that maps from world frame to camera frame, and $(u'_i\ v'_i)^T$ are the 2-d coordinates of a corresponding feature match found through data association.

The photometric residual $\in \mathfrak{R}^1$ is defined over a window of pixels $\eta$ surrounding the pixel of interest j as:

$$e_j = \sum_{p \in \eta} \left( I_i[p] - I_j\left[\pi\left(R\pi^{-1}(p, d_p) + T\right)\right]\right) \tag{7}$$

where (R, T) are priors over the transformation between the frames $I_i$ and $I_j$ and $d_p$ is the inverse depth value associated with the pixel p. However, this formulation is generally sensitive to slight brightness variations from one frame to another; therefore, a brightness transfer function can be used to gain robustness against such variations and became the de-facto formulation for direct alignment in the form:

$$e_j = \sum_{p \in \eta} \left[ (I_i[p] - b_i) - \frac{t_i e^{a_i}}{t_j e^{a_j}} \left( I_j\left[\pi\left(R\pi^{-1}(p, d_p) + T\right)\right] - b_j \right) \right] \tag{8}$$

where $t_i$ and $t_j$ are frame exposure times (if available, otherwise set to 1) and $a_n$, $b_n$ are common for all points belonging to frame n and are estimated in the pose optimization step.

To account for outliers, the Huber norm $|\cdot|_\gamma$ is applied to the photometric or geometric residual vectors and is defined by:

$$\rho(t) = \begin{cases} \frac{1}{2}t^2, & \text{if } |t| \le \gamma \\ \gamma|t| - \frac{1}{2}\gamma^2, & \text{if } |t| > \gamma \end{cases} \tag{9}$$

where $\gamma$ (the outlier threshold) is a tuning parameter, below which the Huber norm is quadratic and above which it becomes linear, thereby reducing the effect of outliers on the final objective function.

For the sake of generalization, the optimization can be determined in terms of a generic objective function:

$$F(x) = \frac{1}{2}\sum_i^n f_i(x)^2 \tag{10}$$

where f(x) is some residual function. The optimization problem is then defined as:

$$x^* = \underset{x}{\operatorname{argmin}} \frac{1}{2} f(x)^T f(x) \tag{11}$$

In some applications, different residuals can contribute differently to the objective function, as such a weighting scheme can be incorporated into the optimization, and the problem becomes:

$$x^* = \underset{x}{\operatorname{argmin}} \frac{1}{2} f(x)^T W f(x) \tag{12}$$

The weighting matrix $W \succcurlyeq 0$ is typically a diagonal matrix and initialized with an external source of information such as the octave level at which a key-point was detected or some a-priory source of information.

There are many ways to determine an update step, however for the purposes of illustration, the following discussion is limited to gradient descent, Gauss-newton and Levenberg-Marquardt.

The rationale behind Gradient Descent is to follow the negative direction of the gradient (steepest descent), evaluated at the current estimate x, until convergence. The gradient of F is given by the vector:

$$\nabla F(x) = \nabla\left(\frac{1}{2} f(x)^T f(x)\right) = \frac{1}{2} 2J(x)^T f(x) \quad (13)$$

where J(x) is the Jacobian matrix defined as:

$$J(x) = \left[\frac{\partial f_i}{\partial x_j}\right]_{i=1,\ldots m, j=1,\ldots,n} = \begin{bmatrix} \nabla f_1(x)^T \\ \nabla f_2(x)^T \\ \vdots \\ \nabla f_i(x)^T \end{bmatrix}_{i \times j} \quad (14)$$

where i spans the number of observed residuals, j is the number of variables, and $$\nabla f(x)^T = \left[\frac{\partial f_i}{\partial x_1}, \frac{\partial f_i}{\partial x_2}, , \frac{\partial f_i}{\partial x_j}\right]_{1 \times j} \quad (15)$$

It follows that the gradient can be re-written as:

$$\nabla F(x) = J^T(x) f(x) \quad (16)$$

The optimization is solved in an iterative fashion starting with an initial guess for x, and by estimating an update step Δ(x) along the negative gradient direction, that is:

$$x_{k+1} = x_k + \alpha \Delta x, \text{ where } \Delta x = -J^T(x) f(x) \quad (17)$$

and α is the step size along the gradient. In the case of weighted gradient descent, the step update becomes $\Delta x = -J^T(x)Wf(x)$ Typical gradient descent behaviour is that it quickly approaches the solution from a distance, however its convergence slows down as it gets closer to the optimal point.

Gauss-Newton approximates the objective function with a quadratic function by performing a Taylor series approximation of F(x) around x. The objective function is re-written as:

$$F(x + \Delta x) \approx F(x) + \nabla F(x)^T \Delta x + \frac{1}{2} \Delta x^T \nabla^2 F(x) \Delta x \quad (18)$$

where ∇F(x) is defined in Equation (16), and the Hessian $\nabla^2 F(x)$ is found using:

$$\nabla^2 F(x) = J(x)^\top J(x) + \sum_{i=1}^{m} \left(f_i(x) \nabla^2 f_i(x)\right) \quad (19)$$

Computing the full Hessian is computationally expensive since it involves computing the Hessian of the residuals as well. Both Gauss-Newton and Levenberg-Marquardt assume that the initializing point is close enough to the final solution, so that the residual term in the Hessian is negligible and the objective function Hessian can then be approximated by:

$$\nabla^2 F(x) \approx J(x)^T J(x) \quad (20)$$

Since $J(x)^T J(x)$ is quadratic, it follows that it is also positive semi-definite, thereby satisfying the necessary condition for local optimality. The only remaining necessary condition for Gauss-Newton method is that J(x) is not rank deficient, otherwise Gauss-Newton will not be effective. Finally the taylor approximation of the objective function can then be re-written as:

$$F(x + \Delta x) \approx F(x) + f(x)^T J \Delta x + \frac{1}{2} \Delta x^T J^T J \Delta x \quad (21)$$

A local minimum can then be found by setting the first derivative of the taylor approximation to 0, that is:

$$\frac{\partial F(x + \Delta x)}{\partial \Delta x} = f(x)^T J + \frac{1}{2} 2\Delta x^T J(x)^T J(x) = 0 \quad (22)$$

resulting in what is known as the normal equations defined by:

$$J^T J \Delta x = -J^T f(x) \quad (23)$$

In the case of weighted optimization, the normal equations becomes:

$$J^T W J \Delta x = -J^T W f(x) \quad (24)$$

Solving Gauss-Newton then involves iteratively solving the normal equations and applying the increments to the variable vector x:

$$x_{k+1} = x_k + \alpha \Delta x \quad (25)$$

where $\Delta x = -(J(x)^T W J(x))^{-1} J^T(x) W f(x)$ and α is the step size. Unlike the gradient-descent, Gauss-Newton is notable for its convergence close to the solution, but is relatively slow to approach it from a distance.

Unlike the other two line search methods, Levenberg-Marquardt (LM) is a trust region method that aims to solve:

$$\underset{\Delta x}{\operatorname{argmin}} \frac{1}{2} \| f(x) + J(x)\Delta(x) \|^2 \quad \text{s.t. } \| \Delta x \| < K \quad (26)$$

where K>0 is the trust region radius (spherical trust region). LM can be interpreted as a strategy that switches between gradient descent and Gauss-Newton variant when necessary. It does so by introducing a dampening factor λ, which controls the behavior of the descent. Large values of the residual cause the algorithm to behave like gradient descent and therefore quickly approaches the solution from a distance. As the residuals decrease, LM switch to a trust-region variant of Gauss-Newton, thereby not slowing down as it approaches the optimal point. It is also superior to Gauss-Newton as it accounts for the approximated Hessian with λ, and is well behaved even when J(x) is rank deficient.

The step update rule for LM is $x_k=x+\Delta x$ and the weighted and unweighted normal equations for LM can be respectively found using:

$$\Delta x = -\left(\left(J(x)^T J(x) + \lambda I\right)\right)^{-1} J(x)^T f(x) \tag{27}$$

$$\Delta x = -\left(\left(J(x)^T W J(x) + \lambda I\right)\right)^{-1} J(x)^T W f(x)$$

The update step is then applied to the current estimate x until the convergence criteria is met or a maximum number of iterations is reached.

Generally, monocular SLAM architectures are either filter-based, such as using a Kalman filter, or Keyframe-based, relying on numerical optimization methods. In a filter-based framework, the camera pose and the entire state of all landmarks in the map are tightly joined and need to be updated at every frame, limiting the tractability of the filter to small environments. On the other hand, in a Keyframe based approach, the problem can be split into two parallel processes: pose tracking on the front-end, and mapping on the backend. The frontend is typically responsible for image processing, frame-to-frame pose tracking and Keyframe selection, where Keyframes are frames that were flagged according to some predefined criteria and used to propagate the scene reconstruction in the backend.

Generally, design of a keyframe-based SLAM (KSLAM) approach requires the treatment of seven main components, summarized in FIG. 1: (1) matching paradigm, (2) data association, (3) visual initialization, (4) pose estimation, (5) topological/metric map generation, (6) bundle adjustment (BA)/pose graph optimization (PGO)/map maintenance, and (7) global localization.

Landmarks extracted from images can be categorized into two paradigms: feature-based (Indirect) or pixel-based (Direct). While both operate on data extracted from a video feed, each paradigm processes the input differently, leading to a different but often complementary set of properties.

Direct methods use raw pixel intensities as inputs: no intermediate image representation is computed, hence the naming Direct. Direct methods can be dense, semi-dense, or sparse. Dense methods exploit the information available at every pixel, semi-dense methods exploit the information from pixels at which the gradient of image brightness is significant, and sparse methods use a relatively small set of sampled pixels with strong response to some metric such as Harris corner detector, FAST, etc. The basic underlying principle for all direct methods is known as the brightness constancy constraint and is best described as:

$$J(x, y, t) = I(x + u(x, y),\ y + v(x, y),\ t + 1) \tag{28}$$

where x and y are pixel coordinates; u and v denote displacement functions of the pixel (x, y) between two images I and J of the same scene taken at time t and t+1 respectively. In some cases, all the individual pixel displacements u and v can be replaced by a single general motion model W (x,y,p), in which the number of parameters is dependent on the implied type of motion. For example, if the number of parameters is 2, the system reduces to computing optical flow. This approach iteratively minimizes the squared pixel-intensity difference between the two images over the transformation parameters p:

$$\underset{p}{\operatorname{argmin}} \sum_{x,y} [I(W(x, y, p)) - J(x, y)]^2 \tag{29}$$

where W(., ., p) is a warping transform that encodes the relationship relating the two images and p corresponds to the parameters of the transform. Equation (29) is non-linear and requires an iterative non-linear optimization process, solved using either Gauss-Newton or LM optimizations. Other approaches, with different computational complexities, can also be used.

Feature-based methods process 2D images to extract salient geometric primitives such as Keypoints (corners), edges, lines, etc. The pixel patterns surrounding these features are manipulated to generate descriptors as a quantitative measure of similarity to other features, after which, the image itself becomes obsolete. Extracted features are expected to be distinctive and invariant to viewpoint and illumination changes, as well as resilient to blur and noise. On the other hand, it is desirable for feature extractors to be computationally efficient and fast. Unfortunately, such objectives are hard to achieve simultaneously, a trade-off between computational speed and feature quality is required.

Different from the direct and feature-based methods, hybrid approaches can be used. These approaches use a combination of both direct and feature-based methods to refine the camera pose estimates, or to generate a dense/semi-dense map.

Data association is defined as the process of establishing measurement correspondences across different images; while it is implicit for direct methods, it is explicitly done in feature-based methods using either 2D-2D, 3D-2D, or 3D-3D correspondences.

In 2D-2D correspondence, the 2D feature's location in an image $I_2$ is sought, given its 2D position in a previously acquired image I. Depending on the type of information available, 2D-2D correspondences can be established in one of two ways: when a map is not available, and neither the camera transformation between the two frames nor the scene structure is available, 2D-2D data association is established through a large search window surrounding the feature's location from $I_1$ in $I_2$. On the other hand, when the transformation relating $I_1$ and $I_2$ is known, 2D-2D data correspondences are established through Epipolar geometry, where a feature in $I_1$ is mapped to a line in $I_2$, and the two dimensional search window collapses to a one dimensional search along a line. This latter case often occurs when the system is triangulating 2D features into 3D landmarks during map generation. To limit the computational expenses, a bound is imposed on the search region along the Epipolar line. In both approaches, each feature has associated with it a descriptor, which can be used to provide a quantitative measure of similarity to other features. The descriptor similarity measure varies with the type of descriptors used; for example, for a local patch of pixels descriptor, it is typical to use the Sum of Squared Difference (SSD), or a Zero-Mean SSD score (ZMSSD) to increase robustness against illumination changes. For higher order feature descriptors, the L1-norm, the L2-norm can be used, and for binary descriptors, the Hamming distance is employed. Establishing matches using these measures is computationally intensive and may, if not carefully applied, degrade real-time performance.

In 3D-2D data association, the system seeks to estimate correspondences between 3D previously triangulated landmarks and their 2D projections onto a newly acquired frame, without the knowledge of the new camera pose. This type of data association is typically used during the pose estimation phase of KSLAM. To solve this problem, previous camera poses are exploited to yield a hypothesis on the new camera pose, in what is referred to as motion models, and accordingly project the 3D landmarks onto that frame. 3D-2D data association then proceeds similarly to 2D-2D feature matching, by defining a search window surrounding the projected location of the 3D landmarks.

3D-3D data association is typically employed to estimate and correct accumulated drift along loops: when a loop closure is detected, descriptors of 3D landmarks, visible in both ends of the loop, are used to establish matches among landmarks that are then exploited to yield a similarity transform between the frames at both ends of the loop.

Monocular cameras are bearing-only sensors, that is, they cannot directly perceive depth from a single image; nevertheless, up to scale depth can be estimated via temporal stereoscopy after observing the same scene through at least two different viewpoints. During initialization, neither pose nor structure are known, and KSLAM requires a special initialization phase, during which both a map of 3D landmarks, and the initial camera poses are generated. After KSLAM is initialized, camera pose and 3D structure build on each other, in a heuristic manner, to propagate the system in time by expanding the map to previously unobserved scenes, while keeping track of the camera pose in the map.

To initialize a generic KSLAM approach, generally the system must simultaneously recover the camera pose and the 3D scene structure; yielding either an Essential matrix or a Homography matrix. However, the elimination of depth has significant ramifications on the recovered data, since the exact camera motion between the two views cannot be recovered: the camera translation vector is recovered up to an unknown scale A. Since the translation vector between the two views defines the baseline used to triangulate the 3D landmarks, scale loss also propagates to the recovered 3D landmarks, yielding a scene that is also scaled by A. Furthermore, the decomposition of the Essential or Homography matrix yields multiple solutions, of which only one is physically feasible and is disambiguated from the others through Cheirality checks. The solutions are also degenerate in certain configurations, such as when the observed scene is planar in the case of Essential matrix, and non-planar in the case of a Homography. To mitigate degenerate cases, random depth initialization initializes a KSLAM by randomly assigning depth values with large variance to a single initializing Keyframe. The random depth is then iteratively updated over subsequent frames until the depth variance converges. Random depth initialization is usually employed in the direct framework, however they are generally brittle and require slow translation-only motion while observing the same scene to converge.

Because data association is computationally expensive, other monocular SLAM systems generally assume for the pose of each new frame a prior, which guides and limits the amount of work required for data association. Estimating this prior is generally the first task in pose estimation: a map and data association between two frames are known, and the system seeks to estimate the pose of the second frame given the pose of the first. Most systems employ a constant velocity motion model that assumes a smooth camera motion across the recently tracked frames to estimate the prior for the current frame. Some systems assume no significant change in the camera pose between consecutive frames, and hence they assign the prior for the pose of the current frame to be the same as the previously tracked one.

The pose of the prior frame is used to guide the data association in several ways. It helps determine a potentially visible set of features from the map in the current frame, thereby reducing the computational expense of blindly projecting the entire map. Furthermore, it helps establish an estimated feature location in the current frame, such that feature matching takes place in small search regions, instead of across the entire image. Finally, it serves as a starting point for the minimization procedure, which refines the camera pose.

Direct and feature-based approaches estimate the camera pose by minimizing a measure of error between frames. Direct approaches measure the photometric error, modeled as the intensity difference between pixels. In contrast, indirect approaches measure the re-projection error of landmarks from the map over the frame's prior pose. The re-projection error is formulated as the distance in pixels between a projected 3D landmark onto a frame, and its corresponding 2-D position in the image.

A motion model is used to seed the new frame's pose at $C_m$, and a list of potentially visible 3D landmarks from the map are projected onto the new frame. Data association takes place in a search window $S_w$ surrounding the location of the projected landmarks. The system then proceeds by minimizing the re-projection error $e_j$ over the parameters of the rigid body transformation. To gain robustness against outliers, the minimization takes place over an objective function that penalizes features with large re-projection errors. The camera pose optimization problem is then defined as:

$$T_i = \underset{T_i}{\operatorname{argmin}} \sum_j Obj(e_j) \tag{30}$$

where $T_i$ is a minimally represented Lie group of either Sξ(3) or sim(3) camera pose, Obj(•) is an objective function and $e_j$ is the error defined through data association for every matched feature j in the image.

The system then decides whether the new frame should be flagged as a Keyframe or not. A Keyframe is a special frame used for expanding the map. The decisive criteria can be categorized as either significant pose change or significant scene appearance change. The decision is usually made through a weighted combination of different criteria; examples of such criteria include: a significant change in the camera pose measurements (rotation and/or translation), the presence of a significant number of 2D features that are not observed in the map, a significant change in what the frame is observing (by monitoring the intensity histograms or optical flow), the elapsed time since the system flagged its latest Keyframe.

Generally, VSLAM systems employ two different types of map representations, namely metric and topological representations. For the metric map, map generation generates a representation of the previously unexplored, newly observed environment. Typically, the map generation module represents the world as a dense/semi-dense (for direct) or sparse (for feature-based methods) cloud of points. As different viewpoints of an unexplored scene are registered with their corresponding camera poses, the map generation triangulates 2D points into 3D landmarks; also it keeps track of their 3D coordinates, and expands the map within what is referred to as a metric representation of the scene.

In a metric map, the structure of new 3D landmarks is recovered from a known transformation between two frames at different viewpoints, using their corresponding data associations. Since data association is prone to erroneous measurements, the map generation can also be responsible for the detection and handling of outliers, which can potentially destroy the map. Due to noise in data association and pose estimates of the tracked images, projecting rays from two associated features will most likely not intersect in 3D space. To gain resilience against outliers and to obtain better accuracy, triangulation can be performed over features associated across more than two views. Triangulation by optimization as described by $$X = \underset{[x,y,z]}{\operatorname{argmin}} \sum_n e_n \tag{31}$$

which aims to estimate a landmark position [x, y, z] from its associated 2D features across n views, by minimizing the sum of its re-projection errors $e_n$ in all Keyframes $I_n$ observing it.

Filter based landmark triangulation recovers the 3D position of a landmark by first projecting into the 3D space, a ray joining the camera center of the first Keyframe observing the 2D feature and its associated 2D coordinates. The projected ray is then populated with a filter having a uniform distribution ($D_1$) of landmark position estimates, which are then updated as the landmark is observed across multiple views. The Bayesian inference framework continues until the filter converges from a uniform distribution to a Gaussian featuring a small variance ($D_3$). Filter-based triangulation results in a delay before an observed landmark's depth has fully converged, in contrast to triangulation by optimization, that can be used as soon as the landmark is triangulated from two views. To overcome this delay and exploit all the information available from a feature that is not yet fully triangulated, an inverse depth parametrization for newly observed features, with an associated variance that allows for 2D features to contribute to the camera pose estimate, as soon as they are observed.

As the camera explores large environments, metric maps suffer from the unbounded growth of their size, thereby leading to system failure. Topological maps were introduced to alleviate this shortcoming, by forfeiting geometric information in favor for connectivity information. In its most simplified form, a topological map consists of nodes corresponding to locations, and edges corresponding to connections between the locations. In the context of monocular SLAM, a topological map is an undirected graph of nodes that typically represents Keyframes linked together by edges, when shared data associations between the Keyframes exists. In spite of the appeal of topological maps in scaling well with large scenes, metric information is still required in order to maintain camera pose estimates. The conversion from a topological to a metric map is not always trivial, and for this reason, hybrid maps can be used, which are simultaneously metric and topological. The implementation of a hybrid (metric-topological) map representation allows for efficient solutions to loop closures and failure recovery using topological information and increases efficiency of the metric pose estimate, by limiting the scope of the map to a local region surrounding the camera. A hybrid map allows for local optimization of the metric map, while maintaining scalability of the optimization over the global topological map Map maintenance takes care of optimizing the map through either Bundle Adjustment (BA) or Pose Graph Optimization (PGO). During map exploration, new 3D landmarks are triangulated based on the camera pose estimates. After some time, system drift manifests itself in wrong camera pose measurements due to accumulated errors in previous camera poses that were used to expand the map; therefore, maintenance is generally required to cater for such mode of failure. Map maintenance may also be responsible for updating the connections between nodes in the topological map. When a new Keyframe is added into systems that employ hybrid maps, their topological map is updated by incorporating the new Keyframe as a node, and searching for data associations between the newly added node and surrounding ones; edges are then established to other nodes (Keyframes) according to the found data associations.

Bundle adjustment (BA) is the problem of refining a visual reconstruction to jointly produce an optimal structure and coherent camera pose estimates. BA is an optimization that minimizes the cost function defined by:

$$\underset{T,X}{\operatorname{argmin}} \sum_{i=1}^{N} \sum_{j \in S_i} Obj(e(T_i, X_j)) \tag{32}$$

where $T_i$ is a Keyframe pose estimate and N is the number of Keyframes in the map. $X_j$ corresponds to the 3D pose of a landmark and $S_i$ represent the set of 3D landmarks observed in Keyframe i. Finally, $e(T_i, X_j)$ is the re-projection error of a landmark $X_j$ on a Keyframe $T_i$, in which it is observed.

Bundle adjustment is computationally involved and intractable if performed on all frames and all poses. The breakthrough that enabled its application in real time is the notion of Keyframes, where only select special frames, known as Keyframes, are used to perform map expansion and optimization. Different algorithms apply different criteria for Keyframe selection, as well as different strategies for BA. Some strategies include jointly, a local (over a local number of Keyframes) LBA, and global (over the entire map) GBA optimizations. Other strategies argue that an LBA only is sufficient to maintain a good quality map. To reduce the computational expenses of bundle adjustment, the monocular SLAM map can be represented by both a Euclidean map for LBA, and a topological map for pose graph optimization that explicitly distributes the accumulated drift along the entire map. PGO can be represented as the process that optimizes over only the Keyframe pose estimates:

$$\underset{T}{\operatorname{argmin}} \sum_{i=1}^{N} \sum_{j \in S_i} Obj(e(T_i, X_j)) \tag{33}$$

Map maintenance can also be responsible for detecting and removing outliers in the map due to noisy and faulty matched features. While the underlying assumption of most monocular SLAM algorithms is that the environment is static, some algorithms such as RD SLAM exploit map maintenance methods to accommodate slowly varying scenes (lighting and structural changes).

Global localization is required when the camera loses track of its position and is required to situate itself in a global map. Failure recovery and loop closure are both considered a form of global localization. It is noteworthy to mention that loop closure and failure recovery evolve around the same problem, and solutions to any of them could be used for the other.

For failure recovery, whether due to wrong user movement, such as abrupt changes in the camera pose, motion blur, or due to observing a featureless region, or for any other reason, monocular SLAM approaches will eventually fail. Accordingly, the system needs to correctly recover from such failures. The failure problem can be described as a lost camera pose that needs to re-localize itself in the map it had previously created of its environment before failure. Some systems perform failure recovery by generating a bag of visual words (BOVW) representation of the image. The intermediate representation maps the images space onto a feature space made of visual words. The space of visual words is generated offline by clustering descriptors into a KD-Tree, where tree leaves are considered visual words. Failure recovery then proceeds by searching for "closest looking" previously observed Keyframe through either a probabilistic appearance based model or through geometric consistency check in the topological map.

For loop closure, since KSLAM is an optimization problem, it is prone to drifts in camera pose estimates. Returning to a certain pose after an exploration phase may not yield the same camera pose measurement, as it was at the start of the run. Such camera pose drift can also manifest itself in a map scale drift, which will eventually lead the system to erroneous measurements, and fatal failure. In an effort to correct for drift and camera pose errors, the system can detect loop closures in an online SLAM session, and optimize the loop's track and all its associated map data, using either PGO or BA. Upon the insertion of a new Keyframe, a loop is sought by looking for a connection to previously observed nodes and establishing a similarity transform sim3 that relates both ends of the loop.

Direct methods can make use of virtually all image pixels with an intensity gradient in the image and are therefore more robust than feature-based methods in regions with poor texture and blur. It naturally handles points at infinity and points observed with small parallax using the inverse depth parametrization, and since no explicit data association is required, it can have semi-dense or sparse scene representations. More importantly, the photometric error can be interpolated over the image domain resulting in an image alignment with sub-pixel accuracy and relatively less drift than feature-based methods as shown in direct sparse odometry (DSO).

On the other hand, direct methods are susceptible to scene illumination changes, due to the violation of the underlying brightness consistency assumption in Equation (1). In an effort to gain resilience against this mode of failure, DSO models the image formation process, and attempts to incorporate the scene irradiance in the energy functional, at the expense of adding a calibrated image formation model which is used to correct the images at a pre-processing step.

Furthermore, during the non-linear optimization process, Equation (29), is linearized through a first order Taylor expansion. While the linearization is valid when the parameters of the warping transform tends to zero, higher order terms becomes dominant and the linearization becomes invalid for large transforms. Therefore, a second disadvantage of direct methods is the assumption of small motions between the images (typically not more than 1 pixel). To relax this constraint, direct monocular SLAM systems can employ a pyramidal implementation, where the image alignment process takes place sequentially from the highest pyramid level to the lowest, using the results of every level as a prior to the next level. They also suggest the usage of high fame rate cameras to alleviate this issue; some systems employ an efficient second order minimization (ESM) to estimate a rotation prior that helps increase the convergence radius. Despite these efforts, the tolerated baseline for data association in direct methods is considerably smaller than the tolerated baseline in feature-based methods.

Another disadvantage of direct methods is that the calculation of the photometric error at every pixel is computationally intensive; therefore, real-time monocular SLAM applications of direct methods are generally not particularly feasible. Additionally, direct methods do not naturally allow for loop closures detection nor failure recovery (probabilistic appearance based methods are required), they are brittle against any sources of outliers in the scene (dynamic objects, occlusions), and require a spatial regularization when a semi-dense representation is employed. Most importantly, they become intractable for very large scene exploration scenarios and hence are mostly limited to odometry systems. Further, direct methods suffer from the rolling shutter effect. When a rolling shutter camera is used (such as on most smartphones), the image is serially generated, which induces some time delay between different parts of the image. When the camera is moving, this delay causes a geometric distortion known as the rolling shutter effect. Since direct methods integrate over areas in the image domain without accounting for this effect, their accuracy drops significantly in rolling shutter cameras. Indirect methods do not suffer from such limitations as features are discrete points and not areas in the image plane.

Feature-based methods can handle relatively large baselines between frames and tolerate, to an extent, illumination changes. When compared to direct methods, they have a relatively compact scene representation that allows for failure recovery, loop closure, and global/local optimizations. However, the extraction processes that makes them resilient to these factors are generally computationally expensive. For real-time operation constraints, most systems employ a trade-of between a feature type to use in one hand, and the robustness and resilience to environment factors on the other. To mitigate this constraint, other systems resort to parallelized GPU implementations for feature detection and extraction. On the other hand, the density of the features is inversely correlated with the data association performance. As the density of the extracted features increases, their distinctiveness decreases, leading to ambiguous feature matches; therefore, feature-based methods are limited to sparse representations. Their performance is brittle in low textured or self-repeating environments and are unstable for far-away features, or when using features that have been observed with a small parallax. More importantly, data association in feature based methods is established between features extracted at discretized locations in the images, resulting in an inferior accuracy and larger drift than the direct framework.

Another disadvantage of feature-based methods is that even the top performing feature descriptors are limited in the amount of scene change (lighting and viewpoint) they can handle before failure. Feature matching is also prone to failure in similar-self-repeating texture environments, where a feature in $I_1$ can be ambiguously matched to multiple other features in $I_2$. Outliers in the data association module can heavily degrade the system performance by inducing errors in both the camera poses and the generated map until the point of failure.

In general, establishing data associations remains one of the biggest challenges in KSLAM. Systems that limit the search range along the Epipolar line using the observed depth information implicitly assume a relatively smooth depth distribution. Violating this assumption (i.e., when the scene includes significance variance in the observed depth) causes the 2D features corresponding to potential future 3D landmarks to fall outside the boundaries of the Epipolar segment, and the system ends up neglecting them. Other limitations for data association arise from large erratic accelerations in the camera's motion, also causing features to fall outside the scope of the search window. Such a scenario is common in real-life applications and when the camera is operated by an untrained user. Image pollution with motion blur also negatively impacts the performance of data association methods to the point of failure.

Erroneous data association is also a very common problem that can cause false positives in self repeating environments. Most current implementations of data association address this problem through a bottom-up approach, where low level information from image pixels or from features, is used to establish correspondences. To mitigate some of these issues, use of geometric features of a higher level can attempt to be used, such as lines, super-pixels, or planar features, or priors on 3D shapes in the scene.

Aside from the random depth initialization of large-scale direct (LSD) SLAM and DSO, all the suggested methods described above suffer from degeneracies under certain conditions, such as under low-parallax movements of the camera, or when the scene's structure assumption is violated: the fundamental matrix's assumption for general non-planar scenes or the homography assumption of planar scenes.

Parallel Tracking and Mapping (PTAM) initialization procedure is brittle and remains tricky to perform, especially for inexperienced users. Furthermore, it is subject to degeneracies when the planarity of the initial scene's assumption is violated, or when the user's motion is inappropriate; thereby crashing the system, without means of detecting such degeneracies. As is the case in PTAM, the initialization of semi-direct visual odometry (SVO) requires the same type of motion and is prone to sudden movements, as well as to non-planar scenes. Furthermore, monitoring the median of the baseline distance between features is not a good approach to automate the initial Keyframe pair selection, as it is prone to failure against degenerate cases, with no means of detecting them.

The model based initialization of Oriented FAST and Rotated BRIEF (ORB) SLAM attempts to automatically initialize the system by monitoring the baseline and the scene across a window of images. If the observed scene is relatively far, while the camera slowly translates in the scene, the system is not capable of detecting such scenarios, and fails to initialize.

While a random depth initialization from a single image does not suffer from the degeneracies of two view geometry methods, the depth estimation requires the processing of subsequent frames to converge, resulting in an intermediate tracking phase where the generated map is not reliable. It requires slow sideway-translational motion, and the convergence of the initialization is not guaranteed.

Systems relying on constant motion models, such as PTAM and ORB SLAM are prone to tracking failure when abrupt changes in the direction of the camera's motion occurs. While they both employ a recovery from such failures, PTAM's tracking performance is exposed to false positive pose recovery; as opposed to ORB SLAM that first attempts to increase the search window before invoking its failure recovery module. Another limitation of feature-based pose estimation is the detection and handling of occlusions. As the camera translates in the scene, some landmarks in the background are prone to occlusions from objects in the foreground. When the system projects the 3D map points onto the current frame, it fails to match the occluded features, and counts them toward the camera tracking quality assessment. In extreme cases, the tracking quality of the system might be deemed bad and tracking failure recovery procedures are invoked even though camera pose tracking did not fail. Furthermore, occluded points are flagged as outliers and passed to the map maintenance module to be removed, depriving the map from valid useful landmarks that were erroneously flagged due to occlusions in the scene.

Systems that use the previously tracked pose as a prior for the new frame's pose are also prone to the same limitations of constant velocity models. Furthermore, they require small displacements between frames, limiting their operation to relatively expensive high frame-rate cameras (typically >70 fps) such that the displacement limitation is not exceeded. Another limitation of these methods is inherent from their use of direct data association. Their tracking module is susceptible to variations in the lighting conditions. To gain some resilience to lighting changes in direct methods, an off-line photometric calibration process can be used to parametrize and incorporate lighting variations within the camera pose optimization process A common limitation that plagues most tracking modules is the presence of dynamic objects in the observed environment. As most KSLAM systems assume a static scene, the tracking modules of most systems suffer from tracking failures: a significantly large dynamic object in the scene could trick the system into thinking that the camera itself is moving, while it did not move relative to the environment. Small, slowly moving objects can introduce noisy outlier landmarks in the map and require subsequent processing and handling to be removed. Small, fast moving objects on the other hand, don't affect the tracking module as much. 2D features corresponding to fast moving small objects tend to violate the epipolar geometry of the pose estimation problem, and are easily flagged and removed from the camera pose optimization thread; however, they can occlude other landmarks. To address the effects of occlusions and dynamic objects in the scene, for slowly varying scenes, the system can sample based on previous camera pose locations in the image that are not reliable, and discard them during the tracking phase.

A major limitation in N-view triangulation is the requirement of a significant baseline separating two viewpoints observing the same feature. Hence, it is prone to failure when the camera's motion is made of pure rotations. To counter such modes of failure, deferred triangulation (DT) SLAM introduced 2D landmarks that can be used to expand the map during pure rotations, before they are triangulated into 3D landmarks. However, the observed scene during the rotation motion is expected to be re-observed with more baseline, for the landmarks to transition from 2D to 3D. Unfortunately, in many applications this is not the case; for example, a camera mounted on a car making a turn cannot re-observe the scene, and eventually tracking failure occurs. DT SLAM addresses such cases by generating a new sub map and attempts to establish connections to previously created sub-maps by invoking a thread to look for similar Keyframes across sub-maps, and establish data associations between them. In the meantime, it resumes tracking in the new world coordinate frame of the new sub-map. This, however, renders the pose estimates obsolete; at every tracking failure the tracking is reset to the new coordinate frame, yielding useless pose estimates until the sub-maps are joined together, which may never occur.

In filter based triangulation, outliers are easily flagged as landmarks whose distribution remain approximately uniform after a number of observations have been incorporated in the framework. This reduces the need for a subsequent processing step to detect and handle outliers. Also, landmarks at infinity suffer from parallax values that are too small for triangulation purposes; but yet, can be used to enhance the camera's rotation estimates, and kept in the map, and are transitioned from infinity to the metric map, when enough parallax between the views observing them is recorded. However, these benefits come at the expense of increased complexity in implementing a probabilistic framework, which keeps track and updates the uncertainty in the feature depth distribution. Furthermore, while the dense and semi-dense maps can capture a much more meaningful representation of a scene than a sparse set of 3D landmarks, the added value is diminished by the challenges of handling immense amounts of data in 3D. Hence, there is a need for additional higher level semantic information to reason about the observed scene, and to enhance the system's overall performance. While monocular SLAM systems have been shown to improve the results of semantic labeling, the feedback from the latter to the former remains a challenging problem.

Pose Graph Optimization (PGO) returns inferior results to those produced by global bundle adjustment (GBA), while PGO optimizes only for the Keyframe poses; and accordingly adjusts the 3D structure of landmarks. GBA and local bundle adjustment (LBA) jointly optimize for both Keyframe poses and 3D structure. The stated advantage comes at the cost of computational time, with PGO exhibiting significant speed up compared to the other methods. PGO is often employed during loop closure as the computational cost of running a full BA is often intractable on large-scale loops; however, pose graph optimization may not yield optimal result if the errors accumulated over the loop are distributed along the entire map, leading to locally induced inaccuracies in regions that were not originally wrong.

For successful re-localization or loop detection, global localization methods employed by PTAM, SVO and DT SLAM require the camera's pose to be near the previously seen Keyframe's pose, and would otherwise fail when there is a large displacement between the two. Furthermore, they are highly sensitive to any change in the lighting conditions of the scene, and may yield many false positives when the observed environment is composed of self-repeating textures. On the other hand, methods that rely on BoVW representations are more reliable; however, BoVW do not keep track of the feature's geometric distribution in the image. This is especially detrimental in self-repeating environments and require subsequent geometric checks to prevent outliers. Furthermore, the high dimensional features are susceptible to failure when the training set recorded in the BoVW dictionary is not representative of the working environment in which the system is operating.

The benefits and disadvantages of both feature-based and direct frameworks provide a pattern of complementary traits. For example, direct methods require small baseline motions to ensure convergence, whereas feature-based methods are more reliable at relatively larger baselines. Furthermore, due to sub-pixel alignment accuracy, direct methods are relatively more accurate but suffer from an intractable amount of data in large environments. On the other hand, feature-based methods suffer from relatively lower accuracies due to the discretization of the input space but have a suitable scene representation for a SLAM formulation, which enables feature-based methods to easily maintain a reusable global map, perform loop closures and failure recovery. Therefore, the present inventors identified that an advantageous approach exploits both direct and feature-based to benefit from the direct formulation accuracy and robustness while making use of feature-based methods for large baseline motions; maintaining a reusable global map and reducing drifts through loop closures. Furthermore, a hybrid feature-based-direct framework allows for the metric representation to be locally semi-dense and globally sparse, facilitating interactions with other types of representations such as topological and/or semantic, while maintaining scalability and computational tractability.

When a VO system is calibrated photometrically, and images are captured at high rates, direct methods outperform feature-based ones in terms of accuracy and processing time; they are also more robust to failure in feature-deprived environments. On the downside, direct methods rely on heuristic motion models to seed an estimate of camera motion between frames. In the event that these models are violated (such as with erratic motion), direct methods easily fail. In real-life applications, the motion of a hand-held or head-mounted camera is predominantly erratic thereby violating the motion models used, causing large baselines between the initializing pose and the actual pose, which in turn negatively impacts the VO performance.

If the camera used is not a consumer device but closer to a commercial sensor, robustifying Direct VO to real-life scenarios becomes of utmost importance. In that pursuit, Feature Assisted Direct Monocular Odometry (FDMO) is a hybrid VO that makes use of Indirect residuals to seed the Direct pose estimation process. There are generally two variations of FDMO: one that only intervenes when failure in the Direct optimization is detected, and another that performs both Indirect and Direct optimizations on every frame. Various efficiencies are also introduced to both the feature detector and the Indirect mapping process, resulting in a computationally efficient approach.

The VO problem formulates camera pose estimation as an iterative optimization of an objective function. Central to each optimization step is data association, where cues (features) from a new image are corresponded to those found in previous measurements. The type of cues used split VO systems along three different paradigms: Direct, Indirect, or a hybrid of both, with each using its own objective function and exhibiting dissimilar but often complementary traits. An underlying assumption to all paradigms is the convexity of their objective functions, allowing for iterative Newton-like optimization methods to converge. However, none of the objective functions are convex; and to relax this limitation, VO systems assume local convexity and employ motion models to perform data association, as well as to seed the optimization. Some motion models include a constant velocity model (CVMM) or a zero motion model; or, in the case the CVMM fails, a combination of random motions.

In real-life applications (such as with Augmented Reality), the motion of a hand-held or head-mounted camera is predominantly erratic, easily violating the assumed motion models, and effectively reducing the VO performance from what is typically reported in most benchmark experiments.

In fact, erratic motions can be viewed as a special case of large motions that induces discrepancies between the assumed motion model and the actual camera motion. The error induced is also further amplified when a camera is arbitrarily accelerating or decelerating with low frame-rates, causing errors in the VO data association and corresponding optimization. Similar effects are observed when the computational resources are slow, and VO cannot add keyframes in time to accommodate fast motions; VO is then forced to perform pose estimation across keyframes separated by relatively large distances.

The impact large motions can have depends on various components of a VO; namely, on the resilience of the data association step, on the radius of convergence of the objective function, and on the ability of the VO system to detect and account for motion model violations. In an effort to handle large baseline motions, FDMO performs photometric image alignment for pose estimation at frame-rate, and invokes an Indirect pose estimation only when tracking failure is detected. The reason for not using Indirect measurements on every frame in FDMO is to avoid the large computational costs associated with extracting features; as a consequence, FDMO maintains the computational efficiency of Direct methods but requires a heuristic approach to detect local minima in the Direct objective function optimization. To alleviate the need for a heuristic failure detection approach, a variant FDMO-f (Feature Assisted Direct Monocular Odometry at Frame-rate) can also be used. In FDMO-f, the expensive computational cost associated with feature extraction is overcome by an efficiently parallelizable feature detector, allowing the use of both types of measurements sequentially on every frame, and requiring various modifications to the overall architecture of the VO system. The contributions of FDMO includes:

- The ability to use both Direct and Indirect residuals when needed, or on every frame via a computationally cheap feature detector.
- Resilience to large baseline motions.
- Achieves the sub-pixel accuracy of Direct methods.
- Maintains the robustness of Direct methods to feature-deprived environments.
- A computationally efficient Indirect mapping approach.
- An experimental procedure designed to evaluate the robustness of VO to large baseline motions.

While various hybrid (Direct and Indirect) systems have been used, integrating the advantages of both paradigms remains a substantial challenge. For example, not extracting feature descriptors and instead relying on the direct image alignment to perform data association between the features. While this can lead to significant speed-ups in the processing required for data association, it may not handle large baseline motions. As a result, it may be limited to high frame-rate cameras, which ensures frame-to-frame motion is small. In other cases, a feature-based approach can be used as a front-end, and subsequently optimize the measurements with a direct image alignment. In this way, both systems suffer from the limitations of the feature-based framework, i.e. they are subject to failure in feature-deprived environments and therefore not able to simultaneously meet all of the desired traits. To address this issue, such systems often resort to stereo cameras.

FDMO complements the advantages of both direct and featured based techniques to achieve sub-pixel accuracy, robustness in feature deprived environments, resilience to erratic and large inter-frame motions, all while maintaining a low computational cost at frame-rate. Efficiencies are also introduced to decrease the computational complexity of the feature-based mapping part. FDMO shows an average of 10% reduction in alignment drift, and 12% reduction in rotation drift when compared to the best of both ORB-SLAM and DSO, while achieving significant drift (alignment, rotation & scale) reductions (51%, 61%, 7% respectively) going over the same sequences for a second loop. FDMO was further evaluated on the EuroC dataset and was found to inherit the resilience of feature-based methods to erratic motions, while maintaining the accuracy of direct methods.

To capitalize on the advantages of both feature-based and direct frameworks, FDMO consists of a local direct visual odometry, assisted with a feature-based map, such that it may resort to feature-based odometry only when necessary. Therefore, FDMO does not need to perform a computationally expensive feature extraction and matching step at every frame. During its feature-based map expansion, FDMO exploits the localized keyframes with sub-pixel accuracy from the direct framework, to efficiently establish feature matches in feature-deprived environments using restricted epipolar search lines. Similar to DSO, FDMO's local temporary map is defined by a set of seven direct-based keyframes and 2000 active direct points. Increasing these parameters was found to significantly increase the computational cost without much improvement in accuracy. The feature-based map is made of an undetermined number of keyframes, each with an associated set of features and their corresponding ORB descriptors $\Phi(x, Q(x))$.

In the following, the superscript d will be assigned to all direct-based measurements and f for all feature-based measurements; not to be confused with underscript f assigned to the word frame. Therefore, $M^d$ refers to the temporary direct map, and $M^f$ to the feature-based map, which is made of an unrestricted number of keyframes $K^f$ and a set of 3D points $X^f$. $I_{f_i}$ refers to the image of frame i and $T_{f_i,KF^d}$ is the se (3) transformation relating frame i to the latest active keyframe KF in the direct map. We also make the distinction between z referring to depth measurements associated with a 2D point x and Z referring to the Z coordinate of a 3D point. Finally, the symbol $\pi$ is used to denote the pinhole projection function mapping a point from the camera coordinate frame to the image coordinate frame.

For direct image alignment, newly acquired frames are tracked by minimizing:

$$\underset{T_{f_i,KF^d}}{\operatorname{argmin}} \sum_{x^d} \sum_{x \in N(x^d)} Obj\left(I_{f_i}\left(\omega\left(x, z, T_{f_i,KF^d}\right) - I_{KF^d}(x, z)\right)\right) \tag{34}$$

where $f_i$ is the current frame, $KF^d$ is the latest added keyframe in $M^d$, $x^d \in \Omega I_f$ is the set of image locations with sufficient intensity gradient and an associated depth value d. $N(x^d)$ is the set of pixels neighbouring $x^d$ and $w(\bullet)$ is the projection function that maps a 2D point from $f_i$ to $KF^d$.

The minimization is seeded from a constant velocity motion model (CVMM). However, erratic motion or large motion baselines can easily violate the CVMM, erroneously initializing the highly-non convex optimization, and yielding unrecoverable tracking failure. Tracking failure can be detected by monitoring the RMSE of Equation (34) before and after the optimization. If the ratio $$\frac{RMSE_{after}}{RMSE_{before}} > 1 + \epsilon,$$

the optimization has diverged and the feature-based tracking recovery can be used. The $\epsilon$ is used to restrict feature-based intervention when the original motion model used is accurate, a value of $\epsilon=0.1$ was found as a good trade-off between continuously invoking the feature-based tracking and not detecting failure in the optimization. In some cases, to avoid extra computational cost, feature extraction and matching is not performed on a frame-by-frame basis, and is only invoked during feature-based tracking recovery and feature-based keyframe (KF) insertion.

FDMO feature-based tracking operates in $M^f$. When direct tracking diverges, FDMO considers the CVMM estimate to be invalid and seeks to estimate a new motion model using the feature-based map. Feature-based tracking recovery is a variant of global re-localization. $\Phi f_i=\Phi(x^f, Q(x^f))$ is detected in the current image, which are then parsed into a vocabulary tree. Since the CVMM is considered invalid, the last piece of information the system was sure of before failure is used; i.e., the pose of the last successfully added keyframe. A set $\kappa^f$ of feature-based keyframes $KF^f$ connected to the last added keyframe $KF_d$ through a covisibility graph, and their associated 3D map points $X^f$.

Blind feature matching is then performed between $\Phi f_i$ and all keyframes in $\kappa^f$, by restricting feature matching to take place between features that exist in the same node in a vocabulary tree. This is done to reduce the computational cost of blindly matching all features. Once data association is established between $f_i$ and the map points, an EPnP (Efficient Perspective-n-Point Camera Pose Estimation) is used to solve for an initial pose $T_{f_i}$ using 3D-2D correspondences in an non-iterative manner. The new pose is then used to define a 5×5 search window in $f_i$ surrounding the projected locations of all 3D map points $X^f\in\kappa^f$. Finally, the pose $T_{f_i}$ is refined through the traditional feature-based optimization:

$$\underset{T_{f_i}}{\operatorname{argmin}} \sum_{X^f \in M^f} Obj(\pi(X^f, T_{f_i}) - obs) \tag{35}$$

where $obs\in\mathbb{R}^2$ is the feature's matched location in $f_i$, found through descriptor matching. To achieve sub-pixel accuracy, the recovered pose $T_{f_i}$ is then converted into a local increment over the pose of the last active direct keyframe, and then further refined in a direct image alignment optimization in Equation (34). Note that the EPnP step could be skipped in favour of using the last correctly tracked keyframe's position as a starting point; however, data association would then require a relatively larger search window, which in turn increases its computational burden in the subsequent step. Data association using a search window can also to fail when the baseline motion is relatively large.

When direct image alignment fails, the front end operations of the system are taken over until the direct map is re-initialized. FDMO's tracking recovery is a variant of ORB-SLAM's global failure recovery that exploits the information available from the direct framework to constrain the recovery procedure locally. Features from the new frame are extracted and matched to 3D features observed in a set of keyframes $\kappa^f$ connected to the last correctly added keyframe from $KF^d$. Efficient Perspective-n-Point (EPnP) camera pose estimation is used to estimate an initial guess, which is then refined by a guided data association between the local map and the frame. The refined pose is then used to seed a Forward additive image alignment step to achieve sub-pixel accuracy.

The mapping is a variant of DSO's mapping backend where its capabilities are augmented to expand the feature-based map with new $KF^f$. It operates after or parallel to the direct photometric optimization of DSO, by first establishing feature matches using restricted epipolar search lines; the 3D feature-based map is then optimized using a computationally efficient structure-only bundle adjustment, before map maintenance ensures the map remain outliers free.

FDMO's mapping process is composed of two components: direct, and feature-based. The direct map propagation propagates the feature-based map. When a new keyframe is added to $M^d$, a new feature-based keyframe $KF^f$ that inherits its pose from $KF^d$. $\Phi KF^f(x^f, Q(x^f))$ is then extracted and data association takes place between the new keyframe and a set of local keyframes $K^f$ surrounding it via epipolar search lines. The data association is used to keep track of all map points $X^f$ visible in the new keyframe and to triangulate new map points.

To ensure an accurate and reliable feature-based map, typical feature-based methods employ local bundle adjustment (LBA) to optimize for both the keyframes poses and their associated map points; however, employing an LBA may generate inconsistencies between both map representations, and is computationally expensive. Instead, the fact that the new keyframe's pose is already locally optimal can be used to replace the typical local bundle adjustment with a computationally less demanding structure only optimization defined for each 3D point $X_j^f$:

$$\underset{X_j^f}{\operatorname{argmin}} \sum_{i\in\kappa^f} Obj\left(x_{i,j}^f - \pi\left(T_{KF_i^f} X_j^f\right)\right) \tag{36}$$

where $X_j$ spans all 3D map points observed in all keyframes $\in\kappa^f$. In an example, ten iterations of Gauss-Newton are used to minimize the normal equations associated with Equation (36), which yield the following update rule per 3D point $X_j$ per iteration:

$$X_j^{t+1} = X_j^t - (J^T W J)^{-1} J^T W e \tag{37}$$

where e is the stacked reprojection residuals $e_i$ associated with a point $X_j$ and its found match $x_i$ in keyframe i. J is the stacked Jacobians of the reprojection error which is found by stacking:

$$J_i = \begin{bmatrix} \frac{f_x}{Z} & 0 & -\frac{f_x X}{Z^2} \\ 0 & \frac{f_y}{Z} & -\frac{f_y Y}{Z^2} \end{bmatrix} R_{KF_i} \tag{38}$$

and $R_{KF_i}$ is the 3×3 orientation matrix of the keyframe observing the 3D point $X_i$. Similar to ORB-SLAM, W is a block diagonal weight matrix that down-weighs the effect of residuals computed from feature matches found at high pyramidal levels and is computed as:

$$W_{ii} = \begin{bmatrix} Sf^{-2n} & 0 \\ 0 & Sf^{-2n} \end{bmatrix} \quad (39)$$

where Sf is the scale factor used to generate the pyramidal representation of the keyframe (in an example, Sf=1.2) and n is the pyramid level from which the feature was extracted ($0 \le n < 8$). The Huber norm is also used to detect and remove outliers. The number of iterations in the optimization of Equation (36) are limited to ten, since no significant reduction in the feature-based re-projection error may be recorded beyond that.

To ensure a reliable feature-based map, the following can be employed. For proper operation, direct methods require frequent addition of keyframes, resulting in small baselines between the keyframes, which in turn can cause degeneracies if used to triangulate feature-based points. To avoid numerical instabilities, feature triangulation is prevented between keyframes with a $$\frac{\text{baseline}}{\text{depth}}$$

ratio less than 0.02 which is a trade-off between numerically unstable triangulated depth features and feature deprivation problems. The frequent addition of keyframes are exploited as a feature quality check. In other words, a feature has to be correctly found in at least 4 of the 7 keyframes subsequent to the keyframe it was first observed in, otherwise it is considered spurious and is subsequently removed. To ensure no feature deprivation occurs, a feature cannot be removed until at least 7 keyframes have been added since it was first observed. Finally, a keyframe with ninety percent of its points shared with other keyframes is removed from $M^f$ only once marginalized from $M^d$. This approach ensures that sufficient reliable map points and features are available in the immediate surrounding of the current frame, and that only necessary map points and keyframes are kept once the camera moves on.

FDMO-f addresses the dependence of FDMO on a heuristic failure detection test by using both Direct and Indirect residuals on every frame. To overcome the computational expenses of extracting features, an efficient and parallelizable alternative to the feature detector employed in typical Indirect methods is used. An Indirect map quality feedback from the frame-to-frame feature matches is used to introduce various efficiencies in the mapping process, resulting in a 50% faster Indirect mapping process while maintaining the same or similar performance.

Several design considerations are taken into account when designing a feature detector for a SLAM algorithm. In particular, the detected keypoints should be repeatable, discriminable, and homogeneously distributed across the image. ORB SLAM takes into account these considerations by extracting features using an octomap, which adapts the FAST corner detector thresholds to different image regions. However, this process is computationally involved; for example, it takes 12 ms on current hardware to extract 1500 features along with their ORB descriptors from 8 pyramid levels. Unfortunately, this means that the feature extraction alone requires more time than the entire Direct pose estimation process. Several attempts at parallelizing ORB SLAM's feature extraction process have been made; however, parallelizing the extraction process on a CPU resulted in no speedups, and ended up having to adopt a CPU-GPU acceleration to reduce the computational cost by 40%. In contrast, it has been determined that it could be advantageous to forego the adaptive octomap approach in favor of an efficiently parallelizable feature detector implementation on, for example, a CPU. The feature detector of the present embodiments can first compute the image pyramid levels, which are then distributed across parallel CPU threads. Each thread operates on its own pyramid level independent of the others.

A number of operations are performed by each thread. FAST corners are first extracted with a low cutoff threshold, resulting in a large number of noisy corners with an associated cornerness score (the higher the score the more discriminant). The corners are then sorted in descending order of their scores and accordingly added as features, with each added corner preventing other features from being added in a region of 11×11 pixels around its location. This ensures that the most likely repeatable corners are selected, while promoting a homogeneous distribution across the image. The area 11×11 is chosen to ensure small overlap between the feature descriptors, thereby improving their discriminability. The features orientation angles are then computed and a Gaussian kernel is applied before extracting their ORB descriptors. When compared to the 12 ms required by ORB SLAM's detector, the present feature detector extracts the same number of features in 4.4 ms using the same CPU, making feature extraction on every frame feasible.

Unlike FDMO, FDMO-f extracts and uses Indirect features on every frame. The CVMM from frame-to-frame pose is usually accurate enough to establish feature correspondences with the local map using a search window. However, if few matches are found, the motion-model-independent pose recovery, described herein, can be used to obtain a more accurate pose for feature matching to take place. The frame pose is then optimized using the Indirect features as described in Equation (36) before being used to seed the direct image alignment process which ensures a sub-pixel level accuracy of the pose estimation process.

Similar to FDMO, FDMO-f uses hybrid keyframes that contains both Direct and Indirect measurements. However, unlike FDMO, keyframe insertion is triggered from two sources, either from: (1) the Direct optimization using the criteria, or (2) the Indirect optimization by monitoring the ratio of the inlier feature matches in the latest frame to that of the latest keyframe $$r = \frac{\text{inliers in } inf_i}{\text{inliers in } KF}.$$

If r drops below a threshold (e.g., 0.8), a keyframe is added, thus ensuring an ample amount of reliable Indirect features present in the local Indirect map $M^f$. While all added keyframes can be used to expand the set of direct map points $x^d$, they contribute differently to the Indirect mapping process depending on which criteria was used to create the keyframe. In particular, only keyframes that are triggered from the Indirect inlier ratio are used to triangulate new Indirect map points $X^f$. Keyframes that were not selected for Indirect triangulation are used to provide constraints on the previously added Indirect map points in the structure-only optimization. As a result, the modified mapping process is significantly more efficient than that of FDMO, which did not have frame-to-frame feedback on the quality of the Indirect map, forcing it to triangulate new Indirect map points on every added keyframe.

Figure 2:
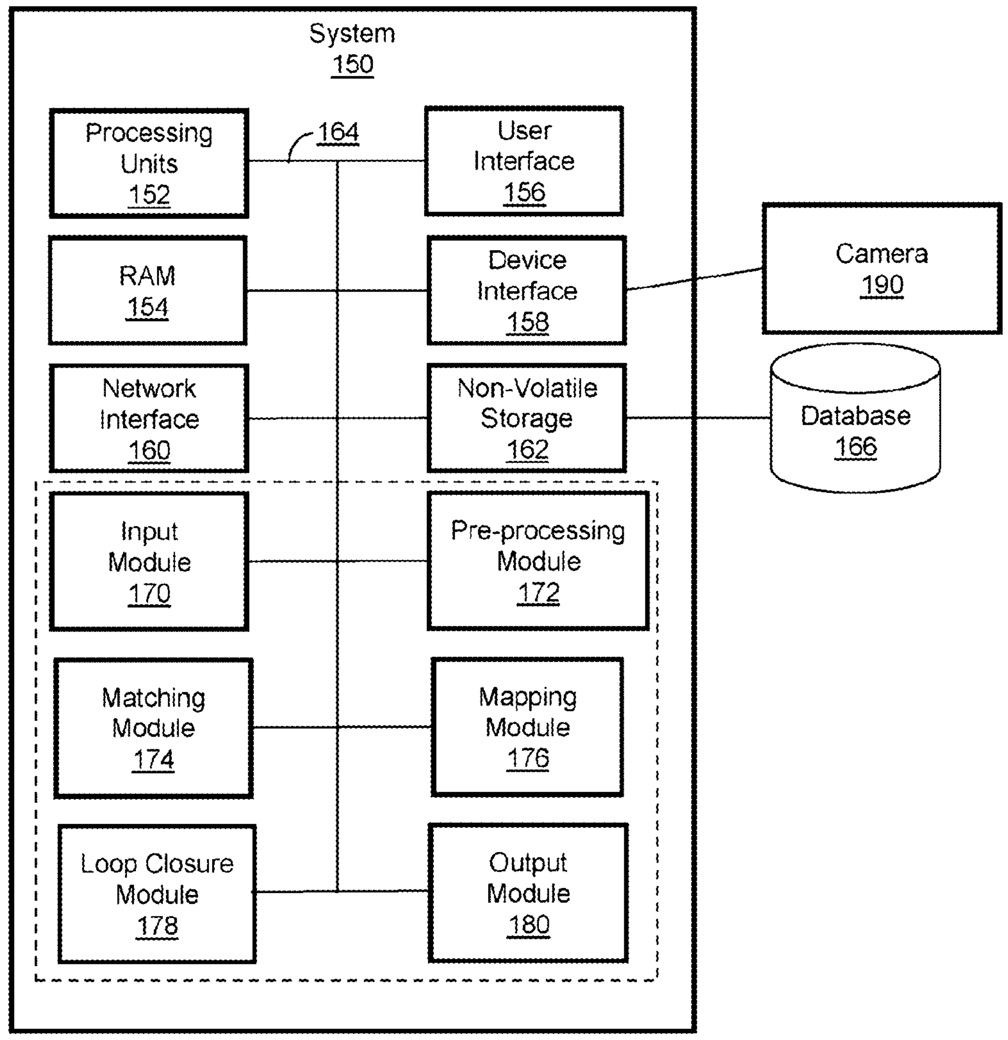
FIG. 2 is a diagram of a hybrid scene representation for visual simultaneous localization and mapping, in accordance with an embodiment.

Turning to FIG. 2, a system 150 of hybrid scene representation for visual simultaneous localization and mapping is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, a mixed reality device, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 2 shows various physical and logical components of the embodiment of the system 150. As shown, the system 150 has a number of physical and logical components, including processing units 152 (comprising one or more processors), random access memory ("RAM") 154, a user interface 156, a device interface 158, a network interface 160, non-volatile storage 162, and a local bus 164 enabling processing units 152 to communicate with the other components. Processing units 152 executes an operating system, and various modules, as described below in greater detail. RAM 154 provides relatively responsive volatile storage to processing units 152. The user interface 156 enables an administrator or user to provide input via an input device, for example a mouse, a touchscreen, or the like. The user interface 156 also outputs information to output devices; for example, a display or multiple displays, and the like. In some cases, the user interface 156 can have the input device and the output device be the same device (for example, via a touchscreen). The device interface 158 communicates with an image acquisition device, such as one or more cameras 190, and stores the images on the database 166 and/or the non-volatile storage 162. In some cases, the camera 190 can be collocated or part of the computing device of the system 150. In further cases, the system 150 can receive and store the images via the network interface 160.

In an embodiment, the system 150 further includes a number of functional modules to be executed on the one or more processors 152; for example, an input module 170, a pre-processing module 172, a matching module 174, a mapping module 176, a loop closure module 178, and an output module 180. In further cases, the functions of the modules can be combined or executed by other modules. Non-volatile storage 162 stores computer-executable instructions for implementing the modules, as well as any data used by these services. Additional stored data can be stored in a database 166. During operation of the system 150, modules, and the related data may be retrieved from the non-volatile storage 162 and placed in RAM 154 to facilitate execution.

In an embodiment of the system 150, hybrid scene representation is performed using a Unified Formulation for Visual Odometry (UFVO). This approach advantageously provides: (1) a tight coupling of photometric (Direct) and geometric (Indirect) measurements using a joint multi-objective optimization; (2) the use of a utility function as a decision maker that incorporates prior knowledge on both paradigms; (3) descriptor sharing, where a feature can have more than one type of descriptor and its different descriptors are used for tracking and mapping; (4) the depth estimation of both corner features and pixel features within the same map using an inverse depth parametrization; and (5) a corner and pixel selection strategy that extracts both types of information, while promoting a uniform distribution over the image domain. Experiments conducted by the present inventors showed that UFVO can handle large inter-frame motions, inherits the sub-pixel accuracy of direct methods, can run efficiently in real-time, and can generate an Indirect map representation at a marginal computational cost when compared to other Indirect systems. The present embodiments of UFVO also have been found to outperform other Direct, Indirect and hybrid systems.

Figures 4A, 4B, 4C, 4D:
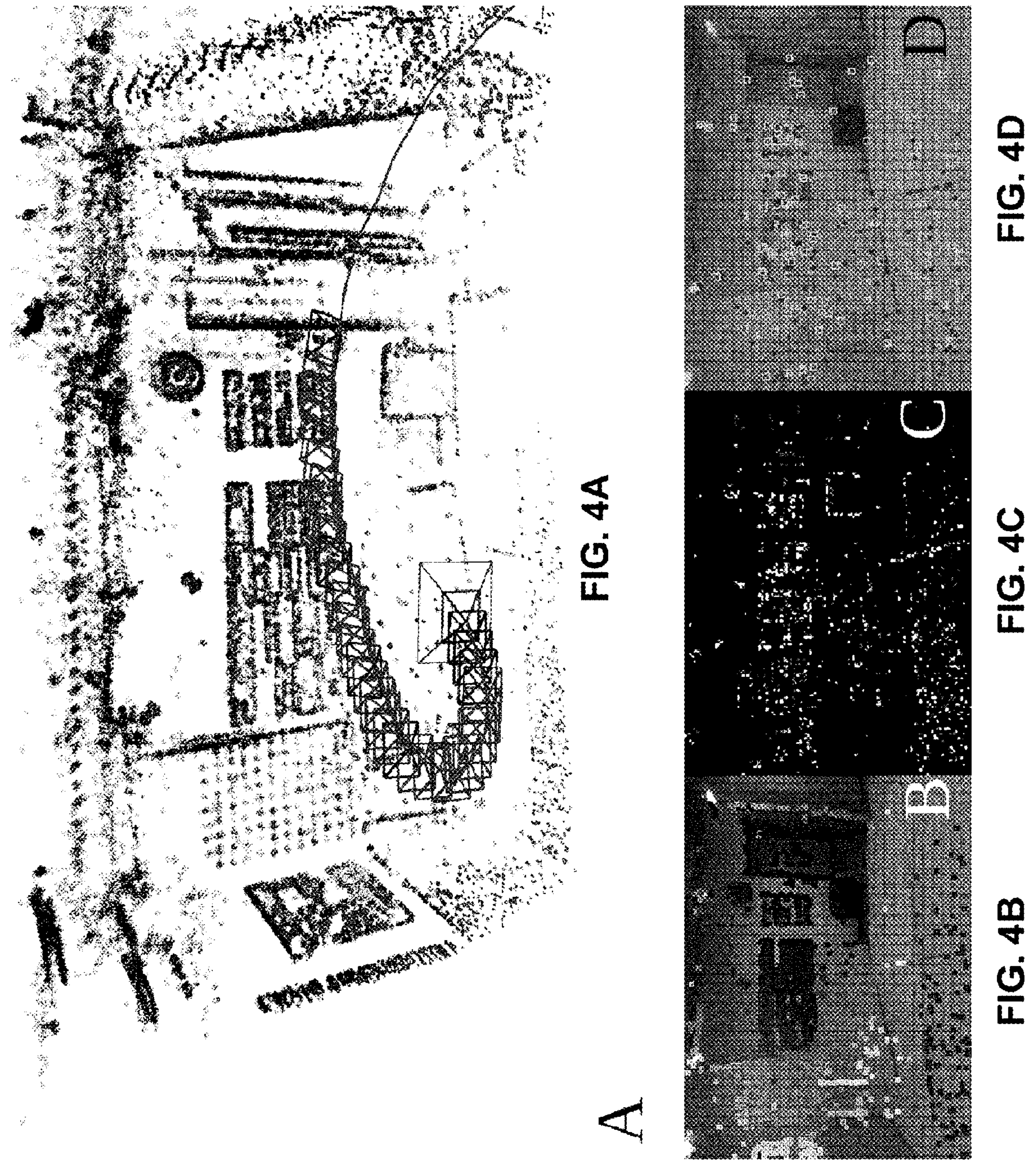
FIG. 4A illustrates an example of a 3D recovered map and different types of points used.
FIG. 4B illustrates a projected depth map of all active points for the map of FIG. 4A.
FIG. 4C illustrates an occupancy grid for the map of FIG. 4A.
FIG. 4D illustrates inlier geometric features used during tracking for the map of FIG. 4A.

FIGS. 4A to 4D shows an example illustrating different UFVO components. FIG. 4A shows a 3D recovered map and the different types of points used: points that contribute to both geometric and photometric residuals, points that are geometric residuals only, points that are photometric residuals only, and points that are marginalized (do not contribute any residuals). The squares are hybrid keyframes (contains both geometric and photometric information) and Indirect Keyframes whose photometric data was marginalized. FIG. 4B shows the projected depth map of all active points. FIG. 4C shows the occupancy grid which is used to ensure a homogeneously distributed map point sampling process. The squares correspond to the projected map points while the magenta squares represent newly extracted features from the newest keyframe. FIG. 4D shows the inlier geometric features used during tracking.

In the following disclosure, image locations from which measurements are taken are referred to as features. This means that corners and pixel locations are considered as features that can be used interchangeably as Direct or Indirect features. The word descriptor is used for both paradigms, where an Indirect feature descriptor is a high dimensional vector computed from the area surrounding the feature (e.g. ORB), and a Direct feature descriptor is a local patch of pixel intensities surrounding the feature. Geometric residual are referred to as the 2-D geometric distance between an indirect feature location and its associated map point projection on the image plane. In contrast, a photometric residual is referred to as the intensity difference between a direct feature descriptor and a patch of pixel intensities at the location where the feature projects to in the image plane. Matrices are denoted by bold upper case letters M, vectors by bold lower case letters v, camera poses as $T \in SE(3)$ with their associated Lie element in the groups' tangent space as $\hat{\xi} \in se(3)$. A 3D point in the world coordinate frame is denoted as $x \in \mathfrak{R}^3$, its coordinates in the camera frame as $\tilde{x} = Tx$, and its projection on the image plane as $p = (u, v)^T$. The projection from 3D to 2D is denoted as $\pi(c,x): \mathfrak{R}^3 \rightarrow \mathfrak{R}^2$ and its inverse $\pi^{-1}(c, p, d): \mathfrak{R}^2 \rightarrow \mathfrak{R}^3$ where c and d represent the camera intrinsics and the points' depth respectively. $\mathcal{L}(a, b): I(p) \mapsto e^{-a}(I(p)-b)$ is an affine brightness transfer function that models the exposure change in the entire image and I(p) is the pixel intensity value at p. To simplify the representation, $\xi := (\xi, \mathcal{L})$ is defined as the set of variables over which the camera motion optimization is performed. The operator $\boxplus\, se(3) \times SE(3) \rightarrow SE(3)$ is defined as $\xi \boxplus T = \hat{\xi}\, T$. The incremental updates over $\xi$ are then defined as $\delta\xi \oplus \xi = (\log(\delta\xi \boxplus e^{\hat{\xi}}), a+\delta a, b+\delta b)$. Finally, a subscript p is assigned for photometric measurements and g for geometric measurements. Also note that, generally, the terms Direct and Indirect are associated with the words photometric and geometric respectively, as such both names are used interchangeably.

UFVO concurrently uses both photometric and geometric residuals at frame-rate. For this purpose, the distinction between two types of features can be made: salient corner features and pixel features. Corner features are FAST corners extracted at p, associated with a Shi-Tomasi score that reflects their saliency as a corner, an ORB descriptor, and a patch of pixels surrounding the point p. Corner features contribute two types of residuals during motion estimation: a geometric residual using its associated descriptor, and a photometric residual using its pixels patch. Pixel features are sampled from the images at any location p that is not a corner and has sufficient intensity gradient; they are only associated with a patch of pixels; therefore, pixel features only contribute photometric residuals during motion estimation.

Figure 5:
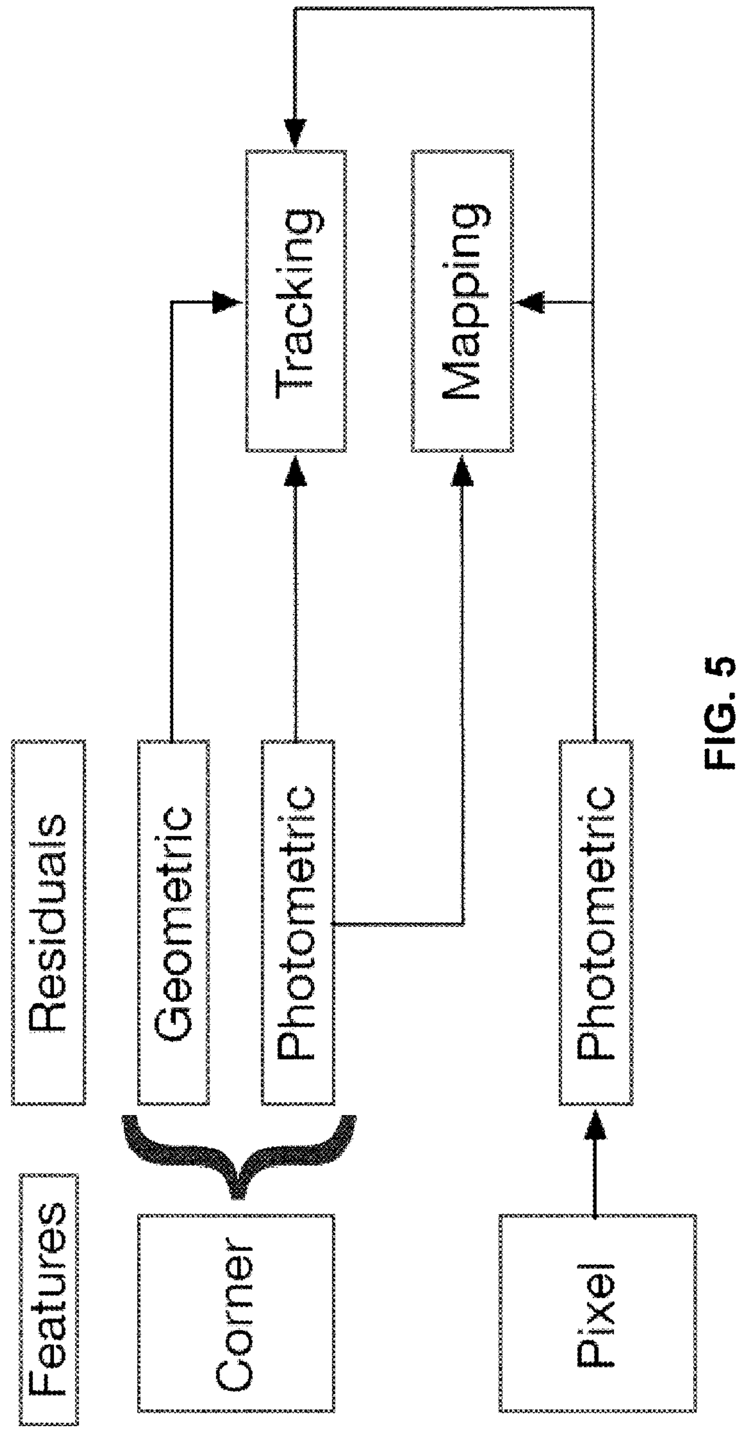
FIG. 5 illustrates a summary of feature types, their associated residuals, and their usage, in accordance with the system of FIG. 2.

FIG. 5 illustrates a summary of the feature types, their associated residuals, and their usage in UFVO. The types of residuals each feature type contributes in tracking and mapping are summarized in FIG. 5. Features are classified as either:

- Candidate: new features whose depth estimates have not converged, they contribute to neither tracking nor mapping.
- Active: features with depth estimates that contribute to both tracking and mapping.
- Marginalized: features that went outside the current field of view or features that belong to marginalized keyframes.
- Outliers: features with high residuals or corners that frequently failed to match other features.

Figure 3:
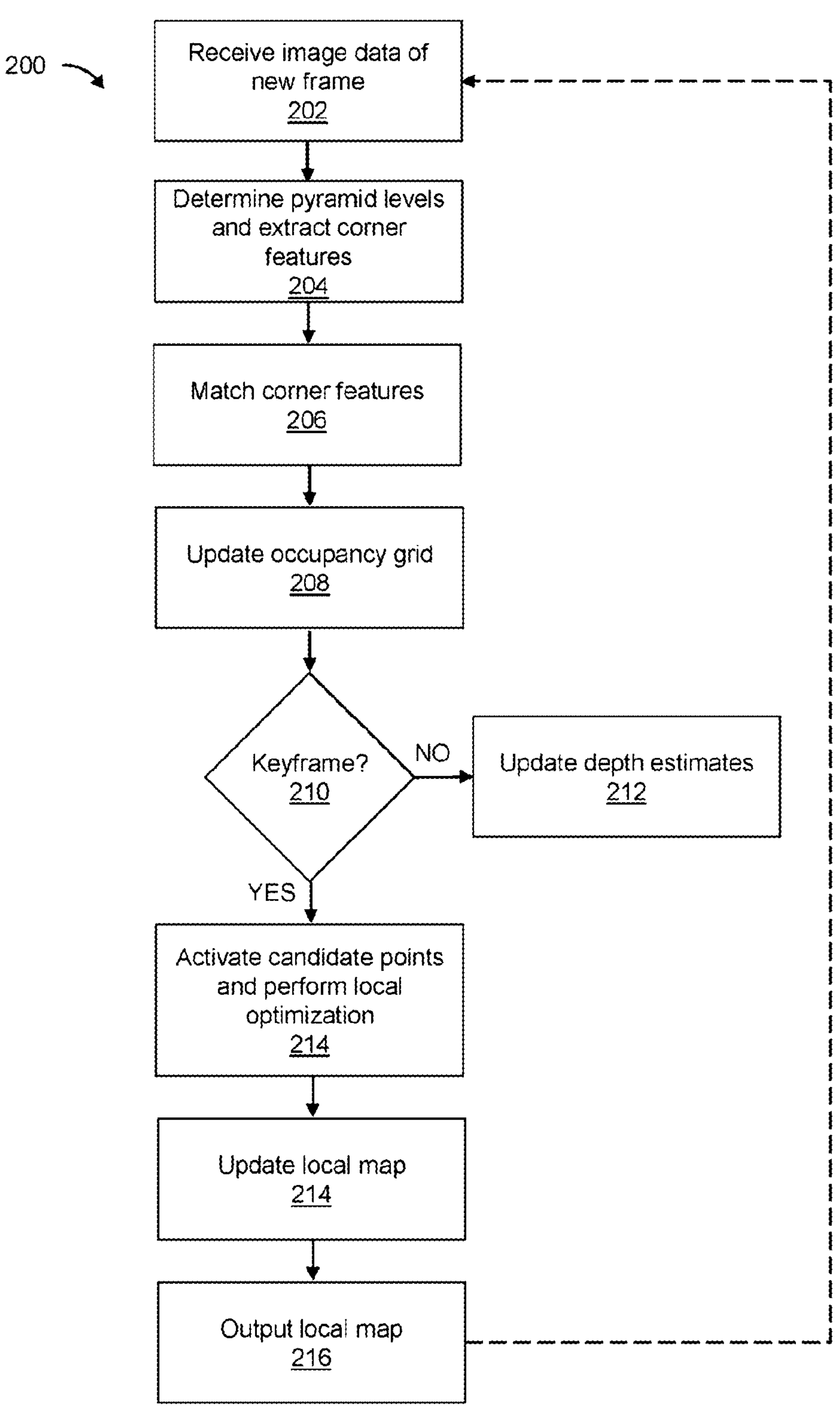
FIG. 3 is a flow diagram of hybrid scene representation for visual simultaneous localization and mapping, in accordance with an embodiment.

Turning to FIG. 3, a flowchart of a method 200 of hybrid scene representation for visual simultaneous localization and mapping is shown, according to an embodiment. At block 202, the input module 170 receives the image data representing a new frame to be processed; such as from the device interface 158, the database 166, or the network interface 160 (such as communicated over the Internet or other network).

At block 204, the pre-processing module 172 pre-processes the received frame to compute pyramid levels and extract corner features. At block 206, the matching module 174 matches the corner features that were determined by the pre-processing module 172, prior to joint pose optimization. At bock 208, the matching module 174 updates an occupancy grid over the last added keyframe to record the locations of active corners and pixel features. At block 210, the mapping module 176 passes the frame to a mapping thread and a decision is made whether it should be a keyframe or not. If it is not selected as a keyframe, at block 212, the mapping module 176 uses the frame to update depth estimates of candidate points in a local map. Otherwise, at block 214, the mapping module 176 activates candidate points from the local map and performs local photometric optimization. At block 216, the mapping module 176 updates the local map with the optimized variables and marginalizes old keyframes with their associated points. At block 218, the output module 180 outputs the local map to the device interface 158, the database 166, or the network interface 160. In most cases, the system 150 can repeat back to block 202 when a new frame is received.

Figure 6:
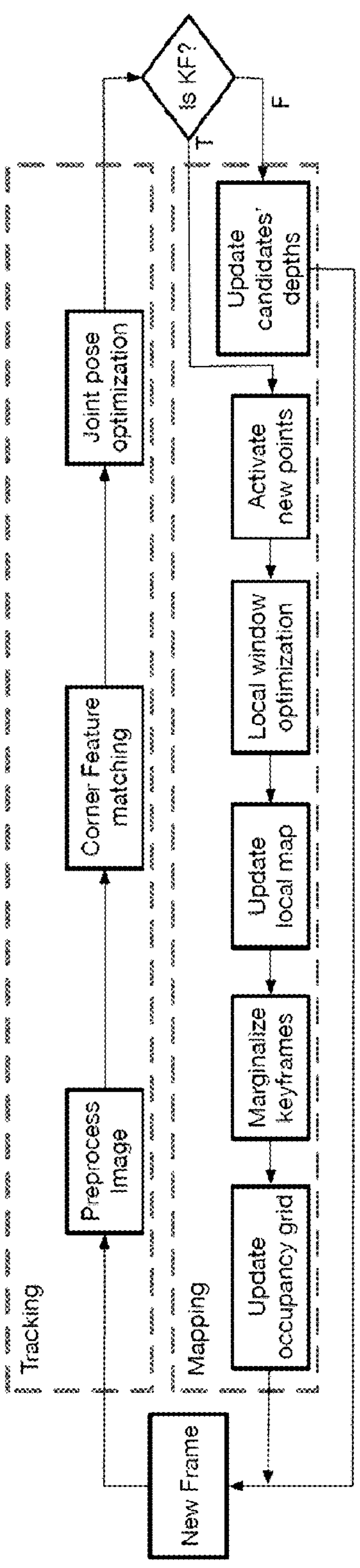
FIG. 6 depicts an example diagram of the operation of the odometry approach using the system of FIG. 2.

UFVO, as embodied in the method 200, is an odometry approach that operates on two threads: tracking and local mapping. FIG. 6 depicts an example diagram of the operation of the odometry approach, which starts by processing new frames to create a pyramidal image representation, from which both corners features are first sampled. A constant velocity motion model is then used to define a search window for corner feature matching, which are used to compute the geometric residuals. A joint multi-objective pyramidal image alignment then minimizes both geometric and photometric residuals associated with the two types of features over the new frame's pose. The frame is then passed to the mapping thread where a keyframe selection criterion is employed. If the frame was not flagged as a keyframe, all the candidate points' depth estimates are updated using their photometric residuals in an inverse depth formulation and then the system 150 awaits a new frame.

Conversely, if the frame was deemed a keyframe, a 2D occupancy grid is first generated over the image by projecting the local map points to the new keyframe; each map point occupies a 3×3 pixels area in the grid. A subset of the candidate features from the previous keyframes are then activated such that the new map points project at empty grid locations. New candidate corner features are then sampled at the remaining empty grids before a local photometric bundle adjustment takes place which minimizes the photometric residuals of all features in the active window. In most cases, the geometric residuals are not included in this optimization. Their use during tracking ensures that the state estimates are as close as possible to their global minima. Hence, there is no added value of including them. Furthermore, since the geometric observation models' precision is limited, including them would actually cause jitter around the minimum.

Outlier Direct and Indirect features are then removed. The local map is then updated with the new measurements and a computationally-cheap structure-only optimization is applied to the marginalized Indirect features that are part of the local map. Further, old keyframes are marginalized from the local map.

For feature sampling, when a new frame is acquired, the pre-processing module 172 creates a pyramidal representation over which a pyramidal image alignment is applied. However, most Indirect methods, the pre-processing module 172 only extracts Indirect features at the highest image resolution. Since Indirect features are only tracked in a local set of keyframes, which are relatively close to each other (i.e., do not exhibit significant variations in their scale), extracting features from one pyramid level allows the system 150 to save on the computational cost typically associated with extracting Indirect features without significantly compromising performance. Since corners contribute to both types of residuals, the system 150 avoids sampling pixel features at corner locations; therefore, the pre-processing module 172 samples pixel features at non-corner locations with sufficient intensity gradient.

For feature activation, when a keyframe is marginalized by the mapping module 176, a subset of the candidate features from the previous keyframes are activated to take over in its place. The feature activation policy is designed to enforce the following priorities in order:

- To minimize redundant information, features should not overlap with other types of features.
- Ensure maximum saliency for the new Indirect features.
- To maintain constant computational cost, add a fixed number of new Direct and Indirect Candidates.

Figures 7A, 7B:
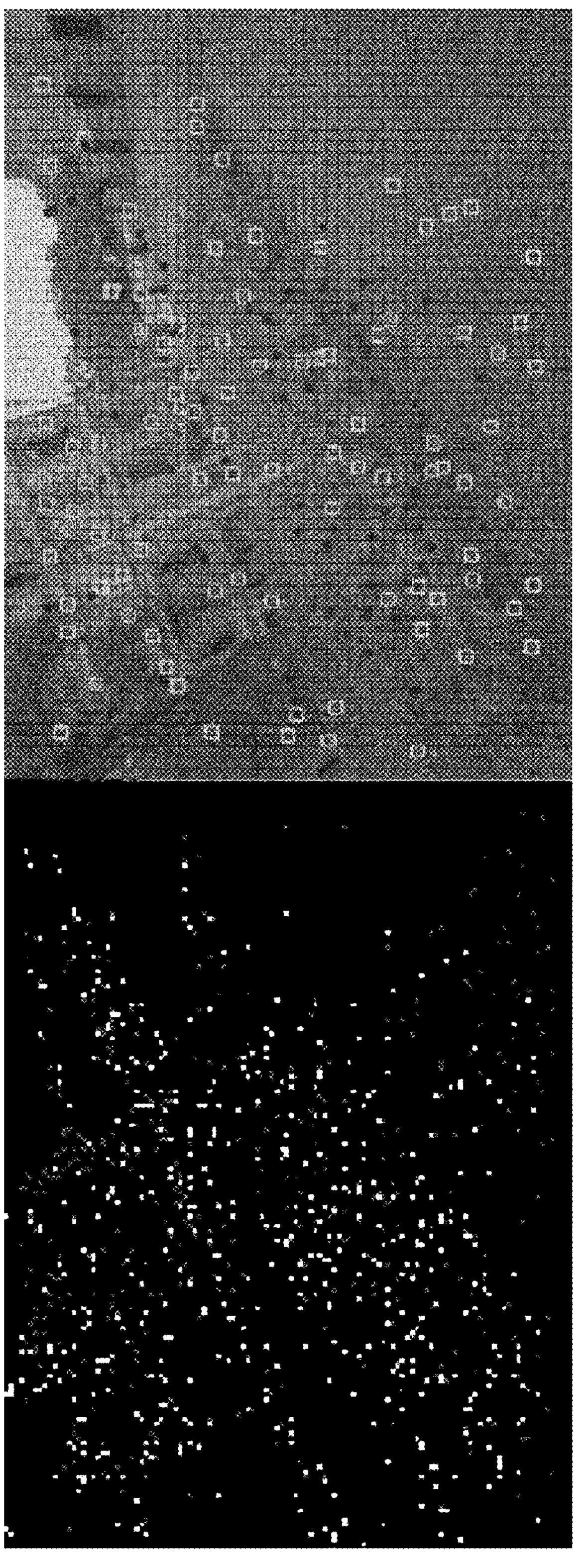
FIG. 7A illustrates an example of an occupancy grid showing current map points and newly added map points, using the system of FIG. 2.
FIG. 7B illustrates keyframe's image for the occupancy grid of FIG. 7A.

To enforce the activation policy and ensure a homogeneous feature distribution, a coarse 2D occupancy grid can be used over the latest keyframe; such that the grid is populated with the projection of the current map on the keyframe with each point occupying a 3×3 area in the occupancy grid. Since corners are generally scarce, their activation can be prioritized by employing a two-stage activation process: the first sorts corner features in a descending order according to their Shi-Tomasi score and activates a fixed number of the strongest corners from unoccupied grid cells. The second stage activates pixel features at locations different than the newly activated corners and that maximizes the distance to any other feature in the keyframe FIGS. 7A and 7B demonstrate the effectiveness of the sampling and activation strategy of the method 200 by showing an example of the occupancy grid in FIG. 7A alongside its keyframe's image in FIG. 7B. The occupancy grid in FIG. 7A shows the current map points and the newly added map points. It can be seen that there is no overlap between old and new points, the points are homogeneously distributed throughout the frame. The squares in the occupancy grid represent current map points and newly added ones. In FIG. 7B, the squares represent indirect active map point matches and the dots represent marginalized indirect feature matches.

The mapping module 176 advantageously uses a joint optimization that minimizes an energy functional, which combines both types of residuals, over the relative transformation $\xi$ relating the current frame to last added keyframe. The joint optimization can be described as:

$$\operatorname{argmin}(e_p(\xi), e_g(\xi)) \tag{40}$$

This optimization advantageously is computationally efficient, delivers a single pareto optimal solution, and capable of achieving superior performance than either of the individual frameworks. While approaches for Multi-Objective optimizations are available in the art, other approaches do not meet the harsh constraints of real-time performance and allowing for explicit a priori articulation of preferences. The Weighted Sum Scalarization transforms the optimization of Equation (40) to:

$$\operatorname{argmin}(\alpha_1 e_p(\xi) + \alpha_2 e_g(\xi)) \tag{41}$$

where $\alpha_1$ and $\alpha_2$ represent the contribution of each residual type to the final solution.

For simplicity, the problem is reformulated using $$K = \frac{\alpha_2}{\alpha_1},$$

which represents the weight of the geometric residuals relative to the photometric residuals; e.g., K=2 assigns twice as much importance to the geometric residuals than to the photometric residuals.

For this weighing scheme, both energies are dimensionless and normalized such that imbalances in the numbers of the two residuals do not inherently bias the solution. The Huber norm is also used to account for outliers. The joint energy functional becomes:

$$\operatorname*{argmin}_{\xi} e(\xi) = \operatorname*{argmin}_{\xi}\left[\frac{\|e_p(\xi)\|_\gamma}{n_p\sigma_p} + K\frac{\|e_g(\xi)\|_\gamma}{n_g\sigma_g}\right] \tag{42}$$

where n is the count of each feature type, $\sigma^2$ is the residual's variance, $\|\bullet\|_\gamma$ is the Huber norm, and the energy per feature type is defined as:

$$e_p(\xi) = \left(r^T W r\right)_p, \text{ and } e_g(\xi) = \left(r^T W r\right)_g \tag{43}$$

where r is the vector of stacked residuals per feature type and W is a weight matrix (as described herein).

The mapping module 176 seeks an optimal solution $\xi$ that minimizes Equation (42); however, r is non-linear, therefore it is linearized with a first order Taylor expansion around the initial estimate $\xi$, with a perturbation $\delta\xi$, that is:

$$r(\xi \oplus \delta\xi) \simeq r(\xi) + J\delta\xi \tag{44}$$

where $$J = \frac{\partial r}{\partial \xi}.$$

If r in Equation (43) is replaced by its linearized value from Equation (44), and substitute the result in Equation (42), then differentiate the result with respect to $\xi$, and set it equal to zero, the mapping module 176 arrives at the step increment equation $\delta\xi \in \mathfrak{R}^8$ of the joint optimization:

$$\delta\xi = -\left[\left(\frac{J^t WJ}{n\sigma}\right)_p + \left(\frac{KJ^t WJ}{n\sigma}\right)_g\right]^{-1}\left[\left(\frac{J^t Wr}{n\sigma}\right)_p + \left(\frac{KJ^t Wr}{n\sigma}\right)_g\right] \tag{45}$$

which is iteratively applied using $\xi=\delta\xi\oplus\xi$ in a Levenberg-Marquardt formulation, until convergence. The optimization is repeated from the coarsest to the finest pyramid levels, where the result of each level is used as an initialization to the subsequent one. At the end of each pyramid level, outliers are removed and the variable K is updated.

The photometric residual $r_p \in \mathfrak{R}$ per feature can be found by evaluating:

$$r_p = \sum_{p\in\mathcal{N}_p}\left[(I_j[p'] - b_j) - \frac{t_j e^{a_j}}{t_i e^{a_i}}(i_i[p] - b_i)\right] \tag{46}$$

where $\mathcal{N}_p$ is the neighboring pixels of the feature at p, the subscript i denote the reference keyframe, and j the current frame; t is the image exposure time which is set to 1 if not-available, and p' is the projection of a feature from the reference keyframe to the current frame, which is found using:

$$p' = \pi\left(c, e^{\hat{\xi}}\pi^{-1}(c, p, d)\right) \tag{47}$$

where $\hat{\xi}$ is the relative transformation from the reference keyframe to the new frame. Note that the photometric residual is determined for both types of features (corners and pixels). The geometric residual $r_g \in \mathfrak{R}^2$ per corner feature is defined as:

$$r_g = p' - obs \tag{48}$$

where obs$\in \Re^2$ is the corners' matched location in the new image, found through descriptor matching. Regarding the weight W matrices, the photometric weight is defined as $w_p = h_w(\gamma_p)$ where:

$$h_w = \begin{cases} 1 & \text{if } e < \gamma^2 \\ \frac{\gamma}{\sqrt{e}} & \text{if } e \geq \gamma^2 \end{cases} \tag{49}$$

is the Huber weight function. As for the geometric weight, two weighing factors are combined: a Huber weight as defined in Equation (49), and a variance weight associated with the variance of the corners' depth estimate:

$$w_d = \frac{\frac{1}{\sigma_d}}{\max\left(\frac{1}{\sigma_d}\right)} \tag{50}$$

with max $$\left(\frac{1}{\sigma_d}\right)$$

the maximum $$\frac{1}{\sigma_d}$$

in the current frame, which down-weighs features with high depth variance. The final geometric weight is then found as $W_g = w_d h_w(\gamma_g)$. The photometric Jacobian $J_p|_{1\times8}$ requires solving Equation (45) per pixel and is found using:

$$J_p = \left[\frac{f_u \nabla I_u}{d}, \frac{f_v \nabla I_v}{d}, -\frac{1}{d}(\nabla I_u u f_u + \nabla I_v v f_v), -\nabla I_v f_v(1+v^2) - \nabla I_u f_u uv, \nabla I_u f_u(1+u^2) + \nabla I_v f_v uv, \nabla I_v f_v u - \nabla I_u f_u v, -\frac{t_j e^{a_j}}{t_i e^{a_i}}(I_i[p] - b_i), -1\right] \tag{51}$$

where u and v are the coordinates of the point p' in the new frame's image plane, $f_u$ and $f_v$ are the focal length parameters, and $\nabla I$ is the directional image gradient. The geometric Jacobian $J_g\|_{2\times8}$ per corner is computed as:

$$J_g = 2pt\begin{bmatrix} \frac{f_u}{d}, & 0, & -\frac{f_u u}{d}, & -f_u uv & f_u(1+u^2), & -f_u v, & 0, & 0 \\ 0, & \frac{f_v}{d}, & -\frac{f_v v}{d}, & -f_v(1+v^2) & f_v uv, & f_v u, & 0, & 0 \end{bmatrix} \tag{52}$$

Due to the high non-convexity of the Direct formulation, erroneous or initialization points far from the optimum, cause the Direct optimization to converge to a local minimum, far from an actual solution. While Indirect methods are robust to such initializing points, they tend to flatten around the actual solution due to their discretization of the image space. Ideally, an optimization process would follow the descent direction of the Indirect formulation until it reaches a pose estimate within the local concavity of the actual solution, after which it would follow the descent direction along the Direct formulation.

The introduction of K in Equation (42) allows expressing such a-priori preference within the optimization. As K→0 the optimization discards geometric residuals, whereas as K>>, geometric residuals dominate. Therefore a function that controls K is used in the present embodiment such that the descent direction behaves as described earlier. Furthermore, the geometric residuals tend to be unreliable in texture-deprived environments, therefore K can be ∝ number of matches. The logistic utility function is:

$$K = \frac{5e^{-2l}}{1 + e^{\frac{30-N_g}{4}}} \tag{53}$$

where l is the pyramid level at which the optimization is taking place, and $N_g$ is the number of current inlier geometric matches. While the number of iterations does not explicitly appear in Equation (53), it is embedded within l; as the optimization progresses sequentially from a pyramid level to another, the optimization follows the descent direction of the geometric residuals, with a decay induced by Equation (53) that down-weighs the contribution of the geometric residuals as the solution approaches its final state. K also penalizes the Indirect energy functional at low number of matches, allowing the system 150 to naturally handle texture-deprived environments.

Unlike typical Indirect formulations, the system 150 adopts Indirect features as an inverse depth parametrization, which allows it to circumvent the need for a separate multi-view geometric triangulation process that is notorious for its numerical instability for observations separated by small baselines. Instead, the system 150 exploits the Direct pixel descriptors associated with the Indirect corner features. Aside from its numerical stability, this is also advantageous in terms of computational resources as it allows the system 150 to compute the depth of Indirect features at virtually no extra computational cost.

The local map is made of a moving window of keyframes in which two types of keyframes are distinguished:

Hybrid keyframes: a fixed-size set of keyframes that contains Direct and Indirect residuals, over which a photometric bundle adjustment optimizes both types of features using their photometric measurements.

Indirect keyframes: previously hybrid keyframes whose photometric data was marginalized, but still share Indirect features with the latest frame.

As new keyframes are added, hybrid keyframes are removed by marginalization using a Schur complement. On the other hand, Indirect keyframes are dropped from the local map once they no longer share Indirect features with the current camera frame. To maintain the integrity of marginalized Indirect points, a structure-only optimization can be used that refines their depth estimates with new observations; however, one should note that the use of marginalized indirect features is restricted to features that are still in the local map. Furthermore, their use, and the structure only optimization, is optional. However, the present inventors found that using them increases the system's performance as it allows previously marginalized reliable data to influence the current state of the system, thereby reducing drift.

By allowing corner features to have both photometric and geometric residuals, and adopting an inverse depth parametrization, performing the method 200 allows for generating a single unified map in a single thread that is naturally resilient to texture-deprived environments, at a relatively small computational cost. Furthermore, the joint pyramidal image alignment is capable of exploiting the best traits of both Direct and Indirect paradigms, allowing the system 150 to cope with initializations far from the optimum pose, while gaining the sub-pixel accuracy of Direct methods. The point sampling and activation process ensures a homogeneously distributed, rich scene representation.

In further embodiments of the present disclosure, informally referred to as A Unified Formulation for Visual SLAM (UFVS), further exploits the complementary nature of Direct and Indirect representations to perform loop closure, resulting in a more efficient global and reusable map.

With other approaches, having two separate map representations introduces several limitations into a SLAM system; for example, the two representations can drift with respect to each other, yielding contradictory pose and scene structure estimates, which can in turn lead to catastrophic failure. While this is typically mitigated by separate, often redundant, and computationally expensive map maintenance processes, such catastrophic failure is inevitable due to the sub-optimal nature of these maintenance methods. In contrast, embodiments of the present disclosure use the same process to build, maintain, and update both local and global map representations. Effectively, they are the same map representation with the only difference between a local and global map point is that a global map point is not included in the local photometric bundle adjustment, but is added again as soon as it is re-observed. This allows the system 150 to build a coherent re-usable SLAM map that is not susceptible to drift, and does not require a separate, and computationally expensive maintenance processes.

Additionally, most other SLAM systems make use of a PGO to perform loop closure. While PGO is computationally efficient, it is a sub-optimal optimization that neglects all 3D observations. In contrast, the system 150 performs a full global inverse depth Bundle Adjustment on, in some cases, the entire map, taking into account the 3D observation constraints. This is made possible because the system 150 keeps track of the connectivity information of the map points across keyframes. Further, other systems typically either use co-visibility constraints or pose-pose constraints. Each representation has its own advantages and disadvantages, but systems generally cannot use both concurrently, resulting in reduced performance when re-observing past scenes with methods that employ pose-pose constraints, and in catastrophic failure when passing through feature-deprived environments with methods that use co-visibility constraints. Embodiments of the present disclosure address this issue by using a hybrid connectivity graph that keeps track of both pose-pose and co-visibility constraints, allowing the system 150 to keep track of temporal pose-pose constraints in feature deprived environments, while maintaining the ability to establish co-visibility constraints when previous scenes are re-observed.

The system 150 makes use of descriptor sharing and extends its capabilities to maintain a global map. The system 150 performs a joint tightly-coupled (Direct-Indirect) optimization in tracking, and uses the same inverse depth parametrization during mapping, where global map points are excluded from the local photometric BA, and are re-added to the global map when they are re-observed (i.e., the same map representation can be concurrently used locally and globally). Moreover, the system 150 capitalizes on the advantages of this joint formulation to generate, at almost no extra computational cost, hybrid connectivity graphs that contain both co-visibility and pose-pose constraints. These constraints can in turn be used for either PGO, or to generate optimal results using a full inverse-depth BA over the keyframe poses and their corresponding landmarks.

Advantageously, embodiments of the present disclosure for loop closure provide:

- The ability to leverage the advantages of both Direct and Indirect formulations to achieve a robust camera pose estimation, with accuracy on par and, in some cases, outperforming other methods in Direct and Indirect Monocular SLAM/Odometry systems.
- The ability to determine both local and global map representations at a fraction of the time required by Indirect methods to build and maintain their global map only, and at a mere increase of 14 ms per keyframe when compared to strictly local Direct Odometry systems.
- A reduced memory consumption, where the proposed unified global/local map requires less than half of the memory consumption typically associated with other SLAM methods.
- Tracking of both pose-pose and co-visibility constraints, and the ability to make use of them during loop closure for added robustness in feature-deprived environments, while maintaining the ability to re-populate the co-visibility constrains after loop closure is performed, allowing for subsequent optimization (such as full inverse depth BA).

As described herein, Visual Odometry is a numerical optimization process that integrates new measurements given old ones. As the system 150, via the images received from the camera 190, explores its environment, accumulated numerical errors can grow unbounded, resulting in a drift between the true camera trajectory and scene map, and their current system estimates. A typical monocular SLAM system can drift along all rotation, translation and scale axis, resulting in an ill-representation of the camera motion and scene reconstruction, which in turn can lead to catastrophic failure. Loop closure is a mechanism used to identify and correct drift. The process can be split into three main tasks, (1) loop closure detection, (2) error estimation, and (3) map correction.

Loop closure detection is the process of flagging a candidate Keyframe from the set of Keyframes that were previously observed, and share visual cues with the most recent Keyframe (i.e., the camera has returned to a previously observed scene). However, significant drift might have occurred between past and current measurements, therefore the Keyframe poses cannot be used to detect loop closure, instead SLAM systems must rely on visual cues only to flag candidate keyframes; hence the naming of appearance-based methods. While most SLAM systems perform loop closure, their implementations differ according to the type of information at their disposal. For example, low level features (e.g., patches of pixels) are susceptible to viewpoint and illumination changes, and are inefficient at encoding and querying an image. Therefore, most Direct odometry systems discard them once they go out of view. To perform loop closure, Direct systems require auxiliary features; for example, LSD SLAM extracts STAR features from its keyframes and associates them with SURF descriptors, which are in turn parsed through OpenFABMAP (an independent appearance-only SLAM system) to detect loop closure candidates. Similarly, LDSO extracts corner features with their associated ORB descriptors and uses them to encode and query the keyframes for loop closure candidate detection using a BoVW model. In contrast, ORB-SLAM does not require separate processes; the same features used for odometry are parsed in a BoVW to compute a global keyframe descriptor, which is then used to query a database of previously added keyframes for potential loop closure candidates.

Error estimation occurs once a candidate Keyframe is detected, its corresponding map point measurements are matched to the most recently added 3D map points, and a similarity transform $T \in Sim(3) := [sR|t]$) that minimizes the error between the two 3D sets is computed. The found Similarity transform is a measure of how much one end of the loop closure keyframes must change to account for the accumulated drift, and is therefore applied on the keyframes such that the matched old and new 3D points are fused together. This process is slightly different between various loop closure methods, but can have a significant impact on the resulting accuracy. In particular, ORB SLAM establishes 3D-3D map point matches between the loop-ends, which are then used in a RANSAC implementation to recover a similarity transform. The new similarity is used to search for more map point matches across other keyframes connected to both loop ends. This returns a relatively large set of 3D map point matches that originates from several keyframes on both sides of the loop. The overall set of 3D matches is then used to refine the Similarity transformation estimate. In contrast, LDSO only establishes 3D map point matches between the currently active keyframe and one loop candidate keyframe. The loop candidate keyframe is also found through BoVW; however, it only has one requirement, that is to be outside the currently active window. Therefore, the number of used matches is considerably lower than that of ORB SLAM, resulting in an often non-reliable Similarity transform. Moreover, since the only requirement for a loop closure candidate is that it exists outside the current active window, LDSO often performs consecutive loop closures whenever the camera transitions away from a scene and returns to it few seconds later. These recurrent loop closures, along with the non-reliable similarity transforms, can introduce significant errors into the 3D map.

Path correction is an error estimation process that corrects the loop-end keyframes, however it does not correct the accumulated drift throughout the entire path. For that, a SLAM system must keep track of the connectivity information between the path keyframes in the form of a graph, and subsequently correct the entire trajectory using a Pose Graph Optimization (PGO); which is a sub-optimal optimization that distributes the accumulated error along the path by considering pose-pose constraints only while ignoring the 3D observations.

To be able to perform PGO, some notion of connectivity between the keyframes must be established. To that end, ORB SLAM employs several representations of such connections. In particular, the Covisibility graph is a by-product of ORB SLAM's feature matching on every keyframe, where a connectivity edge is inserted between keyframes that observe the same 3D map points. ORB SLAM also uses a Spanning tree graph, made from a minimal number of connections, where each keyframe is connected to its reference keyframe and to one child keyframe only. Finally, ORB SLAM also keeps track of an Essential graph, which contains the spanning tree and all edges between keyframes that share more than 100 feature matches. Note that the Spanning trees Essential graphs Covisibility graph; and while the full Covisibility graph can be used for PGO, ORB SLAM uses the Essential graph and cites the computational efficiency as a reason since the Covisibility graph might introduce a large number of constraints. While ORB SLAM's connectivity graphs are based on finding feature matches between keyframes, LDSO does not have access to such information as it does not perform nor keeps track of feature matches between keyframes. Instead, it considers all keyframes that are currently active in the local window to be connected, and accordingly adds an edge between them in its connectivity graph. While this works well in feature-deprived environments (where not enough feature matches can be established), it has several drawbacks when compared to its ORB SLAM counterpart. In particular, whenever a loop closure takes place in ORB SLAM, new connections between keyframes that were previously disconnected due to drift are updated based on their mutually observed map points; such update is not possible within LDSO's model.

The loop closure module 178 generally uses loop closure constraints of two types: pose-pose constraints and co-visibility constraints. Co-visibility constraints are connections added to the graph whenever features are matched between nodes (keyframes). For example, if Keyframe has thirty feature matches with Keyframe 10, then a connection is added between them. Pose-pose constraints are generally not based on observed matches, but are based on time intervals; typically using a function that selects which keyframe is to be dropped from a local window when a new keyframe is added, in such a way that the distance between the keyframes in the local window is maximized. The loop closure module 178 uses a hybrid connectivity graph to generate substantial advantages in comparison to other approaches. By maintaining both types of connectivity information, the hybrid connectivity graph can add connections between keyframes based on their shared 3D map points (useful when loop closure occurs or when previous scenes are re-observed), while also maintaining the capability of adding connections in feature-deprived environments based on temporal proximity of the added keyframes. Moreover, adding both types of information allows for more optimal optimization approaches, such as full Bundle Adjustment, on both the path and reconstructed scene.

For proper operation, Direct systems typically add a relatively large number of keyframes per second; while this is generally not an issue for pure odometry methods (constant memory consumption), the unbounded memory growth becomes an issue for SLAM systems that maintain and re-use a global map representation. To maintain a reasonable memory consumption and keep compute-time low, ORB SLAM invokes a keyframe culling strategy that removes keyframes whose 90% of map points are visible in other keyframes. This, however, has a negative impact on the final result's accuracy since culled keyframes are completely removed from the system, whereas their poses could have been used to better constrain the estimated trajectory. On the other hand, even though LDSO does not make use of its global map for pose estimation and mapping, it has to store in memory all keyframes, along with their associated Indirect features, and their depth estimates to be able to perform loop closure. Since LDSO does not perform feature matching to detect redundant keyframes, it cannot invoke a keyframe culling strategy, resulting in a relatively large memory consumption. Additionally, despite the fact that DSM does not have a loop closure module, it blurs the line between what can be considered an odometry system in contrast to a SLAM system because it is a Direct method that keeps track of a global map and attempts to re-use it for both pose estimation and mapping (but without loop closure). This, however, means storing a large amount of information per keyframe and querying them whenever a new keyframe is added. The result is a global map that requires a relatively large memory consumption, while suffering from a large computational cost whenever a new keyframe is added. DSM mitigates these issues by adding fewer keyframes than other Direct methods.

The loop closure module 178 mitigates the issues of frequent keyframe addition, along with its associated memory growth and increased map querying time, by using Descriptor sharing. In a particular case, a map point can have several representations (e.g., ORB descriptors, patch of pixels, or the like), and the loop closure module 178 can therefore efficiently query landmarks from the local and global map. The local map having, in essence, a subset of the metric map information (i.e., coordinates of 3D points and 3D poses of keyframes) from the global map. The loop closure module 178 can also maintain connectivity information between the keyframes, allowing it to perform keyframe culling while making use of the removed keyframes poses within the pose-pose constraints graph to refine the trajectory in the future. The pose-pose constraints graph representation can be viewed as a higher level of abstraction of the global map, where each keyframe is represented by a node, and information that can relate two nodes is represented by an edge between them. Such information can either be shared features (e.g., co-visibility edges), or pose-pose constraint (e.g., temporally connected Keyframes).

In this way, each keyframe has common feature matches such that the features extracted match when they refer to common 3D scene landmarks. In the pose-pose constraints graph, each pose refers to a keyframe that has common links to a feature if that feature is seen in each keyframe. Advantageously, these redundancies help establish constraints in minimizing the error to correct the trajectory and 3D estimate when bundle adjustment is initiated on loop closure, as described herein. When performing the optimization described herein, the graph representation can be used to establish factors that may affect what other factors, with the associated metric data able to be used to determine a fit score function that can be minimized. For the pose-pose constraints, the associated keyframes are temporally captured and should therefore have smooth motion between them; thus, this information can be used for smoothing by reducing sudden or large motions between the keyframes in the trajectory by minimizing accumulated errors over the path.

Further advantageously, memory management routines allow the loop closure module 178 to maintain both local and global representations of a scene at a fraction of the memory required by other Direct, Indirect, and other hybrid methods.

Figure 8:
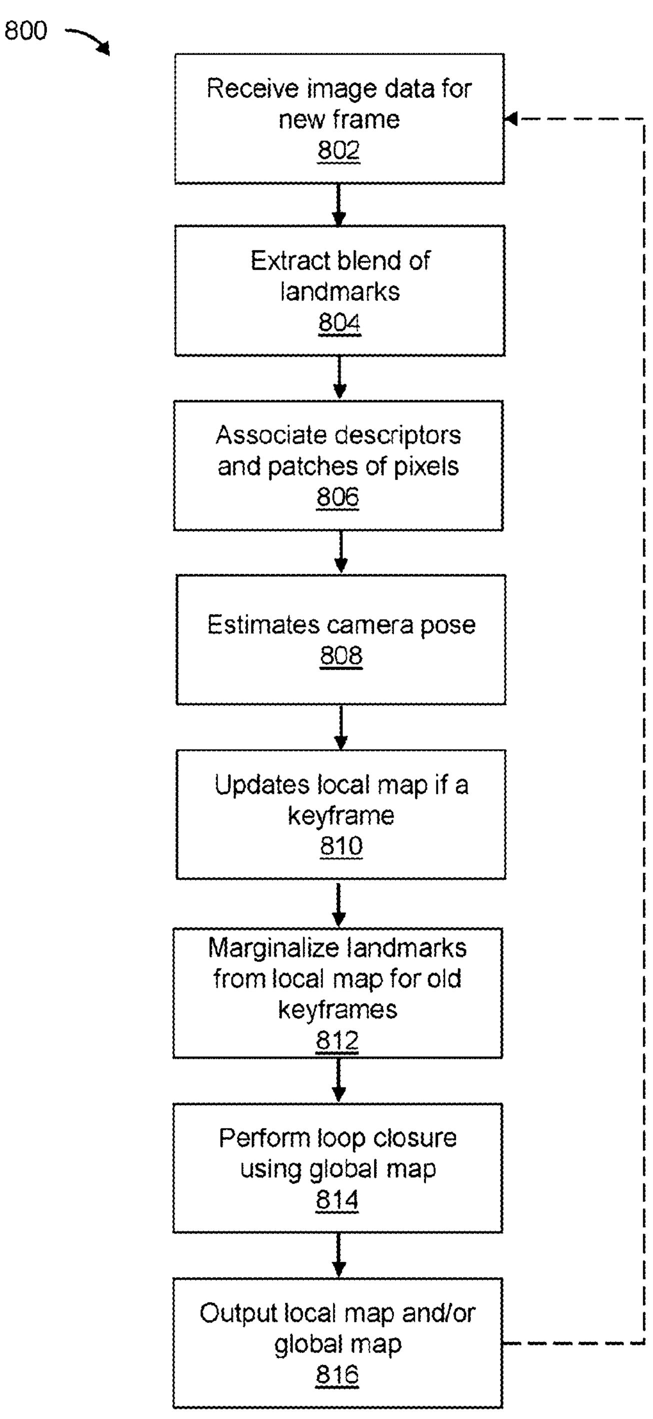
FIG. 8 is a flow diagram showing a method for hybrid scene representation with loop closure for visual simultaneous localization and mapping, in accordance with an embodiment.

FIG. 8 is a flowchart showing a method 800 for hybrid scene representation with loop closure for visual simultaneous localization and mapping, in accordance with an embodiment, and in accordance with various aspects of the method 200. At block 802, the input module 170 receives the image data representing a new frame to be processed; such as from the device interface 158, the database 166, or the network interface 160 (such as communicated over the Internet or other network). At block 804, the pre-processing module 172 extracts a blend of landmarks, the landmarks comprising detected corners and pixel locations with a gradient above a threshold. At block 806, the matching module 174 associates descriptors and patches of pixels with the extracted landmarks. At block 808, the mapping module 176 estimates a camera pose by performing feature matching and relative pose estimation in comparison to a previous frame and performing a joint multi-objective pose optimization over both photometric and geometric residuals determined from the descriptors and patches of pixels. At block 810, where the frame is a keyframe, the mapping module 176 updates the local map by performing Photometric Bundle Adjustment to determine a depth associated with the descriptors and the patches of pixels. At block 812, the mapping module 176 marginalizes extracted landmarks from the local map that are older than a predetermined number of keyframes and adds descriptors associated with the marginalized landmarks to a global map. At block 814, the loop closure module 178 performs loop closure by determining if there are any loop candidates, and where there are loop candidates, performing a 3D-3D map point matching between a keyframe associated with the loop candidate and a keyframe most recently added to the global map and rejecting the candidate keyframe if there is an insufficient number of matches (i.e., the number of matches is below a predetermined threshold). At block 816, the output module 180 outputs the local map and/or the global map to the device interface 158, the database 166, or the network interface 160. In most cases, the system 150 can repeat back to block 802 when a new frame is received.

Figure 9:
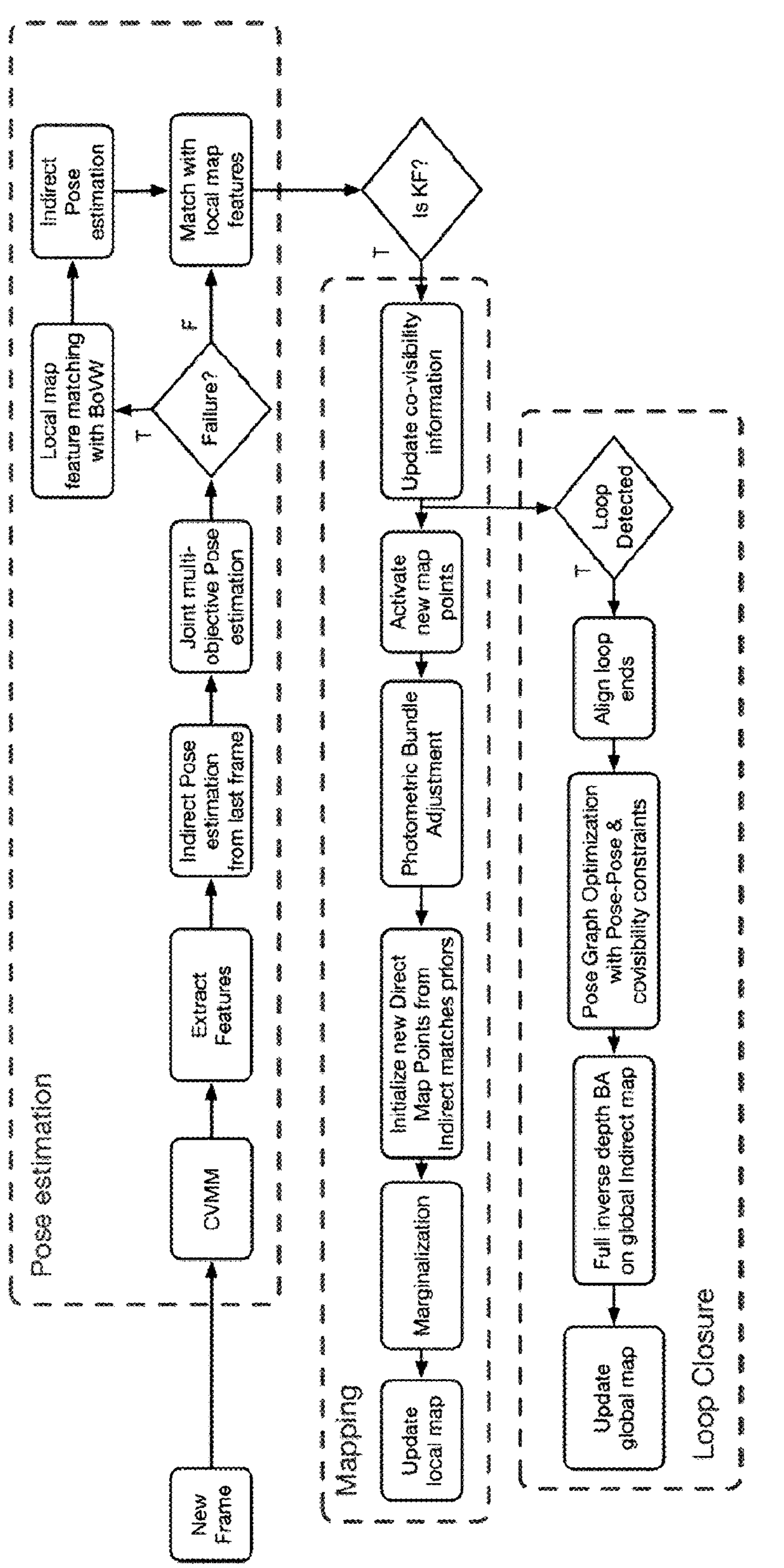
FIG. 9 depicts an example diagram of operation of simultaneous localization and mapping with loop closure using the system of FIG. 2.

FIG. 9 illustrates an architecture for Visual SLAM, in accordance with an embodiment. There are three parallel threads, namely, pose estimation, mapping, and loop closure. There are several substantive modifications from other approaches that are used to, at least, generate both local and global maps concurrently; i.e., no separate map representations. This approach allows the joint pose optimization to be efficiently performed in order to maintain a current moving window and a set of features that were marginalized within the same process, and to perform loop closure all within the same framework.

Figure 10:
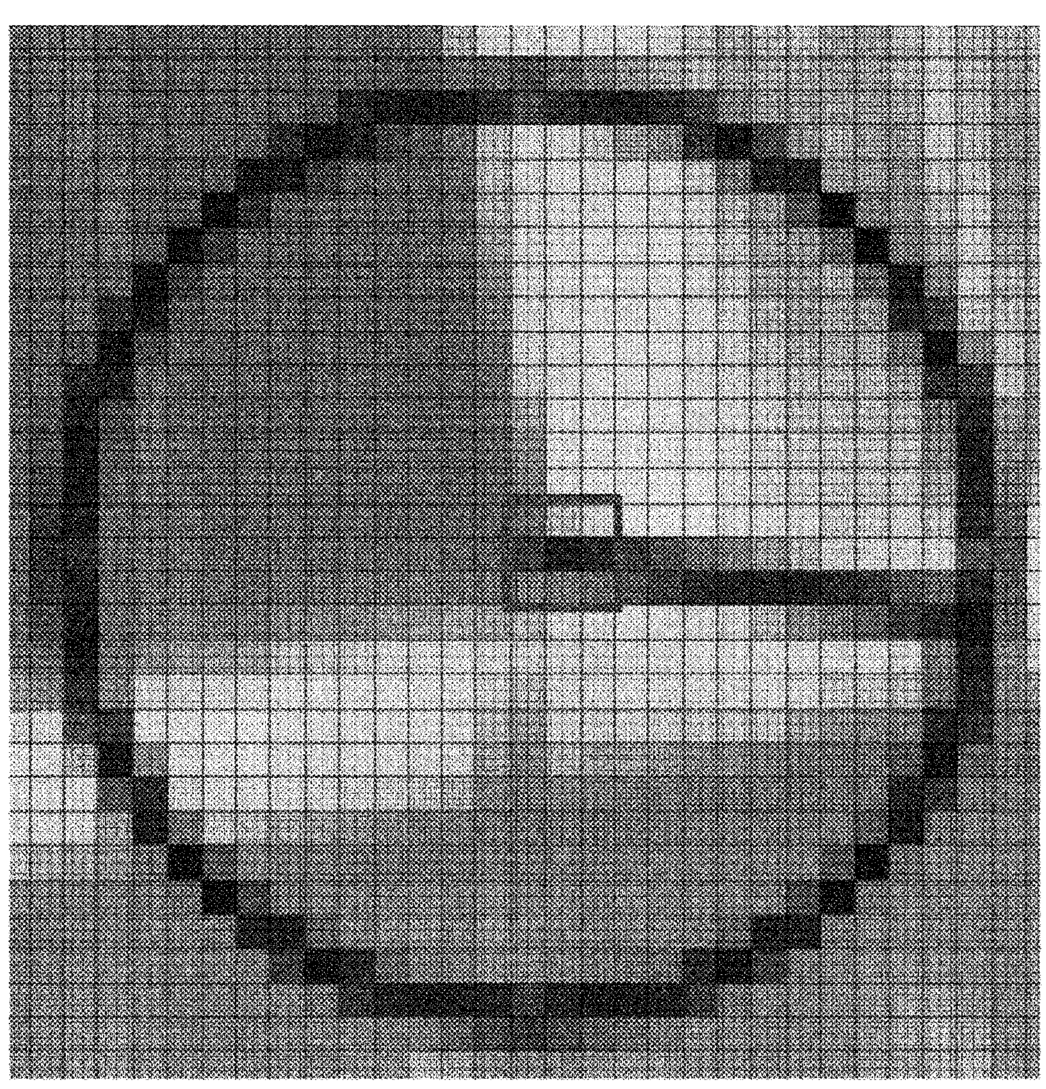
FIG. 10 illustrates an example of descriptor sharing in accordance with the system of FIG. 2.

Advantageously, the loop closure module 178 uses descriptor sharing, which is the idea of associating several types of descriptors with the same feature. For example, one could detect corners and simultaneously associate them with both an ORB descriptor and a patch of pixels. This enables the use of each descriptor in its favorable conditions to perform various SLAM tasks. For example, the patch of pixels can be used to perform low-parallax triangulation, while the ORB descriptor can be used to perform large-baseline feature-matching that can be used for pose estimation, to build connectivity graphs, and to maintain a global map that allows landmark re-use, and the like. FIG. 10 illustrates an example of descriptor sharing where one feature can have several descriptors. In this case, it has an ORB descriptor represented with the circle, and a patch of pixels descriptor represented with the square.

For the purposes of clarity, the present disclosure will define what is meant by the different features, their corresponding residuals, and their uses, and what is meant by local and global maps. For features, a blend of feature types are extracted, for example, corners using the FAST detector, and they are augmented with pixel locations whose gradient is above a dynamic cut-off threshold. The advantage of using a blend of features is two-fold. Firstly, FAST corners are repeatable and stable; in contrast, pixel locations with high gradients (gradient-based features) are typically detected along edges, and therefore are not stable (they tend to drift along the edge directions), thereby reducing the overall VSLAM performance. Secondly, a texture-deprived environment can cause a significant decrease in detected corners and may lead to tracking failure. In contrast, gradient-based features can be abundantly extracted along any gradient in the image (some information in this case is better than no information).

Once the two types of features are extracted, they can be treated equally and they can be associated with both ORB descriptors and patches of pixels. The ORB descriptors will be used to perform feature matching, establish a geometric re-projection error, maintain a global co-visibility graph among keyframes, and for performing loop closures. On the other hand, the patch of pixels will contribute towards computing the photometric residuals, for estimating the depth of the features, and to perform the photometric Bundle Adjustment.

With respect to local and global maps, the system 150 uses landmarks in both definitions, using the same inverse depth parametrization. This effectively allows re-activation of the global landmarks in the local window when re-observed. This is generally not feasible in other Hybrid approaches as they convert the marginalized map points to an (X,Y,Z) representation, and thus require separate map maintenance processes to mitigate drift between the two representations.

The mapping module 176 estimates the camera pose in two sequential steps: (1) by performing feature matching and relative pose estimation with respect to the last frame; followed by (2) a joint multi-objective pose optimization over both photometric and geometric residuals. The present inventors determined that performing the feature matching and relative pose estimation first can help establish more reliable (less outlier) feature matches in the subsequent joint optimization. This is because the search window for matches can be set to a tighter size when matching sequential frames. Since the second optimization had fewer outliers to deal with, the overall computational cost is similar to using the joint optimization alone.

In some cases, a mechanism to perform failure recovery using BoVW can be used in case not enough matches are found. Generally, the smallest number of feature matches to theoretically be able to solve the VSLAM problem is 4 indirect feature matches. However, practically, this is mostly insufficient and unreliable, and would likely fail within seconds. For a "reliable" estimate, the mapping module 176 would generally require, for example, about 80 to 100 feature matches; but any suitable number of matches can be used according to the motion (fast versus slow), distance from scene, quality of camera, and the like. In a particular case, the mapping module 176 can monitor the hessian matrix of the frame pose optimization, which is an indicator of the pose estimate covariance. If the covariance is large, then the indirect method is discarded and the mapping module 176 can rely in direct residuals alone. If the covariance is small, then the mapping module 176 can use the logistic utility function that controls how much weight to put on Indirect and Direct residuals. The logistic utility function can be tuned (e.g., manually) to even out the starting point of the optimization (equal contribution between Direct and Indirect residuals at the start of optimization) around, for example, forty feature matches. As the optimization progresses, the logistic utility function generally decreases the weight on Indirect and focus more on Direct.

Generally, failure recovery due to not enough matches will occur when there is not enough of both Direct and Indirect residuals; such as where the co-variance of the final joint optimization is large, or if the mapping module 176 is not able to match more than, for example, twenty Indirect matches, and at the same time, the mapping module 176 is not able to extract more than, for example, 200 Direct features (i.e., usable pixels). In this situation, tracking can be considered lost and the mapping module 176 can attempt to recover from the global map. Such recovery includes converting the Keyframe into a Bags of Visual Words, and using this conversion to query the global map for a close match. Subsequently, the mapping module 176 attempts to repeat the optimization using metric data stored in the global map. If the optimization is successful, tracking proceeds as otherwise described herein. If the optimization is not successful, tracking is deemed to have failed and the present frame is dropped; and the system 150 awaits the next frame.

The mapping module 176 localizes the camera pose by concurrently minimizing both photometric and geometric residuals. Since both types of descriptors have different but complementary properties, a utility function is used to analyze the current observations and accordingly modify the weights of each residual type as the optimization progresses. This scalarized multi-objective optimization is summarized as:

$$\underset{\xi}{\operatorname{argmin}} e(\xi) = \underset{\xi}{\operatorname{argmin}} \left[ \frac{\|e_p(\xi)\|_\gamma}{n_p \sigma_p^2} + K \frac{\|e_g(\xi)\|_\gamma}{n_g \sigma_g^2} \right] \tag{54}$$

where K is the utility function's output, n is the count of each feature type, $\sigma^2$ is the residual's variance, $\|\bullet\|_\gamma$ is the Huber norm, and the energy per feature type is defined as:

$$e_p(\xi) = (r^T W r)_p, \text{ and } e_g(\xi) = (r^T W r)_g \tag{55}$$

and r is the vector of stacked residuals per feature type, that is $r_p$ represents the photometric residuals (pixel intensity differences) and $r_g$ represents the geometric reprojection residual (pixel distance difference). Further:

$$W = 1\left( \frac{\frac{1}{\sigma_d^2}}{\max\left(\frac{1}{\sigma_d^2}\right)} \right) \tag{56}$$

is a weight matrix that dampens the effect of landmarks with large depth variance on the pose estimation process.

Residual balancing is a useful aspect of multi-objective optimization that is often neglected in other VSLAM approaches, leading to fallacies such as the joining of pose-pose constraints with geometric re-projection errors. In some cases, the mapping module 176 balances the residuals by normalizing against their variance and number of measurements. In such cases, depth points with large residuals (i.e., a lot of uncertainty in their estimate) can be weighted with less value (according to Equation (56)) when estimating pose estimates. When optimizing the multi-objective optimization, it is generally in the form of an addition of two scalars: a+k*b, where k is the logistic utility function (also a scalar). Generally, a and b must have similar magnitudes and are not affected by the number of measurements (e.g., indirect features are typically in 100 to 200 features, whereas direct features are typically in 1800 to 2000). To balance these number of measurements, a variance of the Indirect residuals alone and the number of observations can be computed. A new a can be determined as: a/(n_ind*var(a)), and the new_b can be determined as: b/(n_dir*var(b)). In this way, the residuals are not affected by their magnitude nor their numbers.

The logistic utility function provides a mechanism to steer the multi-objective optimization as it progresses, allowing the mapping module 176 to incorporate prior information on the behaviour of the different descriptor types. For example, pixel-based residuals have a small convergence basin, whereas geometry-based residuals are better behaved when starting the optimization from a relatively far initializing point. As such, the utility function gives higher weights to the geometric residuals in the early stages of the optimization and gradually shifts that weight towards the pixel-based residuals. Similarly, geometric residuals are prone to outliers in texture-deprived environments and under motion blur. The proposed logistic utility function decreases the effect of the geometry-based residuals when the number of feature matches is low. Both of these effects are captured by $$K = \frac{5e^{-2l}}{1 + e^{\frac{30-N_g}{4}}} \tag{57}$$

where l is the pyramid level at which the optimization is taking place, and $N_g$ is the number of current inlier geometric matches.

In some cases, local mapping can include a predetermined number of keyframes (e.g., 7) within a moving window; where old keyframes are marginalized when new ones are added. The map also contains a set of landmarks (features) associated with both patches of pixels and ORB descriptors concurrently, and whose depth estimate can be modified within a local photometric Bundle Adjustment. Since keyframe addition and removal is performed through marginalization, the local map also contains prior factors that encode the probability distribution of the remaining states in the local map given the marginalized data. This approach makes local maps difficult to modify as any edits or subsequent post-processing like loop closures would render the prior factors meaningless, and introduce significant errors into the local Bundle Adjustment.

In some cases, a keyframe can be added if a mean optical flow is bigger than a predetermined threshold (representative of the observed scene having moved significantly). In some cases, a keyframe can be added if an estimated exposure time difference between a current frame and a previous frame is large (representative of the global illumination conditions having changed). In some cases, a further condition can be used where if the number of Indirect feature matches drops below a predetermined threshold, a keyframe is added so that the system 150 can re-populate the Indirect features. For example, every $7^{th}$ frame can be a keyframe as long as such frame conforms to the condition that there are enough matches in common. Typically, each frame is not used as a keyframe because it would be excessively taxing on computing resources.

In some cases, the local map can be extended beyond a currently active set of features to include recently marginalized landmarks that can still be matched to the latest keyframe using their ORB Descriptors. This allows recently marginalized landmarks to contribute towards the pose estimation. However, since these landmarks may have a different parameterization than their local counterparts, they may not be able to re-activate within the local window and they may not be able to be maintained for future re-use. Instead, keyframes in the extended local map, along with their features, can be completely dropped whenever all of their corresponding features are no longer observed in the latest keyframe. In a particular embodiment, this extended set of keyframes and landmarks, beyond assisting the local active map, can be used to build a global and queriable global map that enables loop closure and allows for future feature re-use within the local window.

In most cases, both global and local maps are comprised of the same, or similar, keyframes and landmarks, using the same inverse depth representation. Advantageously, the global map is only made of keyframes and landmarks that were marginalized from the local map and are no longer part of the local Photometric Bundle Adjustment. Once marginalized, the patch of pixels descriptors associated with the features can be removed to keep memory cost low. However, their inverse depth and variance estimates can be maintained, which are held fixed until their ORB descriptor matches a feature from the active map, at which point two different mechanisms are provided to re-use and update the global features:

- Early adoption: before adding new map points to the local map, a feature matching is performed between the global map and the new keyframe being added. If a match is found, the global map point is then re-activated in the local map by assigning a local patch of pixels descriptor extracted from the new keyframe, and by initializing its depth estimate and variance using their last estimates before they were marginalized.
- Late fusion: during map maintenance, there is a check for matches between the currently active map points and the global ones. If a match is found, a check is performed to determine if the projected depth estimate of the global point is in close proximity to the local one; i.e., the local depth$-2\sigma_d \leq$projected global depth$\leq$local depth$+2\sigma_d$, where $\sigma_d$ is the uncertainty or deviation in the depth estimates. If this condition is met, the map point is re-activated and assigned to the local one by fusing their observed keyframe information, and by fusing their depth estimates and variance.

Once a global map point is re-activated, its depth estimate and variance are maintained using the local photometric Bundle Adjustment until it is marginalized again, thereby not requiring separate map maintenance processes.

The availability of temporally connected and co-visibility information provide a rich set of constraints relating the keyframes and their observed landmarks, giving the freedom to perform various types of optimizations (e.g., PGO, full BA, etc.). Loop closure, performed by the loop closure module 178, starts by parsing the newly added keyframe into a BoVW model to generate a global keyframe descriptor, which is in turn used to query the global database of keyframes for potential matches. In some cases, to prevent spurious detections (which are common in LDSO), candidates connected to the latest keyframe in the covisibility graph are discarded. If no loop candidates are found (which is the common case for most keyframes), the loop closure thread ends. However, if a loop candidate is found, a 3D-3D map point matching is performed between the loop candidate keyframe and the most recently added one, and the matches are used to compute a corrective Sim(3) in a random sample consensus (RANSAC) implementation. The corrective Sim(3) is used to establish more 3D-3D map point matches from keyframes connected to both sides of the loop. In this way, the co-visibility graphs of both sides of the loop are queried to build a set of keyframes, from which more 3D-3D matches are determined and used to further refine the Sim(3) estimate. This typically returns a large number of inlier matches (orders of magnitude more than those used in the loop closure of LDSO) that supports the present similarity transform and limits the risks of incorporating erroneous transforms into the map. On the other hand, if an insufficient number of matches are found, the loop closure thread rejects the candidate keyframe; otherwise, it uses the corrective Sim(3) to correct the poses of all keyframes that contributed feature matches from one side of the loop. Since a moving active window is used to explore the scene, the more recent side of the loop can be fixed and corrected using the old observations. Insufficiency of matches, and thus the threshold for number of matches, will generally depend on the number of matches required by the above photogrammetry equations in order to find a match. In an example, the threshold can be empirically set to 20 features because the present inventors determined that a lower threshold sometimes resulted in unreliable similarities being estimated because feature matches used are from an outlier keyframe. However, any suitable threshold can be used. Aside from not breaking the priors in the local window, this has the advantage of running the loop closure correction without the need to lock the mapping thread. That is, regular pose estimation and mapping processes can continue normally in their respective threads while the Loop Closure correction takes place on the third parallel thread.

The corrected keyframes are thus considered fixed, and a Pose Graph Optimization (PGO) can be used to correct the remainder of the path. The present embodiment uses advantageous types of constraints in comparison to, for example, ORB SLAM. While ORB SLAM can only make use of co-visibility constraints, the system 150 make use of several sources. In particular, the temporally connected keyframes provide pose-pose constraints in feature deprived-environments, allowing the optimization to smooth the path in these locations. In some cases, the system 150 also uses poses of removed keyframes as part of the pose-pose constraints; they can be thought of as control points that can further help constrain the traversed trajectory.

PGO is relatively fast to compute, requiring approximately 800 ms to correct a path made of 700 keyframes. Generally, it achieves this speed by discarding 3D observations during its path correction; therefore, its results are sub-optimal in the present circumstances. To achieve closer-to-optimal results, the system 150 further refines the loop closure result by performing a full inverse depth Bundle Adjustment using the connectivity and 3D map point observations. In this way, loop closure causes adjustment to the localization estimates and 3D map points by reprojecting the errors, taking into account that a given end point (point of loop closure) is the same. As loop closure can be used to measure accumulated drift between a keyframe that was previously captured in comparison to the present keyframe, and determine a path such that the observed error at the loop ends to 0. This approach can be sub-optimal because it may not respect feature observation constraints, but rather just a type of path smoothing. The loop closure module 178 can ensure that the features are coherent with the new poses by using the Bundle Adjustment. Advantageously, the system 150 uses inverse depth parametrization performed in the local map optimization and apply it on the global map. In this case, Bundle Adjustment is a non-linear optimization that minimizes the fit score over an entire set of measurements in the global map. The fit score is the re-projection error of each feature in each keyframe in which the feature is observed. The full inverse depth BA optimizes the location of these features (encoded as inverse depth in their origin keyframe), and the pose of each single keyframe that observes such features. Advantageously, the optimization on the inverse depth has been determined to result in more accurate results.

Figures 11A, 11B:
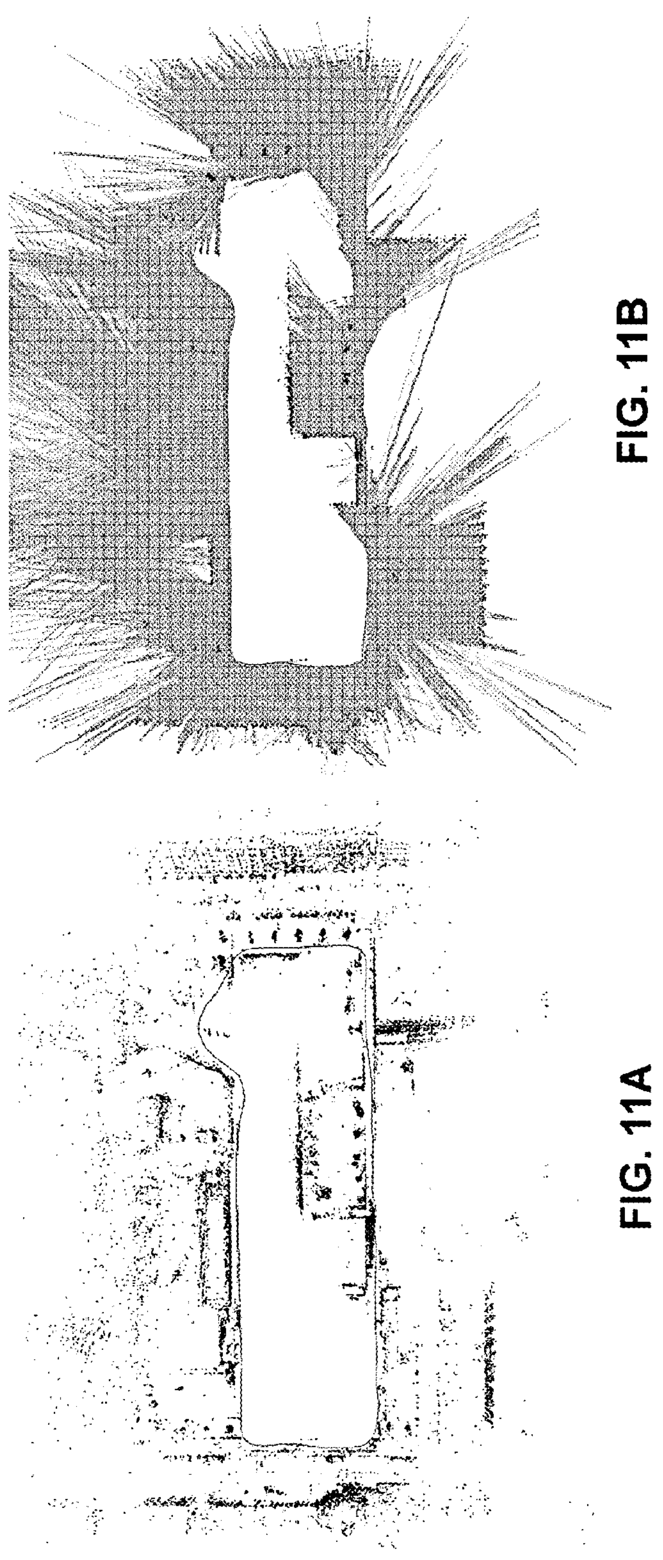
FIG. 11A illustrates a Global map and traversed trajectory after loop closure and Global inverse depth Bundle Adjustment on an example dataset using the system of FIG. 2.
FIG. 11B illustrates graph constraints that were used in a full bundle adjustment using the system of FIG. 2.

The connected graph of the full inverse depth BA is shown in FIGS. 10A and 10B. Note that the full inverse depth BA is not possible in odometry methods or Direct SLAM methods (like LDSO) as the necessary information is not tracked. It is also not possible in other hybrid approaches as they maintain a different map representation between the local and global maps. FIGS. 11A and 11B illustrate an example of a top view sample map output from the system 150. FIG. 11A shows a Global map and traversed trajectory after loop closure and Global inverse depth Bundle Adjustment on sequence 49 of the TUM Mono dataset. FIG. 11B shows graph constraints that were used in the full BA to constrain the 3D map points and their corresponding keyframes in which they were observed. This approach can compute the result without interfering with the other thread operations as it considers all keyframes from or newer than the active window at the time of loop closure detection fixed, and only modifies marginalized keyframes and map points.

Figure 12A:
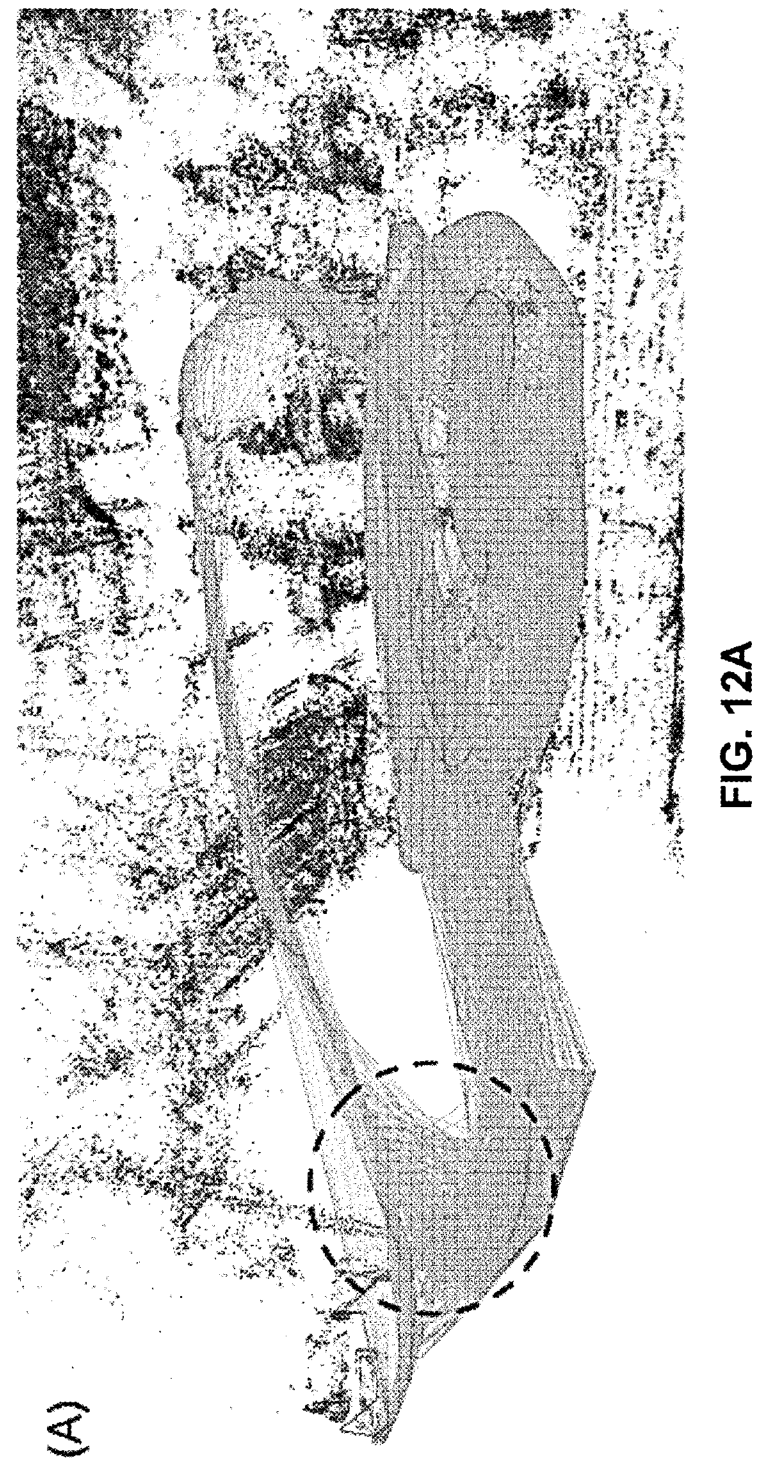
FIG. 12A shows an example of both pose-pose and covisibility constraints with the system of FIG. 2.
Figure 12B:
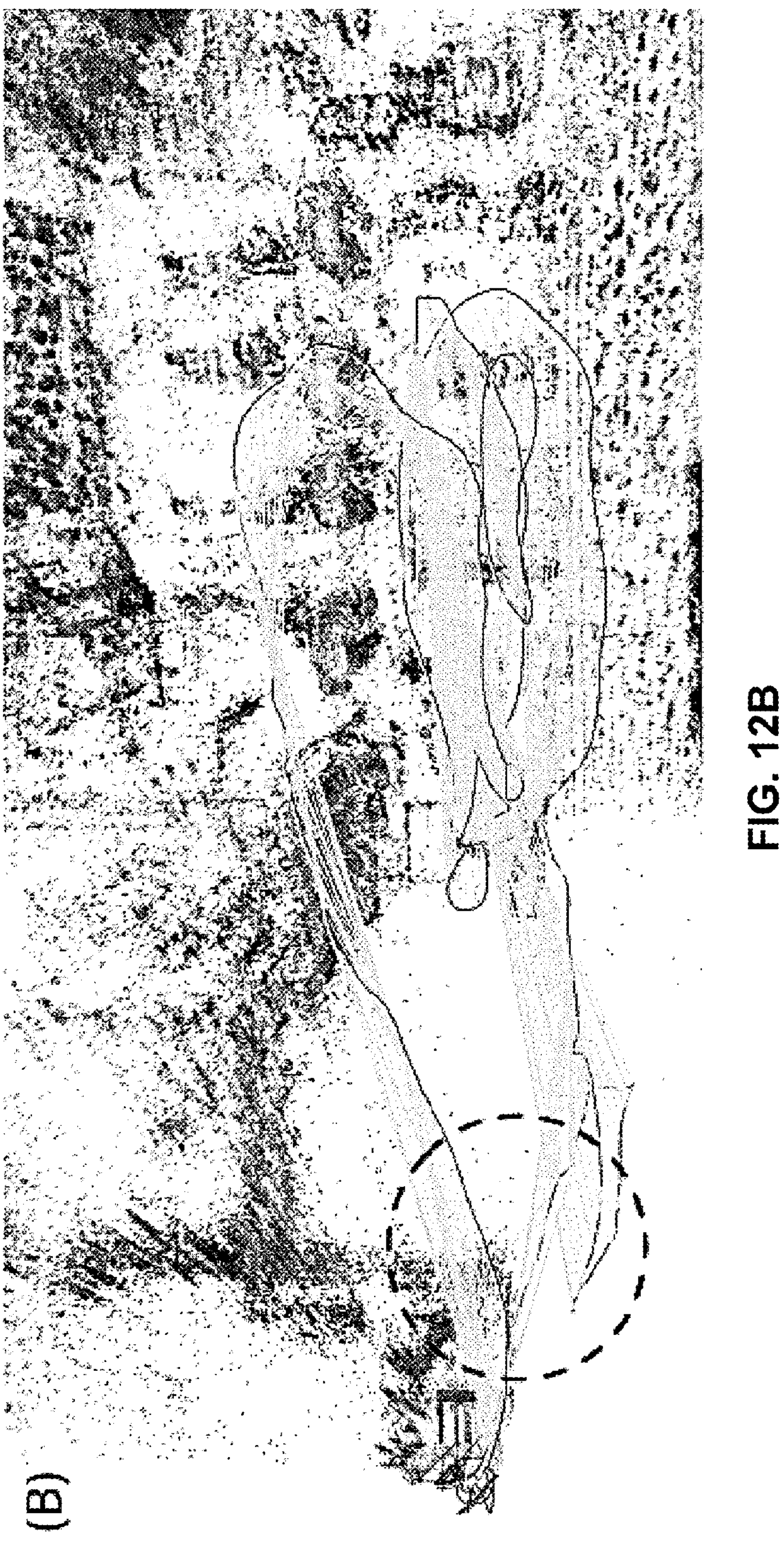
FIG. 12B shows pose-pose constraints from Direct Sparse Odometry with Loop Closure (LDSO)
Figure 12C:
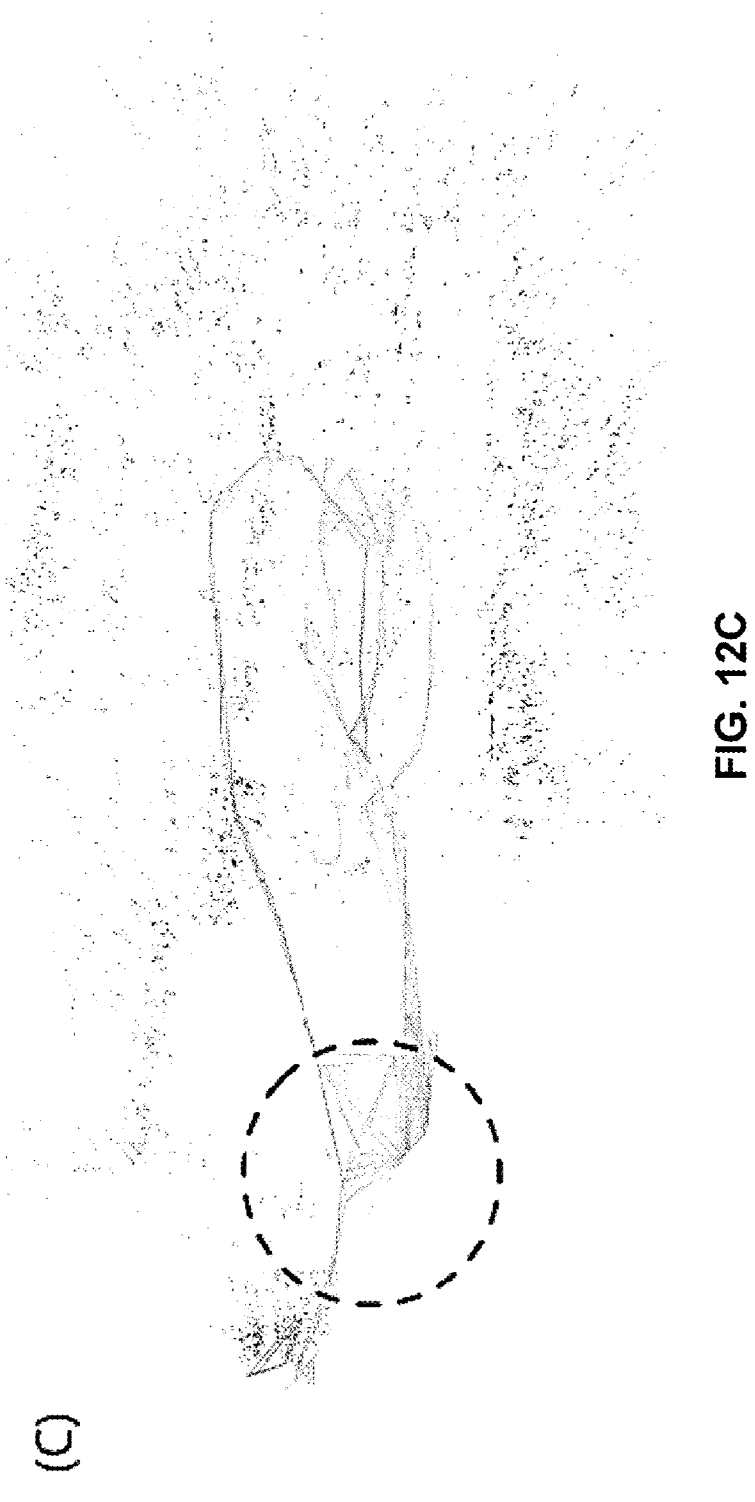
FIG. 12C shows covisibility constraints from ORB SLAM 2.

The use of both covisibility and pose-pose graphs allow the system 150 to generate a relatively dense network of constraints when compared to that of other approaches, such as ORB SLAM 2's or LDSO's networks, as exemplified in FIGS. 12A to 12C. Note that ORB SLAM employs a keyframe culling strategy, thereby removing redundant keyframes from its map. This in turn results in a pruned set of covisibility constraints. On the other hand, LDSO's pose-pose constraints cannot be updated to account for new constraints when loop closure takes place, whereas the system 150 can recognize and add new connections between keyframes that were once unconnected due to large drift.

FIGS. 12A to 12C show an example of constraints available for Pose Graph Optimization in the Euroc dataset, on the MH_01_easy left images sequence. Each line represents a constraint between 2 keyframes. FIG. 12A shows both the pose-pose and covisibility constraints with the approach of the present embodiment. FIG. 12B shows the pose-pose constraints from LDSO. FIG. 12C shows the covisibility constraints from ORB SLAM 2. Approaches that use co-visibility constraints, FIGS. 12A and 12C, can re-establish correspondences between old and new measurements when loop closure is detected (circled areas where the density of constraints increase between the keyframes along both ends of the loop), whereas approaches that use pose-pose constraints only FIG. 12B cannot recover such constraints, as they only track temporal constraints even after loop closure.

The present inventors conducted example experiments to demonstrate the advantages of the present embodiments. A computational cost analysis of the various SLAM systems was performed on the same CPU (Intel core i7-8700 CPU @ 3.70 GHz CPU; no GPU acceleration was used). The results are shown in TABLE 1; which shows average computational cost (ms) associated with tracking and mapping threads for various VSLAM systems. To ensure fairness, all systems were evaluated on the same sequence, and the results were averaged across all frames of MH_01_ easy sequence of the Euroc dataset. Note that this sequence is a camera moving around a closed room. The obtained times may differ in different scenarios (e.g., the computational cost might be different in pure exploratory sequences).

TABLE 1

| Average Time (ms) | System 150 | LDSO | ORB SLAM 2 | DSM |
|---|---|---|---|---|
| Tracking (frame-rate) | 14.12 | 6.11 | 27.38 | 8.41 |
| Mapping (keyframe-rate) | 65.43 | 93.64 | 312.08 | 620.17 |

The average tracking time per frame for the system 150 is 14 ms, during which an indirect optimization first takes place, followed by a joint multi-objective optimization. In contrast, LDSO and DSM are Direct systems, thus only requiring around 6 ms to perform Direct image alignment. ORB SLAM 2 requires an average of 27 ms to extract features from several pyramid levels and computes the frame's pose.

The entire mapping process of the approach performed by the system 150 requires on average 65 ms per keyframe to generate and maintain both the direct and Indirect global maps. In contrast, LDSO mapping thread requires 93 ms to process a keyframe, and ORB SLAM 2 requires 312 ms. Note that ORB SLAM 2's mapping process performs a local Bundle Adjustment every time a new keyframe is added, and since the tested sequence is a closed room, the local map is relatively large when compared to pure exploratory motion; and hence the relatively slow time. DSM requires an average of 620 ms per keyframe. The very large increase in computational cost is attributed to DSM's pyramidal photometric Bundle Adjustment, which it repeats on three levels. In contrast, the approach performed by the system 150, and LDSO, perform their local photometric BA on a single pyramid level. Note that speed of the system in maintaining both local and global maps is comparable to pure odometry methods like DSO that only maintains a local map at a cost of 52 ms per keyframe.

For loop closure detection and PGO, they are typically infrequent and can happen at different locations in the scene for various SLAM systems, and as such it is difficult to report and compare their average computational cost. Therefore, the results for a sample case in the system 150 are reported, where for a sequence of 597 keyframes, it took 8 ms to query the global map for a loop candidate, 16 ms to estimate the similarity transformation and correct the loop ends, 850 ms to perform Pose Graph Optimization using both covisibility and pose-pose constraints on the entire sequence, and 5.4 seconds to perform the full inverse depth photometric Bundle Adjustment.

The memory cost associated with the various VSLAM systems run on the same Euroc MH_01_easy sequence are shown in TABLE 2. TABLE 2 shows numbers reported and include the BoVW memory required by the system 150, LDSO and ORB SLAM2. Note that the system 150, LDSO, and ORB SLAM 2 use a Bags of Visual words dictionary to detect loop closure candidates. The dictionary must be loaded in memory and has a constant size (not included in the table). In contrast DSM does not perform loop closures, and therefore does not require the bags of words dictionary; however, its memory cost per keyframe is significantly higher than the other systems.

TABLE 2

| | System 150 | LDSO | ORB SLAM 2 | DSM |
|---|---|---|---|---|
| Number of keyframes | 484 | 705 | 204 | 122 |
| Number of Map Points | 23023 | NA | 8335 | 31974 |
| Memory Usage (MB) | 474 | 1162 | 776 | 805 |

Since the system 150 keeps track of a covisbility graph, it is possible to prune the global map similar to what is proposed in ORB SLAM by removing redundant keyframes that share more than 90% of their map points with other keyframes. Moreover, the use of descriptor sharing landmark information for local-global representations. Compared to the approach performed by the system 150, LDSO consumes about 65% more memory (MB) per keyframe, ORB SLAM consumes 280% more and DSM about 560% more. These numbers support the significant impact of descriptor sharing and the use of a single representation for both local and global maps as performed in the system 150.

Since the example experiments evaluated the performance of SLAM systems, their computed trajectory beginning and end keyframes were aligned through the loop closure process, resulting in overconfident results that does not reflect the true trajectory errors. For this reason, the experimental evaluation was performed using the EuroC dataset, which provides ground truth data throughout the entire sequence. Each sequence was repeated ten times for each system and the resulting medians are shown in TABLE 3. TABLE 3 shows localization error (meters) on the Euroc dataset (left images). When computing the median, a result of Failure was replaced with the largest error value recorded.

TABLE 3

| Sequence | System 150 | LDSO | ORB SLAM 2 | DSM |
|---|---|---|---|---|
| MH_01_easy | 0.035 | 0.053 | 0.07 | 0.039 |
| MH_02_easy | 0.034 | 0.062 | 0.066 | 0.036 |
| MH_03_medium | 0.111 | 0.114 | 0.071 | 0.055 |
| MH_04_difficult | 0.111 | 0.152 | 0.081 | 0.057 |
| MH_05_difficult | 0.064 | 0.085 | 0.06 | 0.067 |
| V1_01_easy | 0.039 | 0.099 | 0.015 | 0.095 |
| V1_02_medium | 0.085 | 0.087 | 0.02 | 0.059 |
| V1_03_difficult | 0.266 | 0.536 | Fail | 0.076 |
| V2_01_easy | 0.037 | 0.066 | 0.015 | 0.056 |
| V2_02_medium | 0.047 | 0.078 | 0.017 | 0.057 |
| V2_03_difficult | 1.218 | Fail | Fail | 0.784 |
| Median Error | 0.064 | 0.087 | 0.066 | 0.057 |

The system 150 outperformed LDSO on all sequences despite the fact that both systems use a local moving window to explore the scene. The performance improvement is attributed to various reasons, for example: (1) the improved accuracy of the hybrid pose estimation process; (2) the improved connectivity graph that contains both covisibility and pose-pose constraints; and (3) the global Bundle Adjustment that optimizes the global map. Further, the system 150 scored between ORB SLAM and DSM, outperforming each on several sequences while under-performing on others. The mixed results can be attributed to several factors. One of the common reasons for the under-performance is not invoking loop closures: the system 150 rejects weak loop closure candidates if recent map points are observed in them, as it is considered an indication that no significant drift has occurred. This results in loop closure, and subsequently PGO and fully BA to never be invoked on the entirety of a sequence; resulting in reduction of accuracy when compared to DSM or ORB SLAM that run Bundle Adjustment after every keyframe. Since most sequences in Euroc are of a relatively small room, the consistently re-occurring Local Bundle Adjustment covers most keyframes several times, resulting in their reported improved accuracy. In some cases, DSM achieves superiority over the system 150 and ORB SLAM on several sequences by limiting the number of new keyframes it adds, and reusing old keyframes with their associated data. While the other SLAM systems query a relatively sparse global map of features, DSM keeps track and queries all of its photometric residuals in a global Direct map. This however comes at a very high computational and memory costs, resulting in below real-time performance and limits its operability to relatively small environments and would suffer when used in large scale environments. In contrast, the back-end of the system 150 is about nine and five times faster than DSM's and ORB SLAM's back-ends respectively, while achieving competitive results on all sequences.

The example experiments illustrate the advantages of the approach of the present embodiments by leveraging the advantages of Direct and Indirect formulations within a descriptor sharing approach can yield a unified scene representation for local and global maps. The present embodiments introduce several key capabilities that are typically not available in each framework alone or in other hybrid methods; for example, the ability to perform global Bundle Adjustment on the same map representation, to re-activate previously observed map points, to perform keyframe culling, and to extract and maintain hybrid connectivity graphs (temporally connected and co-visibility constraints). This allows the approach of the present embodiments to perform loop closure using Pose Graph Optimization over both type of constraints concurrently. The sub-optimal results of the PGO are further refined with a global Inverse depth Bundle Adjustment that is typically not possible in other hybrid approaches. The capabilities of the system 150 are further validated by its computational and memory efficient performance when compared to other approaches, achieving substantial improvements in performance on some sequences of the Euroc dataset, while performing on par with other SLAM systems despite its back-end being almost an order of magnitude faster than them and having a significantly smaller memory footprint.

In most cases, it can be assumed that the camera calibration matrix, K, is available to be used to project 3D points from the camera's homogeneous space to the image frame. However, in some cases, obtaining the camera calibration may require the presence of a special calibrating pattern, which may not always be viable. In some cases, deep learning approaches may be used to recover camera intrinsic variables from natural scene images without the presence of a calibrating pattern; however, their relatively low accuracy, coupled with their large architectures, can prohibit their use in real life, practical applications. In an embodiment, the system 150 can use a data-driven approach, which exploits the underlying structure encoded in multiple views of the same scene, to recover the camera intrinsic parameters. Advantageously, the system 150 leverages multiple-view solutions for the design and training of a machine learning model for the purpose of estimating the focal length and principal point position of a camera. The accuracy of the machine learning model has been determined to outperform traditional methods by 2% to 30% and outperform other deep learning approaches by a factor of 2 to 4 times. Advantageously, the system 150 uses a dataset that covers both synthetic and real scenes, and includes a varying range of focal lengths, aspect ratios and principal points, tailored to the camera calibration task.

Camera calibration is the process of recovering intrinsic parameters; for example, the focal length f, principal point c, skew angle γ, and the like, which are necessary for mapping from the 3D coordinate frame of the camera to its corresponding 2D image frame. The accurate knowledge of this projection is therefore vital for various vision-based (Structure from Motion) and robotics (Simultaneous Localization and Mapping) systems, where image observations are continuously projected from 3D to 2D and vice versa. Most calibration solutions suffer from various limitations, for example, recovering the camera calibration using Epipolar geometry suffers from computational challenges in solving coupled non-linear Kruppa equations. On the other hand, recovering the camera calibration from a single image is inherently degenerate (infinite possible camera calibrations), and is only reduced to a unique solution if one can reliably extract 3 perpendicular planes (under the Manhattan world assumption), from which the vanishing points can be recovered. Several attempts have been made to retrieve the camera parameters from a single image using an end-to-end approach, thereby automating the entire camera calibration process. To achieve this, the networks were implicitly biased to learn the vanishing points by introducing hyper-parameters involving the horizon line, roll and tilt into their loss function. However, most such approaches relied on a generic deep convolutional architecture designed for image classification: the learned models had millions of parameters and yet did not yield accurate results for real-life deployment. Furthermore, due to the lack of datasets tailored for the camera calibration problem, the required training data was generated by cropping images from large panoramas, and therefore lacked any information on the principal point, an essential component in the calibration of real cameras.

Figure 13:
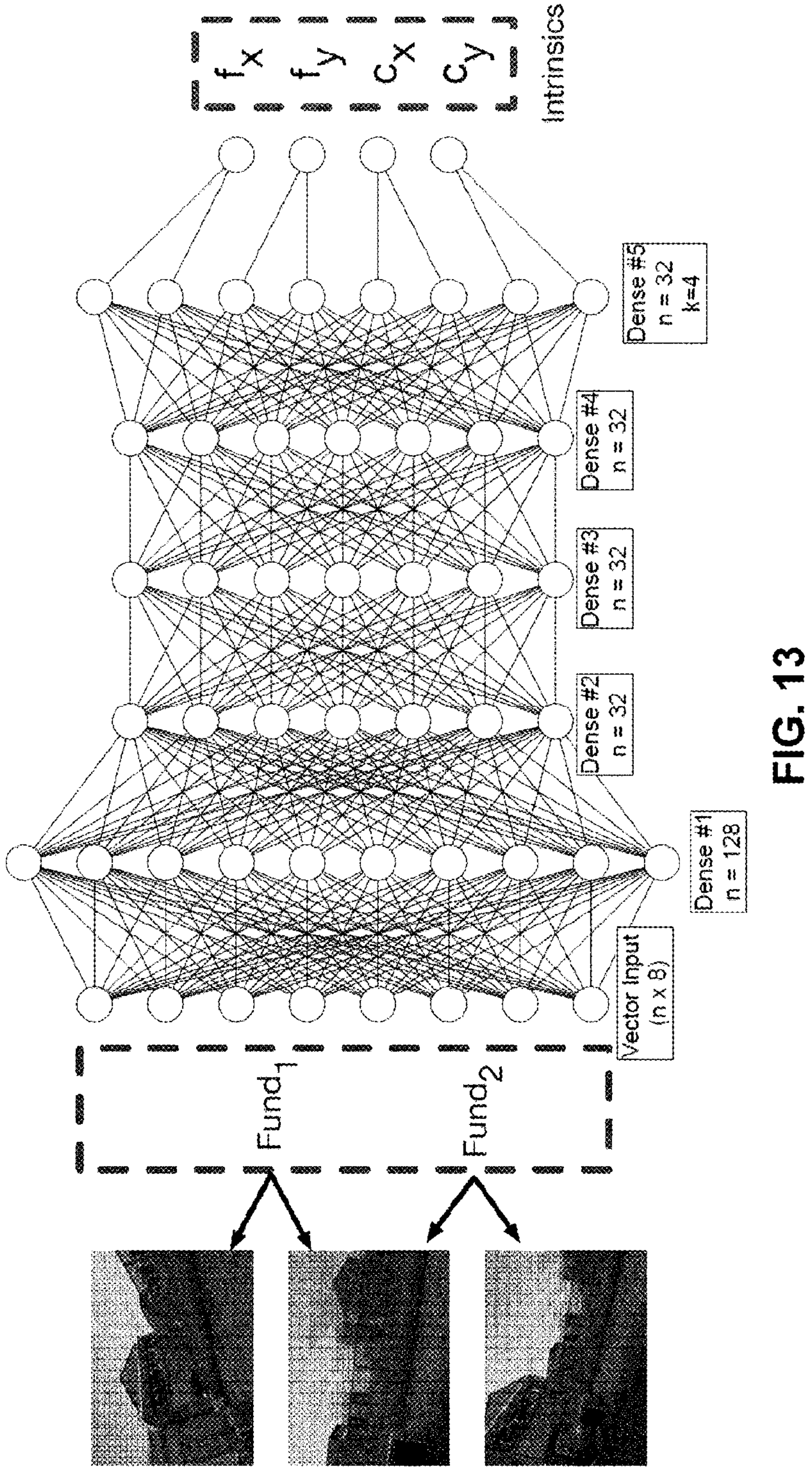
FIG. 13 is a diagram showing a summary of the camera calibration where a minimal set of two Fundamental matrices relating three sequential images is fed into a compact deep model to recover both the focal length ($f_x$, $f_y$) and principle point coordinates ($c_x$, $c_y$)

Recovering a camera calibration using the minimum case of three images, instead of one, is inherently more stable as it returns a unique solution under random Euclidean motion and does not require a Manhattan world assumption. Given that most applications requiring camera calibrations already have a moving camera and produce image sequences, embodiments of the present disclosure use an architecture that exploits the inherent structure encoded in multiple views (as exemplified in FIG. 13) to perform the camera calibration; contrary to other data-driven approaches that recover the camera parameters from a single image. FIG. 13 is a diagram showing a summary of the camera calibration where a minimal set of two Fundamental matrices relating three sequential images is fed into a compact deep model to recover both the focal length ($f_x$, $f_y$) and principle point coordinates ($c_x$, $c_y$).

In an embodiment, an architecture is provided that consists of Fundamental matrices as input (computed from temporally adjacent image pairs) to a FCN (Fully Connected Network) trained using ground truth camera parameters as a supervisory signal. In a particular case, three images are the minimum number required to fully constrain the camera intrinsic parameters to a unique solution using underlying Epipolar geometry. In an example, the FCN was trained using a dataset made of 80000 synthetic images and 84,000 real images, sorted into 6,000 sequences of 14 images each, where each sequence had a unique set of ground truth camera calibration parameters including the focal length and the principal point. In a particular case, a compact trained FCN model (e.g., using only 4 hidden layers) with only 17K parameters was found to outperform other self-calibration models that had more than 26M parameters.

While this embodiment uses a set of radial distortion free Fundamental matrices, any suitable approach can be used to find the Fundamental matrix, whether from radial distortion free images or from images with radial distortion using a 9 point algorithm. In this disclosure, matrices are denoted with bold upper case characters, vectors with lower case bold characters, and scalars with regular font.

In a distortion-free pinhole camera model, a 3D point $[X, Y, Z, 1]^T$ in the world frame, projects to a 2D point $[u, v, 1]^T$ in the image plane using:

$$\begin{bmatrix} u \\ v \\ 1 \end{bmatrix} = KP_w^c \begin{bmatrix} X \\ Y \\ Z \\ 1 \end{bmatrix} \tag{58}$$

where K is the camera's intrinsic matrix and $$P_w^c \in SE(3)$$

is a 3×4 camera pose matrix in the world coordinate frame. However, in most computer vision applications neither K, P nor the 3D points are known in advance; instead, 2D point correspondences established through feature matching between two images are typically used to estimate a 3×3 Fundamental matrix F, that encodes both K and the pose P between the pair of images.

Using the above projection model, several objects typically found at infinity are invariant to Euclidean transformations P and only depend on the camera intrinsics K. Most self-calibration methods rely on the absolute conic Ω, a virtual object located on a plane at infinity and invariant under Euclidean transformations, to estimate the camera intrinsics. Since the absolute conic is invariant to translation and rotation, its projection known as the image of the absolute conic ω is also independent of the position and orientation of the camera. Therefore, ω is only dependent on the camera matrix K that embeds the intrinsic parameters. Consequently, finding ω is equivalent to estimating the camera intrinsic parameters. It can be shown that:

$$\omega = (KK^T)^{-1} = K^{-T}K^{-1} \tag{59}$$

In practice, it is the "Dual Image of the Absolute Conic" (DIAC) $\omega^*=\omega^{-1}$ that is used, where $\omega^*=KK^T$; the DIAC allows for the recovery of a unique upper triangular matrix K using Cholesky decomposition. In order to properly constrain $\omega^*$ (equivalently ω), at least 8 point correspondences between 3 different images are generally required. Two Fundamental matrices describing two sets of motion can then be computed by solving $M'^T FM=0$, where M denotes a set of 2D homogeneous points and M' the set of their respective point correspondences in the other images.

Each Fundamental matrix is then decomposed through SVD into $F=UDV^T$. The Fundamental matrices are rank deficient (rank 2) and as such each provides three Epipolar constraints of which only two are independent. The resulting constraints known as Kruppa's equations can then be defined as:

$$\frac{r^2 v_1^T K v_1}{u_2^T K' u_2} = \frac{rs v_1^T K v_2}{-u_2^T K' u_1} = \frac{s^2 v_2^T K v_2}{u_1^T K' u_1} \tag{60}$$

where $u_i v_i$ are the respective $i^{th}$ column vectors of the matrices U and V.

Equation (60) assumes different camera calibrations K and K' for each of the images used to compute F, and can therefore handle cameras with changing intrinsics as long as a sufficient number of observations is available. However, to avoid various unwanted artifacts like recurrent defocus, most practical computer vision applications restrict the camera intrinsics to be fixed. Therefore, for practical purposes, the camera intrinsics are assumed fixed (K=K'). This has considerable ramifications on performance. In the present embodiment, let $\rho_i$ be the numerator of the $i^{th}$ equality term in Equation (60) and $\phi_i$ the denominator. Equation (60) can then be rewritten as:

$$\begin{cases} \pi_1 = \frac{\rho_1}{\phi_1} - \frac{\rho_2}{\phi_2} = 0 \\ \pi_2 = \frac{\rho_1}{\phi_1} - \frac{\rho_3}{\phi_3} = 0 \\ \pi_3 = \frac{\rho_2}{\phi_2} - \frac{\rho_3}{\phi_3} = 0 \end{cases} \tag{61}$$

where two of which are linearly independent.

In the fixed intrinsics case, the number of independent equations needed to solve for a unique camera's intrinsics is equal to the number of unknowns in K, which is parametrized with the assumption of zero skew as:

$$K = \begin{bmatrix} f_x & 0 & c_x \\ 0 & f_y & c_y \\ 0 & 0 & 1 \end{bmatrix} \tag{62}$$

With the four unknowns ($f_x$, $f_y$, $c_x$, $c_y$), two Fundamental matrices each providing two independent equations are sufficient to uniquely determine K. However, the present inventors found that the stability and accuracy of the objective function is positively correlated with the number of Fundamental matrices used; as such, the objective function is designed to handle n Fundamental matrices.

Since the goal is to minimize all three equations for n Fundamental matrices, the nonlinear optimization is then formulated as:

$$\underset{K \in \mathbb{R}_+^{3\times3}}{\operatorname{argmin}} \sum_{i=0}^{n} w_i(\pi_{i,1}^2 + \pi_{i,2}^2 + \pi_{i,3}^2) \tag{63}$$

where i refers to the $i^{th}$ Fundamental matrix, and $w_i$ is a weighting factor that down-weights the contribution of unreliable Fundamental matrices to the overall objective function. While there are many ways of quantifying the reliability of a Fundamental matrix, in this following example, a normalized version of the fundamental matrix constraint is used since it is readily available from the Fundamental matrix estimation process:

$$w_i = \frac{\frac{1}{(M'FM)_i}}{\sum_{j=1}^{n} \frac{1}{(M'FM)_j}} \tag{64}$$

The non-linear constrained optimization defined in Equation (63) is then solved using the interior point approach, which requires an initialization point. To find this initialization point, Equation (61) is solved by making two assumptions, first the principal point is centered: ($c_x$, $c_y$)=(width/2, height/2), and second, that the aspect ratio is equal to one ($f_x=f_y=f$). Note that since each Fundamental matrix provides two independent equations, one could solve Equation (61) for two parameters at a time; that is, the second assumption can be simultaneously solved for both $f_x$ and $f_y$. However, because of noise in the Fundamental matrices, solving a system of equation in both unknowns may result in physically meaningless imaginary pairs of solutions, not to mention that it is not trivial to identify which of the two equations are independent. For these reasons, and since the values found will only serve as initializing points for the subsequent optimization, a unit aspect ratio assumption can be used.

Each equation in Equation (61) is quartic in f and yields four possible values for a total of possible answers per Fundamental matrix; most of these values are either negative or imaginary and are as such discarded for being physically meaningless. The yielding of values is repeated for all Fundamental matrices and the median of all the valid (real positive) values is used as the initializing point to both $f_x$ and $f_y$. In some cases, the principal point can be initialized using the newly found focal length.

In an example of the present embodiment, the FCN illustrated in FIG. 13 consists of 4 fully connected hidden layers whose input is a set of Fundamental matrices. Since Fundamental matrices are rank deficient, each one is flattened to a vector of 8 elements (the fundamental matrices were normalized so that their 9th element=1). This architecture minimizes the number of parameters and hyperparameters can be determined empirically. The number of input Fundamental matrices is also a hyperparameter that can be tuned, but cannot be less than two as anything less is not enough to uniquely constrain the intrinsics matrix. The output is fed to four independent regressors, each dedicated to a specific calibration parameter. In some cases, in order to ensure better generalization, a dropout of 10% was applied to the first four layers. Early stopping yields an optimal result at around 280-300 epochs. The FCN was trained with a Huber loss and optimized using Adam solver with a learning rate of 0.0001. The batch size of 64 was found to generalize the best and was therefore adopted.

A significant challenge for data-driven camera calibration is the lack of suitable datasets tailored to the problem's nature. Some approaches adapt datasets originally designed for scene recognition by warping the panoramas from an equi-rectangular projection to a pinhole one. However, the warping approach can only generate sequences of purely rotating cameras and is therefore not suitable to generate continuous image sequences undergoing general Euclidean transformations, typically found in real life applications. Furthermore, such approaches generally only consider the case of centered principal point with unit aspect ratio, which is not the case for most cameras. In view of this problem, the present inventors generated a large dataset of video sequences made from both real and synthetic images, along with their associated ground truth intrinsic calibrations.

The synthetic dataset was generated using the Unity™ engine, where over 80,000 images were produced in batches of 14, resulting in about 6,000 different video sequences. Images within the same sequence had the same camera intrinsic parameters as they underwent general and incremental Euclidean transformations. Camera rotation and translation was performed by smoothly transitioning from an initial pose $[R_0|t_0]$ to another $[R_1|t_1]$ across a number of frames in a linear fashion as described in Equation (65):

$$x_{t+1} = x_t + d_x(t) + \mathcal{N}_x(0, 1) \tag{65}$$

$$y_{t+1} = y_t + d_y(t) + \mathcal{N}_y(0, 1)$$

$$z_{t+1} = z_t + d_z(t) + \mathcal{N}_z(0, 1)$$

$$\phi_{t+1} = \frac{\phi_f - \phi_i}{t_f - t_i}(t + 1)$$

$$\gamma_{t+1} = \frac{\gamma_f - \gamma_i}{t_f - t_i}(t + 1)$$

$$\psi_{t+1} = \frac{\psi_f - \psi_i}{t_f - t_i}(t + 1)$$

Figure 14:
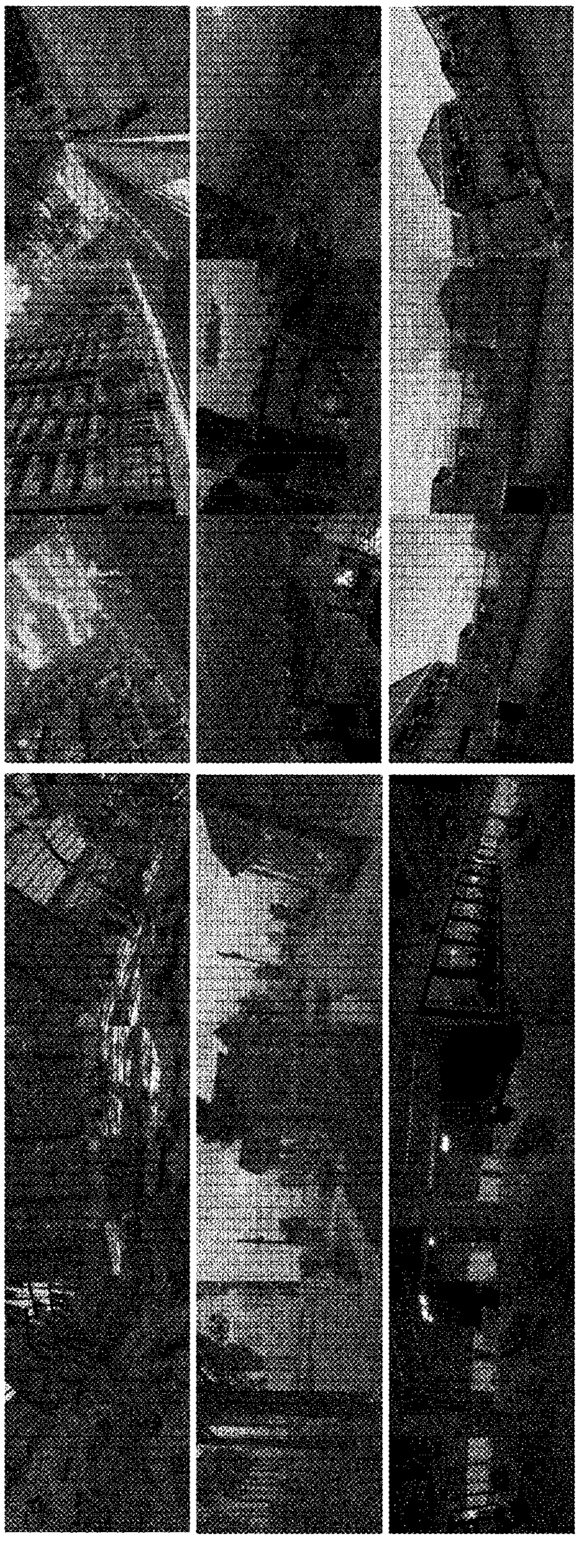
FIG. 14 illustrates example image sets from a synthetically generated image dataset.
Figure 15:
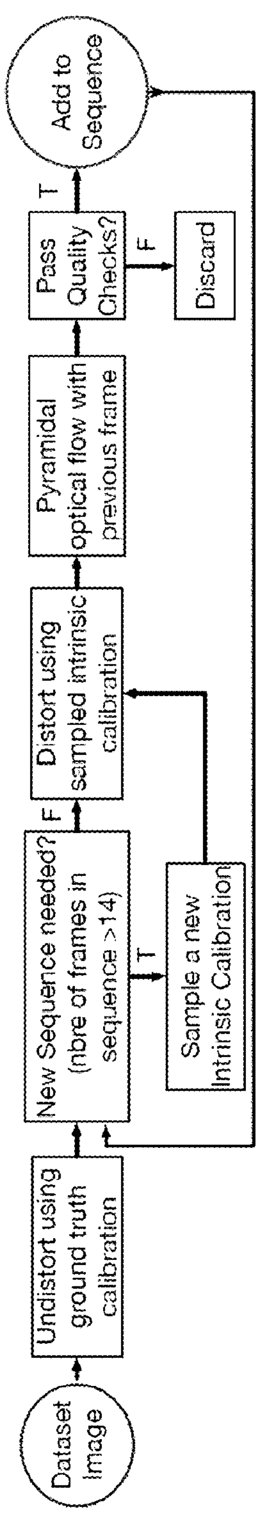
FIG. 15 illustrates a real dataset sequence generation approach.

Additional white noise is added to the incremental displacement vectors ($d_x$, $d_y$, $d_z$) to introduce randomness in the camera's motion. Since the camera is free to move in 3D space, invalid sequences caused by camera clipping into objects are accordingly detected and removed. The 640×480 pixels images originate from a dozen of different indoor and outdoor scenes, covering rural, urban, natural, and man-made environments (as illustrated in FIG. 14). FIG. 14 shows example image sets from the synthetically generated image dataset (showing randomly selected 3 of 14 images per set). The samples show the wide variety of scenes, covering both indoor and outdoor conditions, and the motion randomness between the frames FIG. 15 illustrates a real dataset sequence generation approach, in accordance with the present embodiments. The distribution of the variables used in the synthetic dataset generation along with the camera intrinsic parameters range are presented in TABLE 4. The generated dataset includes the ground truth focal length ($f_x$, $f_y$), principal point ($c_x$, $c_y$), relative camera position and orientation to the first frame in each sequence as well as the absolute camera pose in the world coordinate frame. The presence of these labels allows the use of this dataset in a variety of computer vision applications that require the knowledge of the camera's pose and calibration. The generated images are then divided such that 64,000 images are used to train the network, 13,000 for validation, and 3,000 for testing. Note that the test sequences were generated from a set of Unity scenes that were not used to generate the training and validation sets.

TABLE 4

| Extrinsic Parameters | Value |
|---|---|
| Displacement in x | $\mathcal{U}(-0.9, 0.9)$ |
| Displacement in z | $\mathcal{U}(-0.9, 0.9)$ |
| Displacement in y | $\mathcal{U}(-0.36, 0.36)$ |
| Tilt | $\mathcal{U}(-40, 40)$ |
| Roll | $\mathcal{U}(-20, 40)$ |
| Pan | $\mathcal{U}(-180, 180)$ |
| **Intrinsic Parameters** | **Value** |
| Focal Length in x | $\mathcal{U}(200, 775)$ |
| Focal Length in y | $\mathcal{U}(150, 580)$ |
| Lens Shift in x | $\mathcal{U}(-0.2, 0.2)$ |
| Lens Shift in y | $\mathcal{U}(-0.2, 0.2)$ |

The Fundamental matrices needed to train the machine learning model are determined from the pose estimates and known intrinsic matrices K. Let P and P' denote the camera poses of two different images of the same sequence. The Fundamental matrix relating them is then computed as:

$$F = K^{-T}[t]_x R K^{-1} \tag{66}$$

where R and t are the relative rotation and translation matrices relating P' and P, and $[\bullet]_x$ is the skew-symmetric operator. In order to ensure scale independent Fundamental matrices, the translation vector is normalized using its L2 norm.

The sequence generation process, shown in FIG. 15, starts by randomly sampling a virtual pinhole model that will serve as the new camera intrinsics to each sequence. The dataset images are then processed sequentially and transformed into the new pinhole model. The image is transformed to the new virtual pinhole projection $K_{new}$ using:

$$\begin{bmatrix} u \\ v \\ 1 \end{bmatrix}_{old} = K_{old} K_{new}^{-1} \begin{bmatrix} u \\ v \\ 1 \end{bmatrix}_{new} \tag{67}$$

To avoid unnatural looking images through this transformation, the virtual projection parameters $(f_x f_y, c_x, c_y)_{new}$ are sampled as a function of the ground truth calibration as described in TABLE 5. TABLE 5 shows new camera intrinsics as a function of the ground truth ones. The subscripts n and o refer to new and old respectively. $\mathcal{U}$ is a uniform distribution, $s_x$ is the scale applied to the ground truth focal length and a is the aspect ratio of the new image.

TABLE 5

| New Intrinsic Parameters | Value |
|---|---|
| $(W, H)_n$ | $(W, H)_o / \mathcal{U}(1.0, 2.0)$ |
| $s_x$ | $\mathcal{U}(0.7, 2.0)$ |
| a | $\mathcal{U}(0.8, 1.2)$ |
| $f_x$ | $s_x f_{xo} \frac{W_n}{W_o}$ |
| $f_y$ | $a s_x f_{yo} \frac{H_n}{H_o}$ |
| $c_x$ | $c_{xo} \frac{W_n}{W_o} + \mathcal{U}(-50, 50)$ |
| $c_y$ | $c_{yo} \frac{H_n}{H_o} + \mathcal{U}(-50, 50)$ |

Pyramidal Optical flow is then performed between the current image and the previous one, allowing for the recovery of the Fundamental matrix relating them with a RANSAC scheme. Various procedures can also be used to ensure the quality of the Fundamental matrices. First, FAST features with low cut off threshold ensures a large number of extracted features, even in texture deprived environments, at the expense of added noise. The large number of noisy features is then countered by non maximum suppression with a radius of 10 pixels. This ensures the survival of a large number of the best homogeneously distributed features in the frame. A frame then passes through a series of Quality checks and is discarded if:

the number of extracted features $n_f<100$, the number of feature matches $n_m<0.65\ n_f$, the percentage of inliers supporting the Fundamental matrix through RANSAC $n_i<0.5\ n_m$, and the fundamental matrix constraint $(\Sigma_i x_i, Fx_i)>15$ pixels.

To ensure sufficient camera motion while maintaining randomness between the frames, a frame is only accepted into a sequence if it meets the aforementioned quality checks, as well as the following condition on its optical flow:

$$\|meanOptflow\|_2 > a(W+H) + b + \mathcal{U}(-10, 10) \tag{68}$$

where W, H are the image width and height respectively, and (a,b) tuned on a per dataset basis, taking into account the camera speed and typical depths observed. The end result is a dataset of 6,000 sequences (4,300 from TumMono and 1,700 from Euroc) with 14 images per sequence and their corresponding 7 relative Fundamental matrices and unique ground truth camera calibration.

The present inventors conducted example experiments to compare the present approach to generating the camera calibration with other approaches. The model of the present embodiments was determined to performs the best, achieving errors as low as 9%. The model of the present embodiments was also determined to estimate the principal point with an error that was three times lower on the principal point. These results can be attributed to at least two factors: (1) the quality of the supervisory signal on each parameter from the dataset generation step, and (2) an architecture dedicated to exploiting the set of Fundamental matrices instead of implicitly inferring the required knowledge from images. The second reason also has important ramifications on the size of the model, which requires a fraction of the parameters employed in other approaches, and as such is faster to compute than the traditional self-calibration approach. Advantageously, the model of the present embodiments used in the example experiments consisted of 17,000 parameters, in contrast to a DenseNet model that includes 26 million parameters.

With a minimum of three images, or equivalently two Fundamental matrices, used to find a unique camera calibration, it is noteworthy to examine the impact of the number of inputs on the resulting accuracy. To that end, 6 different models of the present architecture were trained, starting at two Fundamental matrices for the first model, and increasing one Fundamental matrix for each subsequent model to reach seven in the final model. The experiment was also repeated for a traditional self-calibration approach. While the traditional approach registered an improvement of about 4% going from 2 to 7 Fundamental matrices, the present architecture's accuracy improved by only 1%, suggesting it sufficient to use two Fundamental matrices.

Embodiments of the present disclosure provide a deep intrinsic camera calibration model from fundamental matrices that is able to exploit traditional multi-view constraints in a deep learning approach to predict the focal lengths ($f_x$, $f_y$) and the principal point ($c_x$, $c_y$). These embodiments were able to achieve substantial performance improvements on each parameter, with a mean absolute error of 10% across. In addition, these embodiments had a small fraction of the number of parameters typically used in other approaches. Particularly, the generated synthetic and real datasets, tailored to the intrinsic calibration task, provided substantial advantages of calibration.

As illustrated herein, the present embodiments provide a hybrid approach, using both Direct and Indirect features, that concurrently leverages their advantages while diminishing their shortcomings. The present embodiments, at a small computational cost, substantially improve the accuracy of VSLAM while maintaining the robustness of direct methods to textureless regions and the resilience of indirect methods to large baseline motions. A by-product of these embodiments are a means to control the density of the reconstructed maps, allowing the use of indirect features for global map localization and reuse while locally maintaining the reconstruction density from the direct methods.

Although the foregoing has been described with reference to certain specific embodiments, various modifications thereto will be apparent to those skilled in the art without departing from the spirit and scope of the invention as outlined in the appended claims.

The invention claimed is:

1. A computer-executable method for visual simultaneous localization and mapping, the method comprising:

receiving image data representing a new frame;

extracting a blend of landmarks from the image data;

associating descriptors and patches of pixels with the extracted landmarks;

using the descriptors and patches of pixels, estimating a camera pose by performing indirect feature matching and direct pose estimation with descriptors and patches of pixels from a previous frame, the camera pose comprising a weighted contribution of the indirect feature matching and direct pose estimation;

performing joint pose optimization over photometric residuals and geometric residuals using the estimated pose, wherein features from the direct pose estimation contribute the photometric residuals and features from the indirect feature matching contribute the geometric residuals;

where the new frame is a keyframe, updating a local map by performing Bundle Adjustment on the estimated pose;

marginalizing extracted landmarks from the local map that are older than a predetermined number of keyframes and adding the descriptors associated with the marginalized landmarks to a global map;

performing loop closure comprising:

where there are loop closure candidates, performing point matching between a keyframe associated with the loop closure candidate and a keyframe most recently added to the global map; and rejecting the keyframe associated with the loop closure candidate if the number of matches is below a predetermined threshold; and outputting the local map.

2. The method of claim 1, wherein the landmarks comprise detected corners and pixel locations with a gradient above a threshold.

3. The method of claim 1, wherein performing loop closure further comprises determining if there are loop closure candidates by comparing the descriptors associated with the loop closure candidates with descriptors associated with the global map.

4. The method of claim 3, wherein comparing the descriptors comprises using a Bags of Visual words dictionary to detect the loop closure candidates.

5. The method of claim 1, wherein the descriptors comprise Oriented FAST and Rotated BRIEF (ORB) descriptors and patches of pixels descriptors.

6. The method of claim 5, wherein on the ORB descriptors are added to the global map.

7. The method of claim 1, further comprising using a logistic utility function to steer the multi-objective optimization, the logistic utility function comprising higher weights to the geometric residuals in earlier stages of the multi-objective optimization and gradually shifting the weighting toward the photometric residuals.

8. The method of claim 1, wherein the local map includes recently marginalized landmarks that are able to be matched to the keyframe using the descriptors.

9. The method of claim 1, further comprising updating the global map comprising performing at least one of:

performing feature matching between landmarks in the global map and landmarks of a subsequent keyframe to be added, and where a match is found, the corresponding landmark of the global map is re-activated in the local map; and checking for matches between landmarks in the local map and landmarks in the global map, and where a match is found, determining if a projected depth estimate from the estimated pose associated with the global landmark has a proximity to the landmark in the local map within a predetermined range, and where the global landmark is within the range, re-activating the landmark in the local map.

10. The method of claim 1, wherein performing feature matching comprises using a Bags of Visual words dictionary when the number of matches is below the predetermined threshold.

11. A system for visual simultaneous localization and mapping, the system comprising one or more processors in communication with a data storage to execute:

an input module to receive image data representing a new frame;

a pre-processing module to extract a blend of landmarks from the image data;

a matching module to associate descriptors and patches of pixels with the extracted landmarks;

a mapping module to, using the descriptors and patches of pixels, estimate a camera pose by performing indirect feature matching and direct pose estimation with descriptors and patches of pixels from a previous frame, the camera pose comprising a weighted contribution of the indirect feature matching and direct pose estimation, perform joint pose optimization over photometric residuals and geometric residuals using the estimated pose, where the patches of pixels contribute the photometric residuals and the descriptors contribute the geometric residuals, update a local map by performing Bundle Adjustment on the estimated pose where the new frame is a keyframe, and marginalize extracted landmarks from the local map that are older than a predetermined number of keyframes and adding the descriptors associated with the marginalized landmarks to a global map;

a loop closure module to perform loop closure comprising:

where there are loop closure candidates, performing point matching between a keyframe associated with the loop closure candidate and a keyframe most recently added to the global map; and rejecting the keyframe associated with the loop closure candidate if the number of matches is below a predetermined threshold; and an output module to output the local map.

12. The system of claim 11, wherein the landmarks comprise detected corners and pixel locations with a gradient above a threshold.

13. The system of claim 11, wherein performing loop closure by the loop closure module further comprises determining if there are loop closure candidates by comparing the descriptors associated with the loop closure candidates with descriptors associated with the global map.

14. The system of claim 13, wherein comparing the descriptors comprises using a Bags of Visual words dictionary to detect the loop closure candidates.

15. The system of claim 11, wherein the descriptors comprise Oriented FAST and Rotated BRIEF (ORB) descriptors and patches of pixels descriptors.

16. The system of claim 15, wherein on the ORB descriptors are added to the global map.

17. The system of claim 11, wherein the mapping module further uses a logistic utility function to steer the multi-objective optimization, the logistic utility function comprising higher weights to the geometric residuals in earlier stages of the multi-objective optimization and gradually shifting the weighting toward the photometric residuals.

18. The system of claim 11, wherein the local map includes recently marginalized landmarks that are able to be matched to the keyframe using the descriptors.

19. The system of claim 11, wherein at least one of:

the matching module performs feature matching between landmarks in the global map and landmarks of a subsequent keyframe to be added, and where a match is found, the mapping module re-activates the corresponding landmark of the global map in the local map; and the matching module checks for matches between landmarks in the local map and landmarks in the global map, and where a match is found, the mapping module determines if a projected depth estimate from the estimated pose associated with the global landmark has a proximity to the landmark in the local map within a predetermined range, and where the global landmark is within the range, re-activates the landmark in the local map.

20. The system of claim 11, wherein performing feature matching comprises using a Bags of Visual words dictionary when the number of matches is below the predetermined threshold.

* * * * *